United States Patent
Bolton et al.

(10) Patent No.: US 11,222,419 B1
(45) Date of Patent: Jan. 11, 2022

(54) METHOD AND SYSTEM FOR VENEER GRADING AND STACKING USING VISION SYSTEM ANALYSIS

(71) Applicant: Boise Cascade Company, Boise, ID (US)

(72) Inventors: David Bolton, Lena, LA (US); Jude Richard Peek, Pineville, LA (US); Curtis Fennell, Boyce, LA (US); Jason Matthew Coutee, Pineville, LA (US)

(73) Assignee: Boise Cascade Company, Boise, ID (US)

( * ) Notice: Subject to any disclaimer, the term of this patent is extended or adjusted under 35 U.S.C. 154(b) by 0 days.

(21) Appl. No.: 17/084,397

(22) Filed: Oct. 29, 2020

Related U.S. Application Data

(63) Continuation-in-part of application No. 16/205,027, filed on Nov. 29, 2018, now Pat. No. 10,825,164.

(Continued)

(51) Int. Cl.
| | |
|---|---|
| *G06T 7/00* | (2017.01) |
| *H04N 5/247* | (2006.01) |
| *G06T 7/90* | (2017.01) |
| *G06T 7/60* | (2017.01) |
| *G06T 7/70* | (2017.01) |

(Continued)

(52) U.S. Cl.
CPC ............. *G06T 7/001* (2013.01); *G06T 7/90* (2017.01); *H04N 5/247* (2013.01); *G06T 3/20* (2013.01); *G06T 3/60* (2013.01); *G06T 7/60* (2013.01); *G06T 7/70* (2017.01);

(Continued)

(58) Field of Classification Search
None
See application file for complete search history.

(56) References Cited

U.S. PATENT DOCUMENTS

| | | | | |
|---|---|---|---|---|
| 3,566,937 A | * | 3/1971 | Erickson | B27L 5/002 144/364 |
| 3,606,942 A | * | 9/1971 | Daniels et al. | B65G 47/31 198/435 |

(Continued)

FOREIGN PATENT DOCUMENTS

JP 2014205306 A * 10/2014

OTHER PUBLICATIONS

Cognex Vision Software, "GigE Vision Cameras User's Guide," Published 2011.

(Continued)

*Primary Examiner* — Lindsay J Uhl
(74) *Attorney, Agent, or Firm* — Hawley Troxell Ennis & Hawley LLP; Philip McKay

(57) ABSTRACT

A method and system for a veneer grading and stacking uses one or more vision systems to generate images of the individual full or partial sheets of veneer and accurately determine the dimensions of each individual full or partial sheet of veneer. The one or more vision systems are also used to analyze the surface of each individual full or partial sheet of veneer quickly and automatically and assign a grade to each individual full or partial sheet of veneer. One or more veneer selection and stacking robots are then used to move each individual full or partial sheet of veneer from a veneer analysis and selection conveyor system to an appropriate veneer stack based on the grade assigned to the individual full or partial sheet by the one or more vision systems.

18 Claims, 45 Drawing Sheets

Related U.S. Application Data

(60) Provisional application No. 62/595,489, filed on Dec. 6, 2017.

(51) Int. Cl.

| | | |
   |---|---|---|
   | *G06T 3/60* | (2006.01) | |
   | *G06T 3/20* | (2006.01) | |
   | *H04N 9/04* | (2006.01) | |

(52) U.S. Cl.
   CPC ............. *G06T 2207/10024* (2013.01); *G06T 2207/30161* (2013.01); *H04N 9/04* (2013.01)

(56) References Cited

U.S. PATENT DOCUMENTS

| | | | |
|---|---|---|---|
| 5,892,808 | A | 4/1999 | Goulding et al. |
| 5,960,104 | A | 9/1999 | Conners et al. |
| 6,495,833 | B1 | 12/2002 | Alfano et al. |
| 9,164,029 | B2 | 10/2015 | Tsuchikawa et al. |
| 10,260,232 | B1* | 4/2019 | Conboy ................ B27K 3/52 |
| 10,825,164 | B1 | 11/2020 | Bolton et al. |
| 10,933,556 | B2 | 3/2021 | Bolton et al. |
| 10,933,557 | B2 | 3/2021 | Bolton et al. |
| 2003/0042180 | A1* | 3/2003 | Kairi ...................... B07C 5/14 |
| | | | 209/518 |
| 2004/0146615 | A1 | 7/2004 | McDonald et al. |
| 2005/0098728 | A1 | 5/2005 | Alfano et al. |
| 2005/0161118 | A1 | 7/2005 | Carman et al. |
| 2009/0279773 | A1 | 11/2009 | Gan et al. |
| 2010/0141754 | A1 | 6/2010 | Hiraoka |
| 2013/0333805 | A1 | 12/2013 | Gagnon et al. |
| 2016/0067879 | A1 | 3/2016 | Capps |
| 2017/0023489 | A1 | 1/2017 | Iizuka et al. |
| 2020/0171695 | A1 | 6/2020 | Bolton et al. |
| 2020/0171696 | A1 | 6/2020 | Bolton et al. |
| 2020/0171697 | A1 | 6/2020 | Bolton et al. |
| 2020/0173914 | A1 | 6/2020 | Bolton et al. |
| 2020/0173915 | A1 | 6/2020 | Bolton et al. |
| 2020/0175670 | A1 | 6/2020 | Bolton et al. |
| 2020/0234427 | A1 | 7/2020 | Cui et al. |

OTHER PUBLICATIONS

Cognex, "Vision Controller Installation Manual," 2014.
Cognex, "Vision Product Guide," 2018.
USNR Transverse High Grader information sheet, copyright 2019; retrieved May 23, 2019 from https://www.usnr.com/en/product/THGLM.
USNR Lineal High Grader information sheet, copyright 2019; retrieved May 23, 2019 from https://www.usnr.com/en/product/LHGLM.
USNR LHG E-Valuator Module, copyright 2019; retrieved May 23, 2019 from https://www.usnr.com/en/product/LHGEValuatorLM.
USNR Planer/Dry Mill Optimization information sheet, copyright 2019; retrieved May 23, 2019 from https://www.usnr.com/en/product/mktoptplanermilllm.
Mecano Advantages information sheet, copyright 2019; retrieved May 23, 2019 from http://www.raute.com/mecano-advantages.
Mecano Solutions information sheet, copyright 2019; retrieved May 23, 2019 from http://www.raute.com/mecano-solutions.
Mecano Products information sheet, copyright 2019; retrieved May 23, 2019 from http://www.raute.com/264.
Drying Lines information sheet, copyright 2019; retrieved May 23, 2019 from http://www.raute.com/mecano-drying-lines?redirect=http%3A%2F%2Fwww.raute.com%2Flvl%3Fp_p_id%3%26p_plifecycle%3D0%26p_p_state% . . . .
Layup Lines information sheet, copyright 2019; retrieved May 23, 2019 from http://www.raute.com/mecano-layup-lines.
Veneer Handling Lines information sheet, copyright 2019; retrieved May 23, 2019 from http://www.raute.com/mecano-veneer-handling-lines.
Panel Handling Lines information sheet, copyright 2019; retrieved May 23, 2019 from http://www.raute.com/mecano-panel-handling-lines.
Peeling Lines information sheet, copyright 2019; retrieved May 23, 2019 from http://www.raute.com/268.
Smart Mill Concept information sheet, copyright 2019; retrieved May 23, 2019 from http://www.raute.com/smart-mill-concept.
Conners et al., "Machine vision technology for the forest products industry," 1997, IEEE, Computer, vol. 30, No. 7, pp. 43-48. (Year: 1997).
Nieminen et al., "Laser transillumination imaging for determining wood defects and grain angle," 2013, Measurement Science and Technology, vol. 24, No. 125401, 7 pages. (Year: 2013).
Colares et al., "Near infrared hyperspectral imaging and MCR-ALS applied for mapping chemical composition of the wood specie *Swietenia macrophylla* King (Mahogany) at microscopic level," 2016, Microchemical Journal, vol. 124, pp. 356-363. (Year: 2016).
Tsuchikawa et al., "A review of recent application of near infrared spectroscopy to wood science and technology," 2015, Journal of Wood Science, vol. 61, pp. 213-220. (Year: 2015).

* cited by examiner

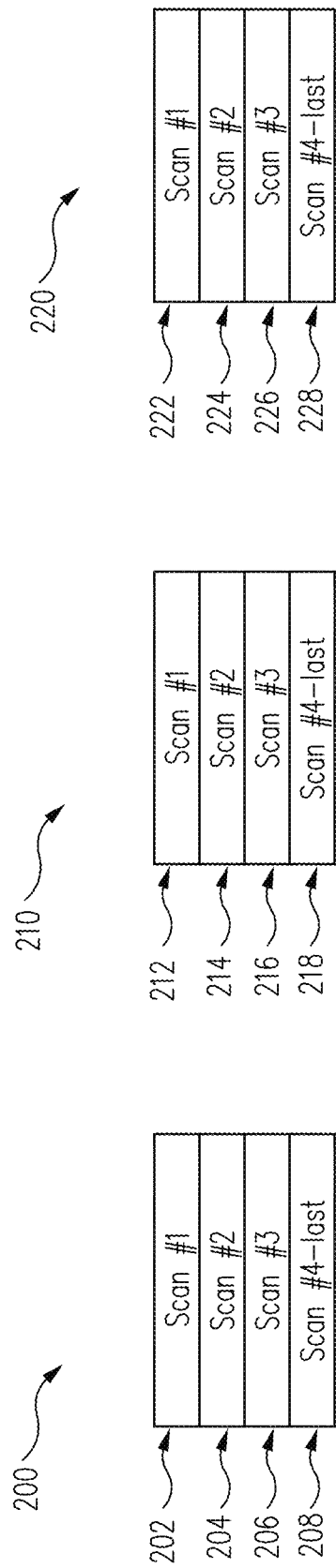

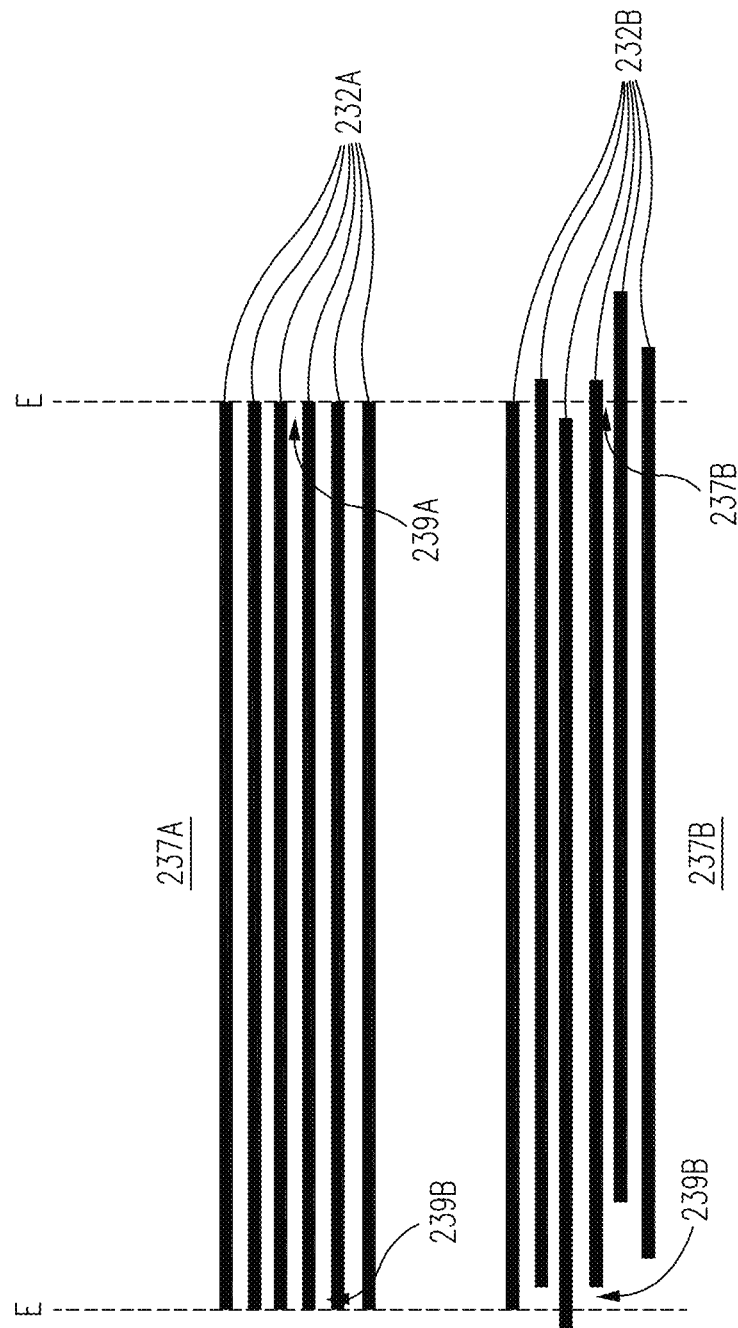

METHOD AND SYSTEM FOR VENEER GRADING AND STACKING USING VISION SYSTEM ANALYSIS

RELATED APPLICATIONS

This application is a continuation-in part of Bolton et al., U.S. patent application Ser. No. 16/205,027, filed Nov. 29, 2018 and issuing Nov. 3, 2020 as U.S. Pat. No. 10,825,164 entitled "VISION SYSTEM FOR ANALYSIS OF WOOD PRODUCTS," which claims the benefit of David Bolton, U.S. Provisional Patent Application No. 62/595,489, filed on Dec. 6, 2017, entitled "VISION SYSTEM FOR ANALYSIS OF WOOD PRODUCTS," which is hereby incorporated by reference in its entirety as if it were fully set forth herein.

BACKGROUND

There are numerous classes and types of wood products currently used in a virtually limitless variety of construction and other applications. Wood product types include, but are not limited to: raw wood products such as logs, debarked blocks, green or dry veneer, and dimensional lumber; intermediate wood components, such as wood I-beam flanges and webs; and layered wood products such as laminated beams, plywood panels, Engineered Wood Products (EWP), Parallel Laminated Veneer (PLV) products, and Laminated Veneer Lumber (LVL) products.

Layered wood products such as EWP, plywood, PLV, and LVL are composite products constructed in a factory from both natural wood and one or more chemically blended glues or resins. They are manufactured on a product assembly line and typically fabricated from multiple layers of thin wood, e.g., veneer sheets, assembled with one or more layers of adhesives bonding the sheets together. These layered wood products, sometimes referred to as "man-made" but more commonly referred to as "Engineered Wood Products," (EWP), offer several advantages over typical milled lumber. For instance, since layered wood products are fabricated and assembled in a factory under controlled conditions to a set of specific product specifications, they can be stronger, straighter, and more uniform than traditional sawn lumber. In addition, due to their composite nature, layered wood products are much less likely to warp, twist, bow, or shrink than traditional sawn lumber. Many layered wood products also benefit from the multiple grain orientations of the layers and typically can also have a higher allowable stress than a comparable milled lumber product. However, as discussed below, to achieve this potential it is often critical that the veneer sheets making up the layered wood products are inspected and graded in a consistent and accurate manner to have the correct physical characteristics such as strength, consistent surface texture, and moisture content, combined with the proper application of glue and pressing actions to produce a panel of desired strength, thickness, and visual appearance.

The use of veneer, and particularly veneer that has uniform qualities such as consistent surface texture and moisture content, allows layered wood products of various dimensions to be created without milling a board of the desired thickness or dimension from a single log or single piece of lumber. This, in turn, allows for much more efficient use of natural resources. Indeed, without the use of various layered wood technologies, the forests of the planet would have been depleted long ago simply to meet the construction needs of the ever-increasing world population. In addition, since layered wood products are fabricated in a factory under controlled specifications, layered wood products can be manufactured to virtually any dimensions desired, including dimensions such as length, width, and height well beyond dimensions that can be provided by milling from even the largest trees.

The use of veneer layers in some layered wood products can also allow for better structural integrity since any imperfections in a given veneer layer, such as a knot hole, can be mitigated by rotating and/or exchanging layers of veneer so that the imperfection is only one layer deep and is supported by layers of veneer below and above the imperfection in the layered wood product's structure. However, these advantages are again dependent on the veneer layers being accurately and consistently inspected for surface texture, strength, and moisture content and accurately and consistently graded.

As noted, the versatility and potential increased structural integrity and uniformity of layered wood products has resulted in the wide use of these products and there is little question that layered wood products are a critical component of construction worldwide. However, the currently used methods and systems for veneer inspection, grading, and veneer stacking for use with layered wood products are antiquated and extremely inefficient in terms of the amount and type of equipment required, the amount of factory production space required, the amount of human interaction and coordination required, and the amount of wasted and/or inefficiently used material and human resources.

For example, in some known prior art systems, veneer grading is performed using line-scan cameras that capture only a small portion of the length of the sheet of veneer. In these systems, a sheet of veneer is moved along a conveyor belt and a series of images are captured by the line-scan camera. Each captured image shows the entire width of the veneer sheet but only a small portion of the length of the sheet. These multiple images are then digitally stitched together lengthwise to form a composite image of the entire veneer sheet and the veneer sheet is graded based on this composite image.

FIG. 1 shows a block diagram of one such line-scan system 100 for grading veneer. A sheet of veneer 102 is moved along conveyor 104 in direction 106 shown by the arrow. In the example of FIG. 1, the veneer sheet 102 is passed through an anti-skew device 108 on the way to the field of view 110 a line-scan camera (not shown) to attempt to align the sheet properly before any images are captured.

After the veneer sheet 102 passes through the anti-skew device 108, it passes through the field of view 110 of a line-scan camera (not shown) and a series of snapshots of the veneer sheet are captured by the camera. In order for these multiple images to be formed into a single composite image, the speed of the veneer sheet and the timing of when each image is captured must be accurately managed. In some systems, the camera can be triggered by an encoder driven by the conveyor mechanism that causes each image to be captured after the veneer sheet 102 has moved a certain distance. Any deviations can result in a less accurate composite image being generated.

FIGS. 2A-2C show various example composite images formed from multiple line-scans of a veneer sheet such as veneer sheet 102 of FIG. 1. FIG. 2A shows composite image 200 made up of snapshots 202, 204, 206, 208. In FIG. 2A, the snapshots are properly spaced and aligned and composite image 200 accurately shows the veneer sheet. FIG. 2B shows composite image 210 formed from snapshots 212, 214, 216, 218. FIG. 2B shows what can happen when the veneer sheet slips on the conveyor belt as it moves through the cameras field of view. In this example, the slippage caused the veneer sheet to be in the wrong position when snapshot 214 was taken, thereby presenting an inaccurate composite image when the individual snapshots are spliced together. FIG. 2C shows composite image 220 formed from snapshots 222, 224, 226, 228. In this example, the veneer sheet was misaligned when the images were captured, again resulting in an inaccurate composite image.

As discussed above and illustrated in FIGS. 2B and 2C, this type of prior art system can be error prone and lead to inaccurate images of veneer sheets being taken, which can result in the system improperly grading veneer sheets.

In addition, not only are the currently used methods and systems for inspecting and grading veneer inefficient and in effective, methods used to process and stack both full sheets of veneer and partial sheets of veneer for use in the production of layered wood products are also antiquated and extremely inefficient in terms of the amount and type of equipment required, the amount of factory production space required, the amount of human interaction and coordination required, and the amount of wasted and/or inefficiently used material. In addition, currently used methods for grading and stacking of veneer are often ineffective and represent a safety hazard to the human workers attempting to grade and stack full veneer sheets and partial veneer sheets using currently employed methods.

As noted, layered wood products, such as plywood, EWP, PLV, and LVL are made of thin layers of veneer. Typically, these sheets of veneer are obtained manually from stacks or bins of full or partial veneer sheets. In theory, the full or partial veneer sheets making up each of the stacks or bins of veneer should include full or partial veneer sheets of the same grade.

In the case of plywood, in addition to full sheets of veneer, layers of "core material" composed of partial sheets of veneer including narrow strips/pieces of veneer are placed such as to rotate the grain approximately 90 degrees from the full or partial veneer sheets above and below. Once again, these partial sheets of veneer are obtained from stacks or bins of partial sheets of veneer that, in theory, should have been inspected and graded. Like full sheets of veneer, these partial sheets of veneer are also often obtained manually from the stacks/bins of partial veneer sheets.

In the example of plywood, the alternating layers of oriented grain material increase the structural rigidity of the panel. Typically, a first full sheet of veneer is obtained from a first veneer stack of the appropriate grade and one side (top) of the first full sheet of veneer is coated with an adhesive, e.g., glue, and then a layer of core material made up of partial sheets of veneer is manually obtained from a veneer stack/bin of partial sheets of veneer of the appropriate grade and is placed on the first full sheet of veneer. Glue is then applied to the layer of partial sheets of veneer and a second full sheet of veneer is obtained from a second veneer stack of the appropriate grade and is applied to the layer of partial sheets of veneer. The resulting three ply structure made up of a first full sheet of veneer (the first ply), glue, a layer of partial sheets of veneer (the second ply), glue, and a second full sheet of veneer (the third ply) is referred to as a three-ply "green" panel, with each individual layer of construction, e.g., full veneer sheets or partial sheets of veneer layer, within the panel commonly referred to as a "ply". Typically, plywood panels are made up of multiple plys with three to eleven plys or more being common. Once the green panel is created, there remain additional processes that are required to transform the green panel into a cured, or finished, panel. Typically, the first process downstream is to "pre-press" the green panel product. This is typically performed on a stack of green panels with 12-40 panel stacks being common. The typical pre-press is a single opening press into which the entire stack of green panels is conveyed. The press closes, pressing the green panels between an upper and lower rigid surface. This pressing or "compaction" process is at ambient temperature and ensures all the air gaps between plys in each green panel are eliminated and a quality glue to wood contact is formed throughout the panel. After this pre-pressing action is completed, the resulting "pre-pressed panel" has increased rigidity and the stack of panels is ready for the next process, "Hot Pressing".

The stack of pre-pressed green panels is then conveyed into an unstacking mechanism at the hot press. This mechanism sequentially loads a single pre-pressed green panel from the stack into individual separate heating chambers in the hot press. Essentially sandwiching each pre-pressed green panel between two heated metal plates, commonly referred to as heating platens. When each of the individual heating chambers "Platens" have a pre-pressed green panel loaded, the press closes applying pressure and heat to the pre-pressed green panel. The combination of heat and pressure cures the glue and creates a rigid "cured" panel. In this way a continuous material assembly and processing routine is created.

The production of PLV is similar to plywood production except that core material made up of partial sheets of veneer is typically not used so that each layer, e.g., ply, of PLV is a full sheet of veneer. In this process, a first full sheet of veneer is obtained from a first veneer stack of the appropriate grade and one side (top) of the first full sheet of veneer is coated with an adhesive, e.g., glue. Then a second full sheet of veneer is obtained from a second veneer stack of the appropriate grade and glue is applied to the second full sheet of veneer. A third full sheet of veneer is obtained from a third veneer stack of the appropriate grade and is applied to the second full sheet of veneer. This process is repeated until the desired number of full veneer sheets, e.g., plys, is achieved. The resulting multiple full sheet of veneer ply structure is called a PLV panel. As with plywood production, the resulting PLV panel is still a green panel, that must be "pre-pressed" to flatten out the veneer layer components and create the wood to glue bond, and then cured using a "hot press" where both pressure and heat are applied to cure the glue and create a cured panel. As with the plywood example discussed above, multiple green panels are produced, stacked, and sent to the pre-press. Then these pre-pressed panel stacks are sent to the hot press. In this way a continuous material assembly and processing routine is created.

Prior art layered wood product assembly methods and systems use a conveyor to move material progressively past multiple feeder stations where human workers obtain sheets of veneer and/or partial sheets of veneer from veneer stacks. The various feeder stations then apply successive layers of full sheets of veneer, glue, and partial sheets of veneer layers (if required) to build a panel of a desired number of plys. This system of conveyor, feeder stations, glue applicators, etc. is commonly referred to as a "Layup Line" When the panel reaches the end of the line, it is discharged to form a stack of green full or partial sheets of veneer, as referred to herein simply as "green panel stacks."

From the layup line the green layered wood product stacks are conveyed, typically by a second conveying system, to a pressing area and pressing stations. Typical plants utilize multiple press lines with two press lines being commonly used for small plants and up to eight press lines in large plants.

As discussed above, in the pressing area, the veneer stacks of green full or partial sheets of veneer are conveyed to a pre-press machine center typically utilizing hydraulic rams to compact the veneer stack, eliminating air between layers of wood, and promoting an even spread of the glue between layers of veneer. After pre-pressing, the now pre-pressed layered wood product stacks are conveyed into an unstacking mechanism which feeds one pre-pressed layered wood product panel at a time from the stack into a multi opening hot press. Typically, hot presses contain between 12 and 40 individual openings, each of which can process one pre-pressed layered wood product panel. When the hot press is loaded with panels, hydraulic systems close the press and heat is applied to cure the glue. It is this combination of heat and pressure that causes the full or partial sheets of veneer to bond and become cured plywood, PLV, or LVL panels.

As shown above, the production of layered wood products is both material and manpower intensive. Consequently, it is critical to make sure the full and/or partial sheets of veneer used to make the layered wood products are of the proper grade and can be manipulated and processed without undue damage to the veneer, the machinery involved, and the human workers.

As also discussed above, virtually every form of layered wood product production relies on the use of stacks/bins of full and/or partial sheets of veneer that, using current methods are graded and stacked by human workers. Indeed, using currently available methods and systems, not only are the veneer stacks created by manual operations, but the workers are also typically tasked with visually and manually grading the full or partial sheets of veneer as the veneer stacks are created. As discussed in detail below, this use of human workers to simultaneous grade and stack veneer is a weak link in the production chain that often results in virtually ungraded veneer, poorly stacked veneer, wasted, or inefficiently used materials, safety issues, and worker fatigue/burnout.

FIG. 2D shows a prior art full sheet of veneer stacking system 230. Prior art full sheet of veneer stacking system 230 includes dryer outfeed 231 where individual full sheets of veneer 232 are dropped onto dryer outfeed conveyor 233. Full sheets of veneer 232 can be created to almost any size desired. However, 4×8 feet are typical dimensions for each full sheet of veneer 232. As will be discussed below, for safety reasons and for production efficiency, the dimensions of the stacks of full sheets of veneer 232 to be created should ideally be as close to the dimensions of the individual full sheets of veneer 232 as possible. However, as also discussed below, using currently available systems, this is rarely the case.

From dryer outfeed conveyor 233 the individual full sheets of veneer 232 pass through moisture meter 234 where the moisture content of the individual full sheets of veneer 232 is determined. In some cases, if the moisture content of an individual full sheet of veneer 232 is determined to be unacceptable, that specific individual full sheet of veneer 232 is so marked by moisture meter 234 and that individual full sheet of veneer 232 is processed, or removed from processing, accordingly. In some cases, the moisture level of individual full sheets of veneer 232 can be used in part to determine a rough grade of the individual full sheet of veneer 232.

From moisture meter 234, the individual full sheets of veneer 232 are passed to hand sort conveyor 235. At hand sort conveyor 235, human workers 236 are tasked with creating veneer stacks 237 of individual full sheets of veneer 232. The size of the veneer stacks 237, e.g., the number of individual full sheets of veneer 232 in each veneer stack 237, is typically predetermined.

In operation, as individual full sheets of veneer 232 move along hand sort conveyor 235, human workers 236 are tasked with quickly visually grading each full sheet of veneer 232 and then manually moving each full sheet of veneer 232 into an appropriate one of the veneer stacks 237. Which one of veneer stacks 237 to which a given full sheet of veneer 232 is moved is, in theory, dependent on the grade the human workers 236 assign to the full sheet of veneer 232. For instance, as seen in FIG. 2D, there are, in this specific illustrative example, eight veneer stacks, e.g., veneer stack 1 through veneer stack 8, and each of these veneer stacks could be associated with a different grade of full sheets of veneer 232. Consequently, in theory, human workers 236 must manually and visually examine each full sheet of veneer 232 as it moves along hand sort conveyor 235, make a determination as the grade of the full sheet of veneer 232, then manually move the full sheet of veneer 232 from hand sort conveyor 235 to the appropriate veneer stack 237.

As might be anticipated, it is extremely difficult, virtually impossible in fact, for human workers 236 to perform this visual grading of full sheets of veneer 232 consistently and accurately for any reasonable amount of time, even under conditions where the speed of hand sort conveyor 235 is very slow. However, since the speed of hand sort conveyor 235 determines the amount of product made, hand sort conveyor 235 is not ideally operating at a very slow speed, in fact, the faster the better from a production standpoint. Consequently, to make this process economically viable, hand sort conveyor 235 typically moves at a speed that virtually ensures no effective or consistent grading of full sheets of veneer 232 is actually performed by human operators 236.

In addition, whenever hand sort conveyor 235 is operating at an economically viable speed, it is very difficult for human workers 236 to manually move the full sheets of veneer 232 from hand sort conveyor 235 to the appropriate veneer stacks 237 without damaging the relatively thin and fragile veneer sheets 232 by tearing, folding, or otherwise deforming the individual full sheets of veneer 232. This, in turn, often results in damaged product and wasted, or at least non-optimal use of full sheets of veneer 232.

In addition to being given the virtually impossible task of grading and manually moving each full sheet of veneer 232 from hand sort conveyor 235 to the appropriate grade veneer stack without damaging the full sheets of veneer 232, using prior art systems and methods human workers 236 are further tasked with adding full sheets of veneer 232 to the appropriate veneer stack 237 in such a way that the dimensions of the veneer stacks 237 are consistent and that the edges of each veneer stack are as even as possible. In other words, each individual full sheet of veneer 232 should be laid on the appropriate veneer stack carefully and precisely so that the edges of each full sheet of veneer 232 are aligned and the resulting veneer stacks 237 have relatively even sides with no jagged surfaces or individual full sheet of veneer 232 edges extending beyond the edge of the veneer stacks 237. This is important for several reasons. First, jagged edges are a safety hazard to human workers 236 and other processing workers not shown who can readily be cut or receive splinters by handing or rubbing up against any jagged edges. In addition, transporting veneer stacks 237 with jagged edges to the production site for the layered wood products, typically via forklift, is also dangerous and more difficult. In addition, if the veneer stacks 237 are not well aligned, e.g., they have jagged edges and or misaligned full sheets of veneer 232, the veneer stacks 237 can be unstable and/or unsuitable for use with automated or manual systems down the line, such as feeder stations or layup lines.

While, as noted, it is important and ideal that the edges of each full sheet of veneer 232 are aligned and the resulting veneer stacks 237 have relatively even sides with no jagged surfaces or individual full sheet of veneer 232 edges extending beyond the edge of the veneer stacks 237, given the number of tasks assigned to human workers 236, it is most often the case that the resulting veneer stacks do include numerous full sheets of veneer 232 that are not aligned. Consequently, using prior art methods and systems, the resulting veneer stacks do not have even sides and therefore do have jagged edges.

Referring back to FIG. 2D, prior art full sheet of veneer stacking system 230 includes overflow bin 238. In operation, any full sheets of veneer 232 that are unacceptable, damaged, or simply were not processed by human workers 236 fast enough, are passed from hand sort conveyor 235 to overflow bin 238 for recycling and/or repurposing.

FIG. 2E is a hybrid photographic representation of the prior art full sheet of veneer stacking system 230 of FIG. 2D showing dryer outfeed 231, dryer outfeed conveyor 233, moisture meter 234, hand sort conveyor 235, human workers 236, veneer stacks 237 and overflow bin 238.

As discussed above, using prior art full sheet of veneer stacking methods and systems, human workers are assigned an unrealistic set of tasks to be performed in an unrealistic amount of time. These include performing visual grading of full sheets of veneer 232 as they move along the hand sort conveyor 235, manually moving full sheets of veneer 232 from hand sort conveyor 235 to the appropriate veneer stack 237 associated with the visual and manual grading of the full sheets of veneer 232, without damaging the relatively fragile full sheets of veneer 232, and then adding full sheets of veneer 232 to the appropriate veneer stack 237 in such a way that the dimensions of the veneer stacks 237 are consistent and that the edges of each veneer stack are as even as possible.

As also discussed above, this is not realistic and the result is that full sheets of veneer 232 are inconsistently and/or inaccurately graded, many full sheets of veneer 232 are damaged, and the resulting veneer stacks 237 more often than not include numerous full sheets of veneer 232 that are not aligned and the resulting veneer stacks 237 do not have even sides and therefore have jagged edges.

FIG. 2F shows an ideal full sheet of veneer stack 237A and a typical full sheet of veneer stack 237B created using prior art full sheet of veneer stacking methods and systems. As seen in FIG. 2F ideal full sheet of veneer stack 237A has edges 239A that are even and do not fall short of, or extend beyond, the dotted lines E. As noted above, edges 239A result when the veneer sheets 232A making up ideal full sheet of veneer stack 237A are lined up evenly along lines E.

In contrast, typical full sheet of veneer stack 237B created using prior art full sheet of veneer stacking methods and systems has edges 239B that are uneven and do fall short of, or extend beyond, the dotted lines E. As noted above, edges 239B result when the veneer sheets 232B making up typical full sheet of veneer stack 237B created using prior art full sheet of veneer stacking methods and systems are not lined up evenly along lines E. As noted, full sheet of veneer stack 237B of FIG. 2F is typical of the veneer stacks created using prior art full sheet of veneer stacking methods and systems and therefore represents efficiency issues, effectiveness issues, and significant safety issues, as discussed above.

FIG. 2G shows a prior art partial sheet of veneer stacking system 240. Prior art partial sheet of veneer stacking system 240 includes dryer outfeed 231 where individual partial sheets of veneer 241 are dropped onto dryer outfeed conveyor 233. Partial sheets of veneer 241, being partial strips of veneer, can be almost any length. However, partial sheets of veneer 241 typically have approximately the same height dimension which can be any consistent approximate height desired, with around 4 feet being common. As will be discussed below, for safety reasons and for production efficiency, the dimensions of the stacks 243 of partial sheets of veneer 241 to be created would ideally be consistent in both height and width dimensions, with 4×8 feet being common. However, as also discussed below, using currently available systems, this is rarely the case.

From dryer outfeed conveyor 233 the individual partial sheets of veneer 241 pass through moisture meter 234 where the moisture content of the individual partial sheets of veneer 241 is determined. In some cases, if the moisture content of an individual partial sheet of veneer 241 is determined to be unacceptable, that specific individual partial sheet of veneer 241 is so marked by moisture meter 234 and that individual partial sheet of veneer 241 is processed, or removed from processing, accordingly. In some cases, the moisture level of individual partial sheets of veneer 241 can be used to determine a rough grade of the individual partial sheet of veneer 241.

From moisture meter 234, the individual partial sheets of veneer 241 are passed to hand sort conveyor 235. At hand sort conveyor 235, human workers 236 are tasked with creating veneer stacks 243 of layered individual partial sheets of veneer 241. The size of the veneer stacks 243, e.g., the number of individual partial sheet of veneer 241 layers in each veneer stack 243 is typically predetermined.

In operation, as individual partial sheets of veneer 241 move along hand sort conveyor 235, human workers 236 are tasked with quickly visually grading each partial sheet of veneer 241 and then manually moving each partial sheet of veneer 241 into an appropriate one of the veneer stacks 243. Which one of veneer stacks 243 to which a given partial sheet of veneer 241 is moved is, in theory, dependent on the grade the human workers 236 assign to the partial sheets of veneer 241. For instance, as seen in FIG. 2G, there are, in this specific illustrative example, eight veneer stacks 243, e.g., veneer stack 1 through veneer stack 8, and each of these veneer stacks 243 could be associated with a different grade of partial sheets of veneer 241. Consequently, in theory, human workers 236 must manually and visually examine each partial sheet of veneer 241 as it moves along hand sort conveyor 235, make a determination as to the grade of the partial sheet of veneer 241, then manually move the partial sheet of veneer 241 from hand sort conveyor 235 to the appropriate veneer stack 243.

As can be anticipated, it is extremely difficult, virtually impossible in fact, for human workers 236 to perform this visual grading of partial sheets of veneer 241 consistently and accurately for any reasonable amount of time, even under conditions where the speed of hand sort conveyor 235 is very slow. However, since the speed of hand sort conveyor 235 determines the amount of product made, hand sort conveyor 235 is not ideally operating at a very slow speed, in fact, the faster the better from a production standpoint. Consequently, to make this process economically viable, hand sort conveyor 235 typically moves at a speed that virtually ensures no effective or consistent grading of partial sheets of veneer 241 is actually performed.

In addition, whenever hand sort conveyor 235 is operating at an economically viable speed, it is very difficult for human workers 236 to manually move the partial sheets of veneer 241 from hand sort conveyor 235 to the appropriate veneer stack 243 without damaging the relatively thin and fragile veneer sheets 241 by tearing, folding, or otherwise deforming the individual partial sheets of veneer 241. This, in turn, often results in damaged product and wasted, or at least non-optimal use of partial sheets of veneer 241.

In addition to being given the virtually impossible task of grading and manually moving each partial sheet of veneer 241 from hand sort conveyor 235 to the appropriate grade veneer stack without damaging the partial sheets of veneer 241, using prior art systems and methods human workers 236 are further tasked with adding partial sheets of veneer 241 to the appropriate veneer stack 243 in layers in such a way that the dimensions of resulting layers of partial sheets of veneer 241 making up the veneer stacks 243 are consistent and that the edges of each veneer stack are as even as possible and that no bulges are created in the resulting veneer stacks 243. In other words, each individual partial sheet of veneer 241 should be laid on the appropriate veneer stack carefully and precisely to create a layer of partial sheets of veneer 241 that is as uniform as possible so that the edges of each layer of partial sheets of veneer 241 are aligned so the resulting veneer stacks 243 have relatively even sides with no jagged surfaces or individual partial sheet of veneer 241 edges extending beyond the edge of the veneer stacks 243.

This is important for several reasons. First, jagged edges are a safety hazard to human workers 236 and other processing workers not shown who can readily be cut or receive splinters by handing or rubbing up against any jagged edges. In addition, transporting veneer stacks 243 with jagged edges to the production site for the layered wood products, typically via forklift, is also dangerous and more difficult. In addition, if the veneer stacks 243 are not well aligned, e.g., they have jagged edges and or misaligned partial sheets of veneer 241, the veneer stacks can be unstable and/or unsuitable for use with automated or manual systems such as layup lines.

It is also desirable to stack the layers of individual partial sheets of veneer 241 such that any gaps between individual partial sheets of veneer 241 in the layers of individual partial sheets of veneer 241 are staggered so that no bulges of low and high points are created. If layers with bulges of high and low points are created in veneer stacks 243 due to repeatedly stacking partial sheets of veneer 241 in the same pattern, then the resultant veneer stack 243 will be unbalanced and potentially dangerous and difficult to process.

While, as noted, it is important and ideal that the edges of each layer of partial sheets of veneer 241 are aligned and the resulting veneer stacks 243 have relatively even sides with no jagged surfaces or individual partial sheet of veneer 241 edges extending beyond the edge of the veneer stacks 243 and the resulting veneer stacks 243 are bulge free, given the number of tasks assigned to human workers 236 it is most often the case that the resulting veneer stacks do include numerous layers partial sheets of veneer 241 that are not aligned and also have bugles. Consequently, as discussed below, using prior art methods and systems, the resulting veneer stacks 243 do not have even sides, have jagged edges, and have bulges of high and low points.

Referring back to FIG. 2G, prior art partial sheet of veneer stacking system 240 includes overflow bin 238. In operation, any partial sheets of veneer 241 that are unacceptable, damaged, or simply were not processed by human workers 236 fast enough, are passed from hand sort conveyor 235 to overflow bin 238 for recycling and/or repurposing.

FIG. 2H is a photographic representation of the prior art partial sheet of veneer stacking system 240 of FIG. 2G showing dryer outfeed 231, dryer outfeed conveyor 233, moisture meter 234, hand sort conveyor 235, human workers 236, veneer stacks 243 and overflow bin 238.

As discussed above, using prior art partial sheet of veneer stacking methods and systems, human workers are assigned an unrealistic set of tasks to be performed in an unrealistic amount of time. These include performing visual grading of partial sheets of veneer 241 as they move along the hand sort conveyor 235, manually moving partial sheets of veneer 241 from hand sort conveyor 235 to the veneer stack 243 associated with the visual and manual grading of the partial sheets of veneer 241, without damaging the relatively fragile partial sheets of veneer 241, and then adding partial sheets of veneer 241 to the appropriate veneer stack 243 in layers in such a way that the dimensions of the veneer stacks 243 are consistent, that the edges of each veneer stack 243 are as even as possible, and the resulting veneer stacks are bulge free.

As also discussed above, this is not realistic and the result is that partial sheets of veneer 241 are inconsistently and/or inaccurately graded, many partial sheets of veneer 241 are damaged, and the resulting veneer stacks 243 more often than not do include numerous partial sheets of veneer 241 that are not aligned and the veneer stacks 243, do not have even sides, have jagged edges, and have bulges.

FIG. 2I shows an ideal partial sheet of veneer stack 243A and a typical partial sheet of veneer stack 243B created using prior art partial sheet of veneer stacking methods and systems. As seen in FIG. 2I ideal partial sheet of veneer stack 243A has edges 249A that are even and do not fall short of, or extend beyond, the dotted lines E. As noted above, edges 249A result when the layers 242B of veneer sheets 241A making up ideal partial sheet of veneer stack 243A are lined up evenly along lines E. In addition, in ideal partial sheet of veneer stack 243A any gaps in the layers 242B alternate. When any gaps in the layers 242B alternate as in ideal partial sheet of veneer stack 243A, the result is a relatively even top surface 245A as evidenced by line T and no veneer stack bulges.

In contrast, typical partial sheet of veneer stack 243B created using prior art partial sheet of veneer stacking methods and systems has edges 249B that are uneven and do extend short of, and beyond the dotted lines E. As noted above, edges 249B result when the veneer sheet layers 242B making up typical partial sheet of veneer stack 243B created using prior art partial sheet of veneer stacking methods and systems are not lined up evenly along lines E. In addition, in typical partial sheet of veneer stack 243B created using prior art partial sheet of veneer stacking methods and systems, gaps in the layers 242B do not alternate and there is a material buildup in the veneer stack creating a bulge. The result is a relatively uneven and bulged top surface 245B as evidenced by line T.

As noted, veneer stack 243B of FIG. 2F is typical of the veneer stacks created using prior art partial sheet of veneer stacking methods and systems and therefore represents efficiency issues, effectiveness issues, and significant safety issues as discussed above.

As discussed above, prior art full and partial sheet of veneer stacking methods and systems suffer from several serious drawbacks. For instance, using prior art methods and systems for producing layered wood products, the quality of veneer fed into process is often not efficiently and effectively inspected and graded during the veneer stacking operation. Therefore, undetected defects can cause products created using the veneer stacks to be rejected downstream after significant time and energy has already been devoted to the panels, e.g., pressing is complete and panel quality is analyzed.

In addition, as noted above and discussed in more detail below, even if prior art inspection and grading systems were employed, prior art inspection and grading systems can be error prone and lead to inaccurate images of veneer sheets being taken, which can result in the system improperly grading veneer sheets.

In addition, using prior art full sheet of veneer stacking methods and systems, human workers are assigned an unrealistic set of tasks to be performed in an unrealistic amount of time. These include performing visual grading of full sheets of veneer as they move along the hand sort conveyor, manually moving full sheets of veneer from hand sort conveyor to the veneer stack associated with the visual and manual grading of the full sheets of veneer, without damaging the relatively fragile full sheets of veneer, and then adding full sheets of veneer to the appropriate veneer stack in such a way that the dimensions of the veneer stacks are consistent and that the edges of each veneer stack are as even as possible.

This is not realistic and the result is that full sheets of veneer are inconsistently and/or inaccurately graded, many full sheets of veneer are damaged, and the resulting veneer stacks more often than not do include numerous full sheets of veneer that are not aligned so the veneer stacks do not have even sides and do have jagged edges.

Similarly, using prior art partial sheet of veneer stacking methods and systems, human workers are assigned an unrealistic set of tasks to be performed in an unrealistic amount of time. These include performing visual grading of partial sheets of veneer as they move along the hand sort conveyor, manually moving partial sheets of veneer from hand sort conveyor to the veneer stack associated with the visual and manual grading of the partial sheets of veneer, without damaging the relatively fragile partial sheets of veneer, and then adding partial sheets of veneer to the appropriate veneer stack in layers in such a way that the dimensions of the veneer stacks are consistent, that the edges of each veneer stack are as even as possible, and that the veneer stack is bulge free.

This is also not realistic and the result is that partial sheets of veneer are inconsistently and/or inaccurately graded, many partial sheets of veneer are damaged, and the resulting veneer stacks more often than not do include numerous partial sheets of veneer that are not aligned, the veneer stacks do not have even sides and do have jagged edges, and the veneer stacks have bulges of low and high spots.

In addition, both prior art full and partial sheet of veneer stacking methods and systems require significant human interaction with complicated machines and significant human manipulation of veneer. This results in numerous injuries including significant splinter injuries, machine injuries, fatigue, and worker burnout. As a result, the turnover of human workers employed in the veneer stacking processes is very high. This means significant worker turn-around and large numbers of inexperienced workers on the line at any given time. This further adds to the potential for injury and wasted/underutilized resources.

What is needed is a method and system for full and partial sheet of veneer grading and stacking that addresses the shortcoming of prior art methods and systems for full and partial sheet of veneer stacking and thereby provides a solution to the long standing problem of providing a method and system for full and partial sheet of veneer stacking that includes improved veneer scanning and grading methods, produces more consistent and safer veneer stacks, is less expensive to operate, and is safer than currently available methods and systems for full and partial sheet of veneer stacking.

SUMMARY

Embodiments of the present disclosure provide an effective and efficient technical solution to the long-standing technical problem of providing a method and system for full and partial sheet of veneer stacking that includes improved veneer scanning and grading methods, produces more consistent and safer veneer stacks, is less expensive to operate, and is far safer than currently available methods and systems for full and partial sheet of veneer stacking.

In one embodiment, individual full or partial sheets of veneer are provided to one or more vision systems at one or more vision system locations along a veneer analysis and selection conveyor. The one or more vision systems are then used to generate images of the individual full or partial sheets of veneer and precisely determine the dimensions of each individual full or partial sheet of veneer. In one embodiment, the one or more vision systems are also used to analyze the surface of each individual full or partial sheet of veneer, quickly and automatically, and then assign a grade to each individual full or partial sheet of veneer.

In accordance with the disclosed embodiments, the dimensions and assigned grade for each individual full or partial sheet of veneer are then used by one or more veneer selection and stacking robot control systems to control the operation of one or more veneer selection and stacking robots.

The one or more veneer selection and stacking robots are then used to independently move individual full or partial sheets of veneer from the veneer analysis and selection conveyor system to an appropriate veneer stack based on the grade assigned to the individual full or partial sheet by the one or more vision systems.

In one embodiment, the determined dimensions of each individual full or partial sheet of veneer are used by the one or more veneer selection and stacking robots to place the individual full or partial sheet of veneer on the appropriate veneer stack such that the resulting veneer stacks have relatively uniform edges, top surfaces, and are virtually free of jagged edges and/or bulges of low and/or high areas.

In particular, in one embodiment, full or partial sheets of veneer are passed from a dyer outfeed conveyor to a veneer analysis and selection conveyor. In one embodiment, the individual full or partial sheets of veneer are provided to one or more vision systems at one or more vision system locations along the veneer analysis and selection conveyor. The one or more vision systems are then used to generate images of the individual full or partial sheets of veneer and these images are processed to generate dimensions data for each individual full or partial sheet of veneer. In one embodiment, the dimensions data for each individual full or partial sheet of veneer includes data representing the relative location, orientation, and physical dimensions of each individual full or partial sheet of veneer quickly and automatically.

In addition, in one embodiment, the one or more vision systems are used to quickly and automatically analyze the surface of each individual full or partial sheet of veneer and generate grading data for each individual full or partial sheet of veneer representing a grade assigned to each individual full or partial sheet of veneer.

In accordance with the disclosed embodiments, the dimensions data and grading data for each individual full or partial sheet of veneer is provided to one or more veneer selection and stacking robot control systems associated with one or more local robotic veneer stacking cells. In one embodiment, the one or more veneer selection and stacking robot control systems generate veneer selection and stacking robot control signals based on analysis of the dimensions data and grading data for each individual full or partial sheet of veneer. The generated veneer selection and stacking robot control signals are then used to control the operation of one or more veneer selection and stacking robots included in the one or more local robotic veneer stacking cells.

In response to the received veneer selection and stacking robot control signals, the one or more veneer selection and stacking robots are then used to locally and independently move each individual full or partial sheet of veneer from the veneer analysis and selection conveyor system to an appropriate veneer stack based on the grade assigned to the individual full or partial sheet by the one or more vision systems.

In one embodiment, the dimensions data is used to generate veneer selection and stacking robot control signals that direct the one or more veneer selection and stacking robots to place the individual full or partial sheet of veneer on the appropriate veneer stack such that the resulting veneer stacks have relatively uniform edges, relatively level top surfaces, and are virtually free of jagged edges and/or bulges of low and/or high areas.

In contrast to prior art full and partial sheet of veneer stacking methods and systems, the disclosed embodiments use a vision system to accurately identify the dimensions of the full or partial sheets of veneer and accurately and consistently assign a grade to the full or partial sheets of veneer before the full or partial sheets of veneer are placed in any veneer stack for further processing. Consequently, using the disclosed embodiments, the quality of veneer fed into process is efficiently and effectively determined during the veneer stacking operation. In this way defects that can cause products created using the veneer stacks to be rejected downstream are detected before significant time and energy has been devoted to the processing of the veneer. In addition, by consistently and accurately assigning a grade to the full or partial sheets of veneer before the full or partial sheets of veneer are placed in any veneer stack for further processing, individual full or partial sheet of veneer can be used in the most effective and valuable way.

In addition, as noted above and discussed in more detail below, even if prior art inspection and grading systems were employed, prior art inspection and grading systems can be error prone and lead to inaccurate images of veneer sheets being taken, which can result in the system improperly grading veneer sheets. In contrast, as discussed in more detail below, the disclosed embodiments use a vision system that can capture images of entire surfaces of full or partial sheets of veneer and therefore are far less error prone, are faster, and can require less processing power.

In addition, in contrast to prior art full or partial sheet of veneer stacking methods and systems, using the disclosed embodiments, human workers are no longer assigned an unrealistic set of tasks to be performed in an unrealistic amount of time. This is because the disclosed embodiments perform the visual grading of full or partial sheets of veneer automatically and then use veneer selection and stacking robots to move the full or partial sheets of veneer from the conveyor to the appropriate veneer stack. In one embodiment, the veneer selection and stacking robots use selectively activated vacuum arms that are faster than humans and are far less likely to damage the relatively fragile full or partial sheets of veneer. In addition, the disclosed embodiments perform analysis of the dimensions data of each full or partial sheet of veneer and use this analysis to ensure the full or partial sheets of veneer are added to the appropriate veneer stack in such a way that the dimensions of the veneer stacks are consistent, that the edges of each veneer stack are as even as possible, and that the veneer stacks are relatively bulge free.

In addition, in contrast to prior art full or partial sheet of veneer stacking methods and systems, since the disclosed embodiments do not require significant human interaction with complicated machines and significant human manual manipulation of veneer the numerous injuries associated with prior art full or partial sheet of veneer stacking methods and systems, including significant splinter injuries, machine injuries, fatigue, and worker burnout, are minimized and/or avoided completely.

Consequently, the disclosed embodiments provide an effective and efficient technical solution to the long-standing technical problem of providing a method and system for full and partial sheet of veneer stacking that includes improved wood product scanning and grading methods, produces more consistent and safer veneer stacks, is less expensive to operate, and is far safer than currently available methods and systems for full and partial sheet of veneer stacking.

BRIEF DESCRIPTION OF THE DRAWINGS

FIGS. 2A-2C show illustrations of a prior art line scan system.

FIG. 2F shows an ideal full sheet of veneer stack and a typical full sheet of veneer stack created using a prior art full sheet of veneer stacking system.

FIG. 2I shows an ideal partial sheet of veneer stack and a typical partial sheet of veneer stack created using a prior art partial sheet of veneer stacking system.

Figure 1:
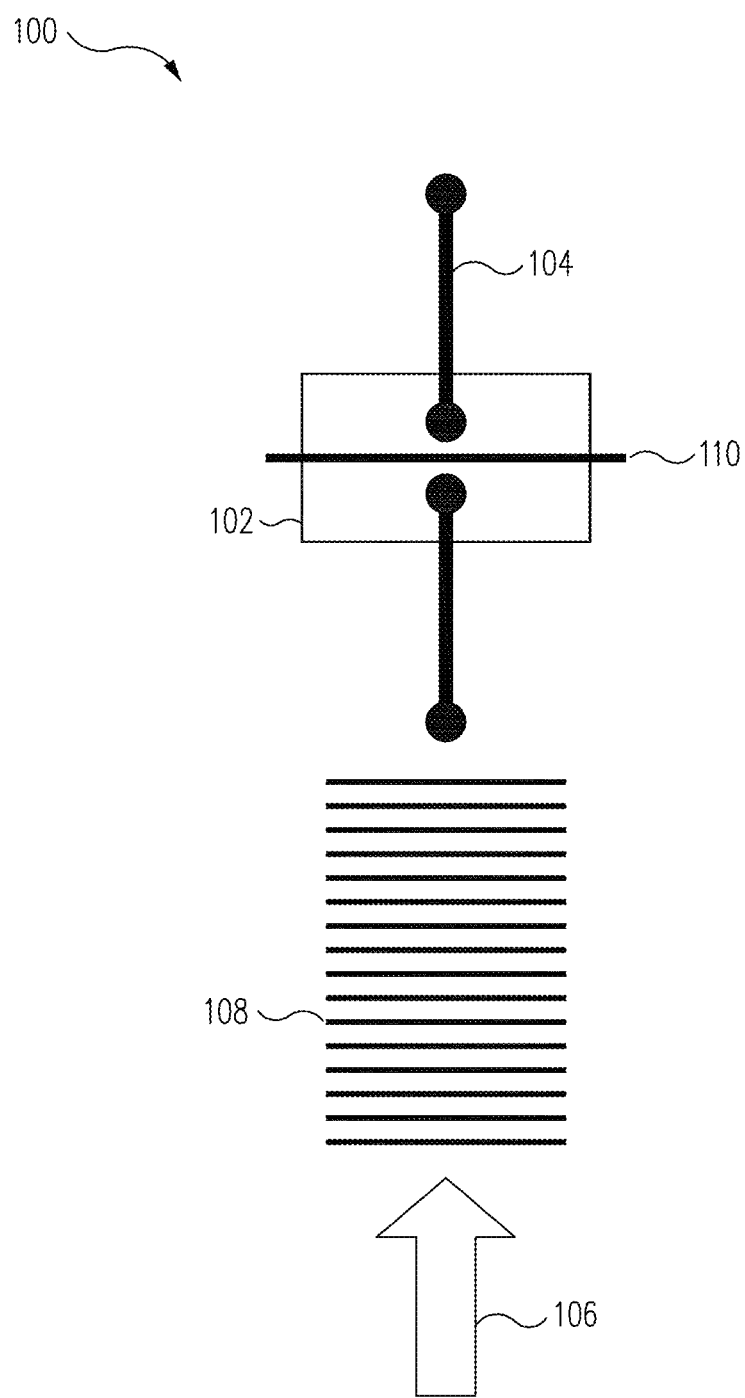
FIG. 1 shows a block diagram of a prior art system for grading veneer.

Common reference numerals are used throughout the figures and the detailed description to indicate like elements. One skilled in the art will readily recognize that the above figures are merely illustrative examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, or described below. Rather, these exemplary embodiments are provided to allow a complete disclosure that conveys the principles of the invention, as set forth in the claims, to those of skill in the art.

Figure 3:
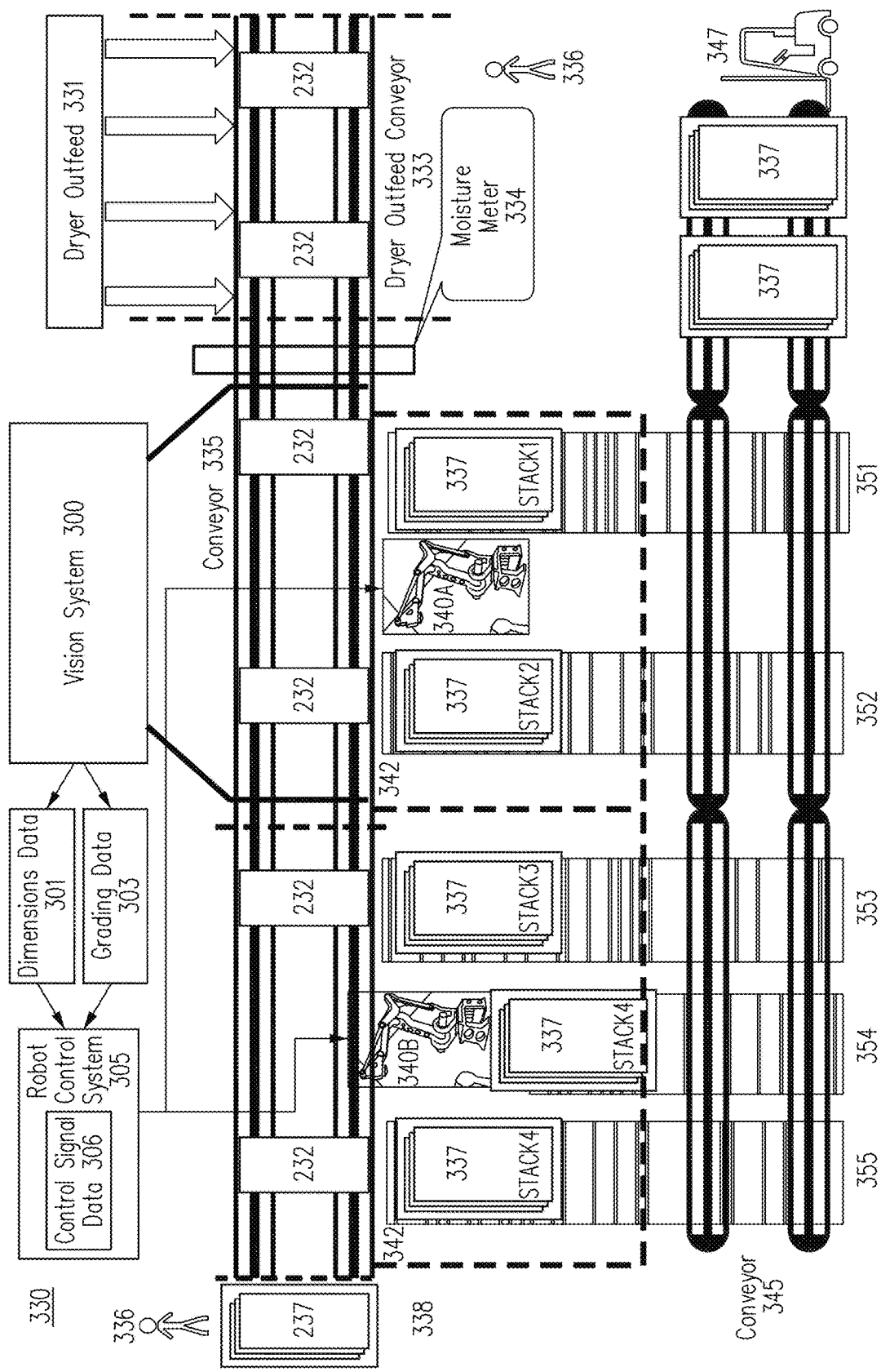
FIG. 3 is a block diagram of a full sheet of veneer grading and stacking system in accordance with one embodiment.

FIG. 3 is a block diagram of a full sheet of veneer grading and stacking system 330 in accordance with one embodiment. Full sheet of veneer grading and stacking system 330 includes dryer outfeed 331 where individual full sheets of veneer 232 are dropped onto dryer outfeed conveyor 333. Full sheets of veneer 232 can be created to almost any size desired. However, 4×8 feet are typical dimensions for each full sheet of veneer 232. As will be discussed below, for safety reasons and for production efficiency, the dimensions of the stacks of full sheets of veneer 232 to be created should ideally be as close to the dimensions of the individual full sheets of veneer 232 as possible. As also discussed below, unlike currently available systems, full sheet of veneer grading and stacking system 330 is well suited by design to accomplish this task.

From dryer outfeed conveyor 333 the individual full sheets of veneer 232 pass through moisture meter 334 where the moisture content of the individual full sheets of veneer 232 is determined. In some cases, if the moisture content of an individual full sheet of veneer 232 is determined to be unacceptable, that specific individual full sheet of veneer 232 is so marked by moisture meter 334 and that individual full sheet of veneer 232 is processed, or removed from processing, accordingly. In some cases, the moisture level of individual full sheets of veneer 232 can be used in part to determine a grade of the individual full sheet of veneer 232.

From moisture meter 334, the individual full sheets of veneer 232 are passed to veneer analysis and selection conveyor 335. In one embodiment, the individual full sheets of veneer 232 are conveyed by veneer analysis and selection conveyor 335 to vision system 300. Vision system 300 is representative of one or more vision systems at one or more vision system locations/positions along veneer analysis and selection conveyor 335 and therefore the inclusion of the single vision system 300 in FIG. 3 is not limiting.

As discussed in more detail below, in one embodiment, vision system 300 is used to generate image data associated with each of the individual full sheets of veneer 232. As also discussed in more detail below, this image data is then processed to generate dimensions data 301 for each individual full sheet of veneer 232. In one embodiment, the dimensions data 301 for each individual full sheet of veneer 232 includes data representing the relative location, orientation, and physical dimensions of each individual full sheet of veneer 232.

In addition, as discussed in more detail below, in one embodiment, vision system 300 is also used to analyze the surface of each individual full sheet of veneer quickly, consistently, and automatically 232 and generate grading data 303 for each individual full sheet of veneer 232. grading data 303 represents a grade assigned to each individual full sheet of veneer 232.

In accordance with the disclosed embodiments, the dimensions data 301 and grading data 303 for each individual full sheet of veneer 232 is provided to robot control system 305. Robot control system 305 is representative one or more veneer selection and stacking robot control systems associated with one or more local robotic veneer stacking cells 342. Therefore, the number of robot control systems is not limited to the single robot control system 305 shown. In one embodiment, robot control system 305 generates veneer selection and stacking robot control signal data 306 representing veneer selection and stacking robot control signals based on analysis of the dimensions data 301 and grading data 303 for each individual full sheet of veneer 232.

The generated veneer selection and stacking robot control signals represented by veneer selection and stacking robot control signal data 306 are then provided to local robotic veneer stacking cells 342 where they are used to control the operation of one or more veneer selection and stacking robots 340A and 340B included in the one or more local robotic veneer stacking cells 342. In various embodiments, the number of local robotic veneer stacking cells and veneer selection and stacking robots can be any number desired. Consequently, the two local robotic veneer stacking cells 342 and veneer selection and stacking robots 340A and 340B shown in FIG. 3 is not limiting.

In one embodiment, in response to the veneer selection and stacking robot control signals represented by veneer selection and stacking robot control signal data 306, veneer selection and stacking robots 340A and 340B select specific full sheets of veneer 232 from veneer analysis and selection conveyor 335 and move the selected full sheets of veneer 232 from veneer analysis and selection conveyor 335 to the appropriate veneer stacks 337. In this way, veneer stacks 337 of individual full sheets of veneer 232 are created that are veneer stacks 337 of the respectively consistent grade of individual full sheets of veneer 232. The size of the veneer stacks 337, e.g., the number of individual full sheets of veneer 232 in each veneer stack 337, is typically predetermined.

As discussed above, veneer is a type of wood product that is manufactured into full or partial sheets. As they are manufactured, various defects may exist in the full or partial veneer sheets. Consequently, depending on the number and type of defects on a particular full sheet of veneer 232, that full sheet of veneer 232 may be unsatisfactory for use in particular applications.

Accordingly, is important that full sheets of veneer 232 are accurately and consistently graded following manufacture because this grade determines the value and the possible uses for which a full sheet of veneer 232 is suitable. A grade assigned to a full sheet of veneer 232 can also be used to determine its best use; for example, whether it is suitable as a face sheet for plywood, whether it is suitable for clipping and edge gluing to form a sheet, whether it is suitable for use in laminated wood beams, should be discarded, or is suitable for other uses.

As also discussed above, prior art full and partial sheet of veneer stacking methods and systems suffer from several serious drawbacks. For instance, using prior art methods and systems for producing layered wood products, the quality of veneer fed into process is often not efficiently and effectively inspected and graded during the veneer stacking operation. Therefore, undetected defects can cause products created using the prior art veneer stacks to be rejected downstream after significant time and energy has already been devoted to the panels, e.g., pressing is complete and panel quality is analyzed.

Indeed, as pointed out above, using typical prior art full sheet of veneer stacking methods and systems human workers are assigned an unrealistic set of tasks to be performed in an unrealistic amount of time. These include performing visual grading of full sheets of veneer as they move along the hand sort conveyor, manually moving full sheets of veneer from hand sort conveyor to the veneer stack associated with the visual and manual grading of the full sheets of veneer, without damaging the relatively fragile full sheets of veneer, and then adding full sheets of veneer to the appropriate veneer stack in such a way that the dimensions of the veneer stacks are consistent and that the edges of each veneer stack are as even as possible.

This is not realistic and the result is that full sheets of veneer are inconsistently and/or inaccurately graded, many full sheets of veneer are damaged, and the resulting veneer stacks more often than not do include numerous full sheets of veneer that are not aligned so the veneer stacks do not have even sides and do have jagged edges.

To address this issue, and in contrast to prior art full sheet of veneer stacking methods and systems, full sheet of veneer grading and stacking system 330 utilizes robot control systems, such as robot control system 305, to control veneer selection and stacking robots, such as veneer selection and stacking robots 340A and 340B to create veneer stacks 337 such that each of veneer stacks 337, e.g., veneer stack 1 through veneer stack 5, is associated with a different grade of full sheets of veneer 232. In addition, in one embodiment, veneer selection and stacking robots 340A and 340B are directed by the veneer selection and stacking robot control signals represented by veneer selection and stacking robot control signal data 306 to select different full sheets of veneer 232, to remove the full sheets of veneer 232 from veneer analysis and selection conveyor 335, and to place the full sheets of veneer 232 in a specific veneer stack 337, e.g., veneer stack 1 through veneer stack 5, based, at least in part on the grade indicated by the grading data 303 associated with the individual full sheets of veneer 232. Consequently, veneer stacks 337, e.g., veneer stack 1 through veneer stack 5, are made up of full sheets of veneer 232 accurately and consistently determined to be of the specific grade associated with that veneer stack 337, e.g., veneer stack 1 through veneer stack 5.

Figure 2D:
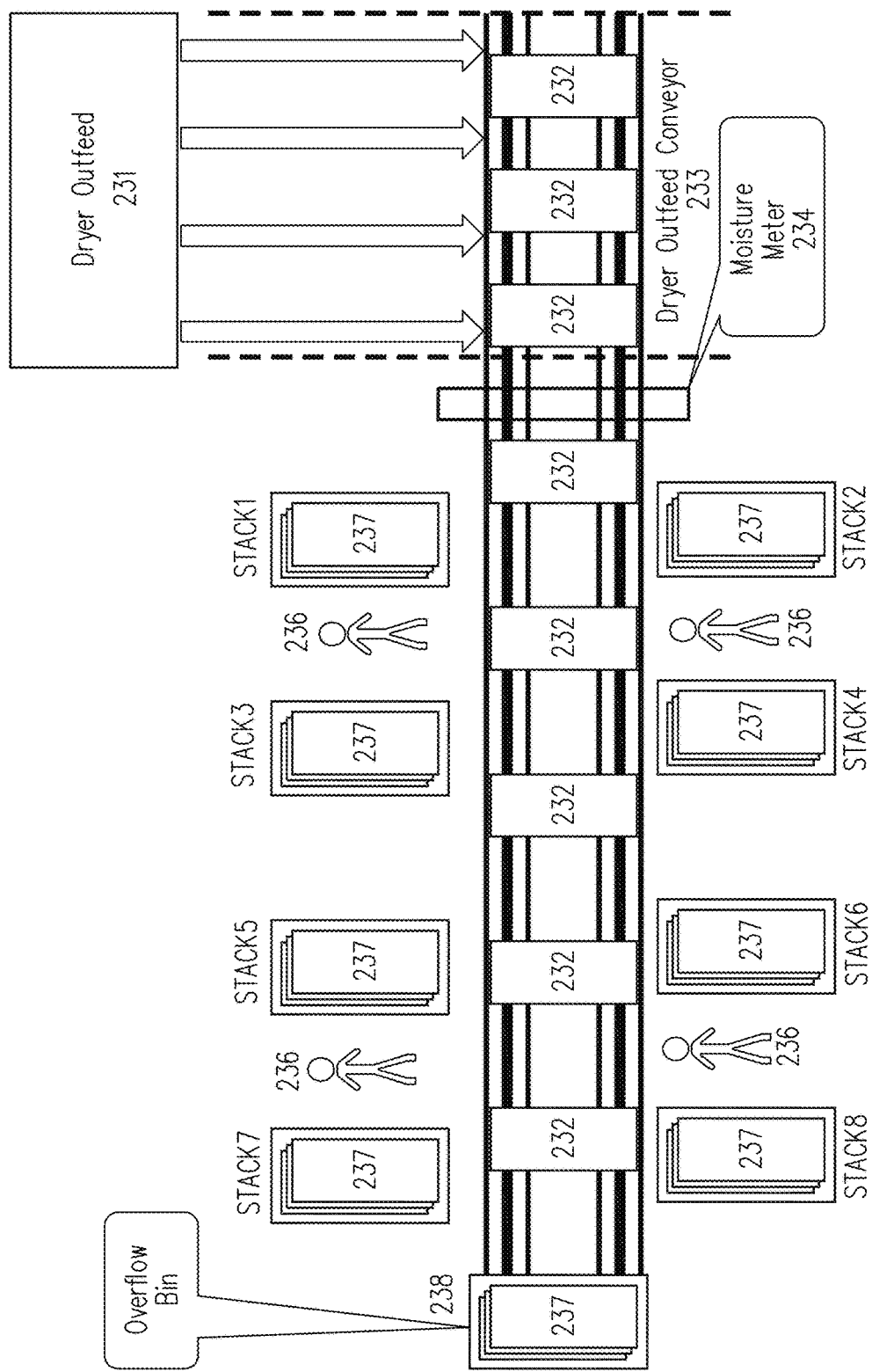
FIG. 2D is a block diagram of a prior art full sheet of veneer stacking system.
Figure 2E:
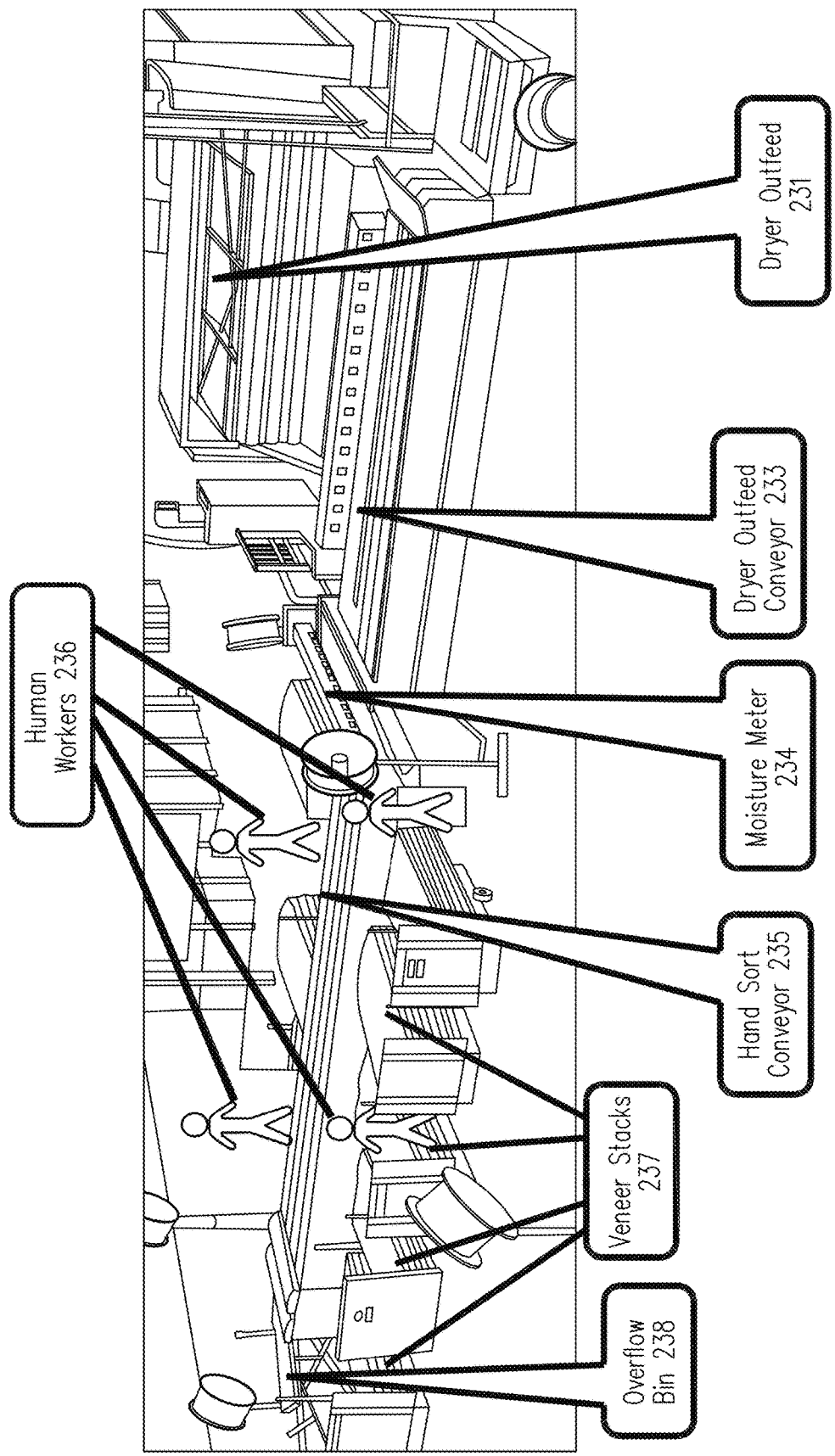
FIG. 2E is a hybrid diagram and photograph of a prior art full sheet of veneer stacking system.

In addition, as discussed below, the dimensions data 301 for each individual full sheet of veneer 232 is used to generate veneer selection and stacking robot control signals represented by veneer selection and stacking robot control signal data 306 that direct veneer selection and stacking robots 340A and 340B to add each individual full sheet of veneer 232 to its appropriate specific veneer stack 337, e.g., veneer stack 1 through veneer stack 5, so that the edges of the individual full sheets of veneer 232 are aligned. Consequently, the resulting veneer stacks 337 are aligned and have even edges/sides and do not have jagged edges. The result is that veneer stacks 337 are not only made up of sheets of veneer 232 accurately determined to be of the correct grade, but that the sheets of veneer 232 are stacked such that veneer stacks 337 resemble ideal veneer stack 237A of FIG. 2F rather than typical prior art veneer stack 237B of FIG. 2F.

This is in contrast to prior art full sheet of veneer stacking methods and systems, where, in addition to being given the virtually impossible task of grading and manually moving each full sheet of veneer from the conveyor to the appropriate grade veneer stack without damaging the full sheets of veneer, human workers were further tasked with adding full sheets of veneer to the appropriate veneer stack in such a way that the dimensions of the veneer stacks were consistent and that the edges of each veneer stack are as even as possible. As noted, this prior art requirement of human workers was not realistic and resulted in full sheets of veneer that were not only inconsistently and/or inaccurately graded, but that were often damaged and stacked such that numerous full sheets of veneer that were not aligned so the veneer stacks did not have even sides and included jagged edges.

Returning to FIG. 3, full sheet of veneer grading and stacking system 330 includes overflow bin 338. Like overflow bin 238 of FIG. 2D, in operation, any full sheets of veneer 232 that are of unacceptable dimensions, grade, or moisture content, are passed from full sheets of veneer 232 to overflow bin 338 for recycling and/or repurposing. However, unlike prior art full sheet of veneer stacking system 230 of FIG. 2D, using full sheet of veneer grading and stacking system 330 overflow bin 338 does not typically contain significant amounts of veneer that has been damaged, or simply not processed fast enough. This is because full sheet of veneer grading and stacking system 330 uses veneer selection and stacking robots 340A and 340B rather than human workers so that there is minimal damage to full veneer sheets 232 and processing time is not an issue.

As discussed in more detail below, one way the use of veneer selection and stacking robots 340A and 340B avoids damaging full sheets of veneer 232 is by utilizing selectively activated vacuum arms to move the full sheets of veneer 232 from veneer analysis and selection conveyor 335 and to place the full sheets of veneer 232 in a specific veneer stack 337.

In addition, as seen in FIG. 3, by employing veneer selection and stacking robots 340A and 340B rather than human workers, full sheet of veneer grading and stacking system 330 requires the use of as few as two human workers 336; one to position full sheets of veneer 232 onto dryer outfeed conveyor 333 and one to control the use of overflow bin 338.

As also seen in FIG. 3, in one embodiment, once veneer stacks 337, e.g., veneer stack 1, veneer stack, 2, veneer stack 3, veneer stack 4, and veneer stack 5 in FIG. 3, are created, veneer stack 1, veneer stack, 2, veneer stack 3, veneer stack 4, and veneer stack 5 are relayed to output conveyor 345 via relay conveyors/rollers 351, 352, 353, 354, and 355, respectively. At the end of output conveyor 345, veneer stacks 337 are picked up by forklift 347 which moves veneer stacks 337 to the location in the processing plant where they are needed.

As shown above, in contrast to prior art full sheet of veneer stacking methods and systems, full sheet of veneer grading and stacking system 330 uses a vision system 300 to accurately identify the dimensions of the full sheets of veneer 232 and accurately and consistently assign a grade to the full sheets of veneer 232 before the full sheets of veneer 232 are placed in any veneer stack 337 for further processing. Consequently, using full sheet of veneer grading and stacking system 330, the quality of veneer fed into process is efficiently and effectively determined during the veneer stacking operation. In this way defects that can cause products created using the veneer to be rejected downstream are detected before significant time and energy has been devoted to the processing of the veneer. In addition, by consistently and accurately assigning a grade to the full sheets of veneer 232 before the full sheets of veneer 232 are placed in any veneer stack 337 for further processing, individual full sheets of veneer 232 can be used in the most effective and valuable way.

In addition, as noted above and discussed in more detail below, even if prior art inspection and grading systems were employed, prior art inspection and grading systems can be error prone and lead to inaccurate images of veneer sheets being taken, which can result in the system improperly grading veneer sheets. In contrast, full sheet of veneer grading and stacking system 330 uses a vision system 300 that can capture images of entire surfaces of full sheets of veneer 232 and therefore is far less error prone, are faster, and can require less processing power.

In addition, in contrast to prior art full sheet of veneer stacking methods and systems, using full sheet of veneer grading and stacking system 330, human workers are no longer assigned an unrealistic set of tasks to be performed in an unrealistic amount of time. This is because using full sheet of veneer grading and stacking system 330 veneer selection and stacking robots 340A and 340B perform the grading of full or partial sheets of veneer 232 automatically and move the full sheets of veneer 232 from veneer analysis and selection conveyor 335 to the appropriate veneer stack 337. In one embodiment, veneer selection and stacking robots 340A and 340B use selectively activated vacuum arms that are faster than humans and are far less likely to damage the relatively fragile full sheets of veneer 232.

In addition, in contrast to prior art full sheet of veneer stacking methods and systems, full sheet of veneer grading and stacking system 330 performs analysis of the dimensions data 301 of each full sheet of veneer 232 and uses this analysis to ensure the full sheets of veneer 232 are added to the appropriate veneer stack 337 in such a way that the dimensions of the veneer stacks 337 are consistent, that the edges of each veneer stack 337 are as even as possible, and that the veneer stacks 337 are relatively bulge free.

In addition, in contrast to prior art full sheet of veneer stacking methods and systems, full sheet of veneer grading and stacking system 330 does not require significant human interaction with complicated machines and significant human manual manipulation of veneer. Consequently, the numerous injuries associated with prior art full or partial sheet of veneer stacking methods and systems, including significant splinter injuries, machine injuries, fatigue, and worker burnout, are minimized and/or avoided completely using full sheet of veneer grading and stacking system 330.

Consequently, full sheet of veneer grading and stacking system 330 provides an effective and efficient technical solution to the long-standing technical problem of providing a method and system for full sheet of veneer stacking that includes improved wood product scanning and grading methods, produces more consistent and safer veneer stacks, is less expensive to operate, and is far safer than currently available methods and systems for full and partial sheet of veneer stacking.

Figure 4:
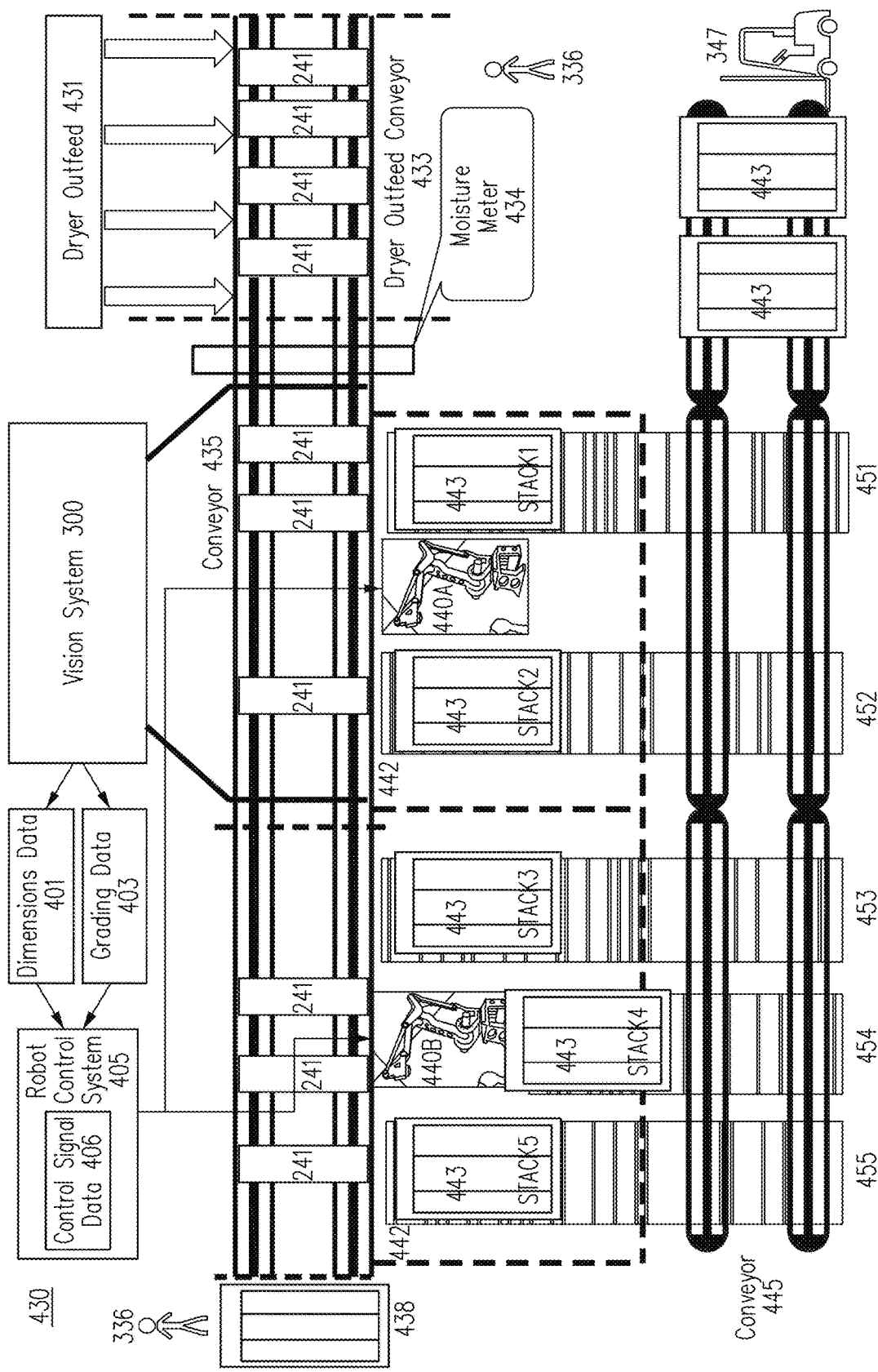
FIG. 4 is a block diagram of a partial sheet of veneer grading and stacking system in accordance with one embodiment.

FIG. 4 is a block diagram of a partial sheet of veneer grading and stacking system 430 in accordance with one embodiment. Partial sheet of veneer grading and stacking system 430 includes dryer outfeed 431 where individual partial sheets of veneer 241 are dropped onto dryer outfeed conveyor 433. Partial sheets of veneer 241, being partial strips of veneer, can be almost any length. However, partial sheets of veneer 241 typically have approximately the same height dimension which can be any consistent approximate height desired, with around 4 feet being common. As will be discussed below, for safety reasons and for production efficiency, the dimensions of the veneer stacks 443 of partial sheets of veneer 241 to be created would ideally be consistent in both height and width dimensions, with 4×8 feet being common. As also discussed below, unlike currently available systems, partial sheet of veneer grading and stacking system 430 is well suited by design to accomplish this task.

From dryer outfeed conveyor 433 the individual partial sheets of veneer 241 pass through moisture meter 434 where the moisture content of the individual partial sheets of veneer 241 is determined. In some cases, if the moisture content of an individual partial sheet of veneer 241 is determined to be unacceptable, that specific individual partial sheet of veneer 241 is so marked by moisture meter 434 and that individual partial sheet of veneer 241 is processed, or removed from processing, accordingly. In some cases, the moisture level of individual partial sheets of veneer 241 can be used in part to determine a grade of the individual partial sheet of veneer 241.

From moisture meter 434, the individual partial sheets of veneer 241 are passed to veneer analysis and selection conveyor 435. In one embodiment, the individual partial sheets of veneer 241 are conveyed by veneer analysis and selection conveyor 435 to vision system 300. Vision system 300 is representative of one or more vision systems at one or more vision system locations/positions along veneer analysis and selection conveyor 435 and therefore the inclusion of the single vision system 300 in FIG. 4 is not limiting.

As discussed in more detail below, in one embodiment, vision system 300 is used to generate image data associated with each of the individual partial sheets of veneer 241. As also discussed in more detail below, this image data is then processed to generate dimensions data 401 for each individual partial sheet of veneer 241. In one embodiment, the dimensions data 401 for each individual partial sheet of veneer 241 includes data representing the relative location, orientation, and physical dimensions of each individual partial sheet of veneer 241.

In addition, as discussed in more detail below, in one embodiment, vision system 300 is also used to analyze the surface of each individual partial sheet of veneer 241 quickly, consistently, and automatically and generate grading data 403 for each individual partial sheet of veneer 241. Grading data 403 represents a grade assigned to each individual partial sheet of veneer 241.

In accordance with the disclosed embodiments, the dimensions data 401 and grading data 403 for each individual partial sheet of veneer 241 is provided to robot control system 405. Robot control system 405 is representative one or more veneer selection and stacking robot control systems, associated with one or more local robotic veneer stacking cells 442. Therefore, the number of robot control systems is not limited to the single robot control system 405 shown. In one embodiment, robot control system 405 generates veneer selection and stacking robot control signal data 406 representing veneer selection and stacking robot control signals based on analysis of the dimensions data 401 and grading data 403 for each individual partial sheet of veneer 241.

The generated veneer selection and stacking robot control signals represented by veneer selection and stacking robot control signal data 406 are then provided to local robotic veneer stacking cells 442 where they are used to control the operation of one or more veneer selection and stacking robots 440A and 440B included in the one or more local robotic veneer stacking cells 442. In various embodiments, the number of local robotic veneer stacking cells and veneer selection and stacking robots can be any number desired. Consequently, the two local robotic veneer stacking cells 442 and veneer selection and stacking robots 440A and 440B shown in FIG. 4 is not limiting.

In one embodiment, in response to the veneer selection and stacking robot control signals represented by veneer selection and stacking robot control signal data 406, veneer selection and stacking robots 440A and 440B select specific partial sheets of veneer 241 from veneer analysis and selection conveyor 435 and move the selected partial sheets of veneer 241 from veneer analysis and selection conveyor 435 to the appropriate veneer stacks 443 to create layers of selected partial sheets of veneer 241 making up veneer stacks 443. In this way, veneer stacks 443 of layers of individual partial sheets of veneer 241 are created that are veneer stacks of the same grade of individual partial sheets of veneer 241. The size of the veneer stacks 443, e.g., the number of individual partial sheets of veneer 241 layers in each veneer stack 443, is typically predetermined.

As discussed above, veneer is a type of wood product that is manufactured into full or partial sheets. As they are manufactured, various defects may exist in the full or partial veneer sheets. Consequently, depending on the number and type of defects on a particular partial sheet of veneer 241, that partial sheet of veneer 241 may be unsatisfactory for use in particular applications.

Accordingly, is important that partial sheets of veneer 241 are accurately and consistently graded following manufacture because this grade determines the value and the possible uses for which a partial sheet of veneer 241 is suitable. A grade assigned to a partial sheet of veneer 241 can also be used to determine its best use.

As also discussed above, prior art partial sheet of veneer stacking methods and systems suffer from several serious drawbacks. For instance, using prior art methods and systems for producing layered wood products, the quality of veneer fed into process is often not efficiently and effectively inspected and graded during the veneer stacking operation. Therefore, undetected defects can cause products created using the veneer stacks to be rejected downstream after significant time and energy has already been devoted to the panels, e.g., pressing is complete and panel quality is analyzed.

Indeed, as pointed out above, using typical prior art partial sheet of veneer stacking methods and systems human workers are assigned an unrealistic set of tasks to be performed in an unrealistic amount of time. These include performing visual grading of partial sheets of veneer as they move along the hand sort conveyor, manually moving partial sheets of veneer from hand sort conveyor to the veneer stack associated with the visual and manual grading of the partial sheets of veneer, without damaging the relatively fragile partial sheets of veneer, and then adding partial sheets of veneer to the appropriate veneer stack in such a way that the dimensions of the veneer stacks are consistent and that the edges of each veneer stack are as even as possible.

It is also desirable to stack the layers of individual partial sheets of veneer 241 such that any gaps between individual partial sheets of veneer 241 in the layers of individual partial sheets of veneer 241 are staggered so that no bulges of low and high points are created in veneer stacks 443. If layers with bulges of high and low points are created in veneer stacks 443 due to repeatedly stacking partial sheets of veneer 241 in the same pattern, then the resultant veneer stack 443 will be unbalanced and potentially dangerous and difficult to process.

This is not realistic and the result is that partial sheets of veneer are inconsistently and/or inaccurately graded, many partial sheets of veneer are damaged, the resulting veneer stacks more often than not do include numerous partial sheets of veneer that are not aligned so the veneer stacks do not have even sides and do have jagged edges, and the resulting veneer stacks 443 do have bulges of high and low points.

To address this issue, and in contrast to prior art partial sheet of veneer stacking methods and systems, partial sheet of veneer grading and stacking system 430 utilizes robot control systems, such as robot control system 405, to control veneer selection and stacking robots, such as veneer selection and stacking robots 440A and 440B to create veneer stacks 443 such that each of veneer stacks 443, e.g., veneer stack 1 through veneer stack 5, is associated with a different grade of partial sheets of veneer 241. In addition, in one embodiment, veneer selection and stacking robots 440A and 440B are directed by the veneer selection and stacking robot control signals represented by veneer selection and stacking robot control signal data 406 to select different partial sheets of veneer 241, to remove the partial sheets of veneer 241 from veneer analysis and selection conveyor 435 and to place the partial sheets of veneer 241 in a specific veneer stack 443, e.g., veneer stack 1 through veneer stack 5, based, at least in part on the grade indicated by the grading data 403 associated with that individual partial sheet of veneer 241. Consequently, veneer stacks 443, e.g., veneer stack 1 through veneer stack 5, are made up of layers of partial sheets of veneer 241 accurately and consistently determined to be of the specific grade associated with that veneer stack 443, e.g., veneer stack 1 through veneer stack 5.

In addition, as discussed below, the dimensions data 401 for each individual partial sheet of veneer 241 is used to generate veneer selection and stacking robot control signals represented by veneer selection and stacking robot control signal data 406 that direct veneer selection and stacking robots 440A and 440B to add each individual partial sheet of veneer 241 in layers to its appropriate specific veneer stack 443, e.g., veneer stack 1 through veneer stack 5, so that the edges of the individual layers of partial sheets of veneer 241 are aligned. Consequently, the resulting veneer stacks 443 are made up of layers of partial sheets of veneer 241 that are aligned and have even edges/sides and do not have jagged edges. The result is that veneer stacks 443 are not only made up of sheets of veneer 232 accurately determined to be of the correct grade, but that the layers of sheets of veneer 232 are stacked such that veneer stacks 443 resemble ideal veneer stack 243A of FIG. 2I rather than typical prior art veneer stack 243B of FIG. 2I.

This is in contrast to prior art partial sheet of veneer stacking methods and systems, where, in addition to being given the virtually impossible task of grading and manually moving each partial sheet of veneer from the conveyor to the appropriate grade veneer stack without damaging the partial sheets of veneer, human workers were further tasked with adding layers of partial sheets of veneer to the appropriate veneer stack in such a way that the dimensions of the veneer stacks were consistent and that the edges of each veneer stack are as even as possible. In addition, using prior art partial sheet of veneer stacking methods and systems, the human workers were also required to stack the layers of individual partial sheets of veneer such that any gaps between individual partial sheets of veneer in the layers of individual partial sheets of veneer are staggered so that no bulges of low and high points are created in veneer stacks.

As noted, this prior art requirement of human workers was not realistic and resulted in partial sheets of veneer that were not only inconsistently and/or inaccurately graded, but that were often damaged and stacked such that numerous partial sheets of veneer that were not aligned so the veneer stacks did not have even sides and included jagged edges.

Figure 2G:
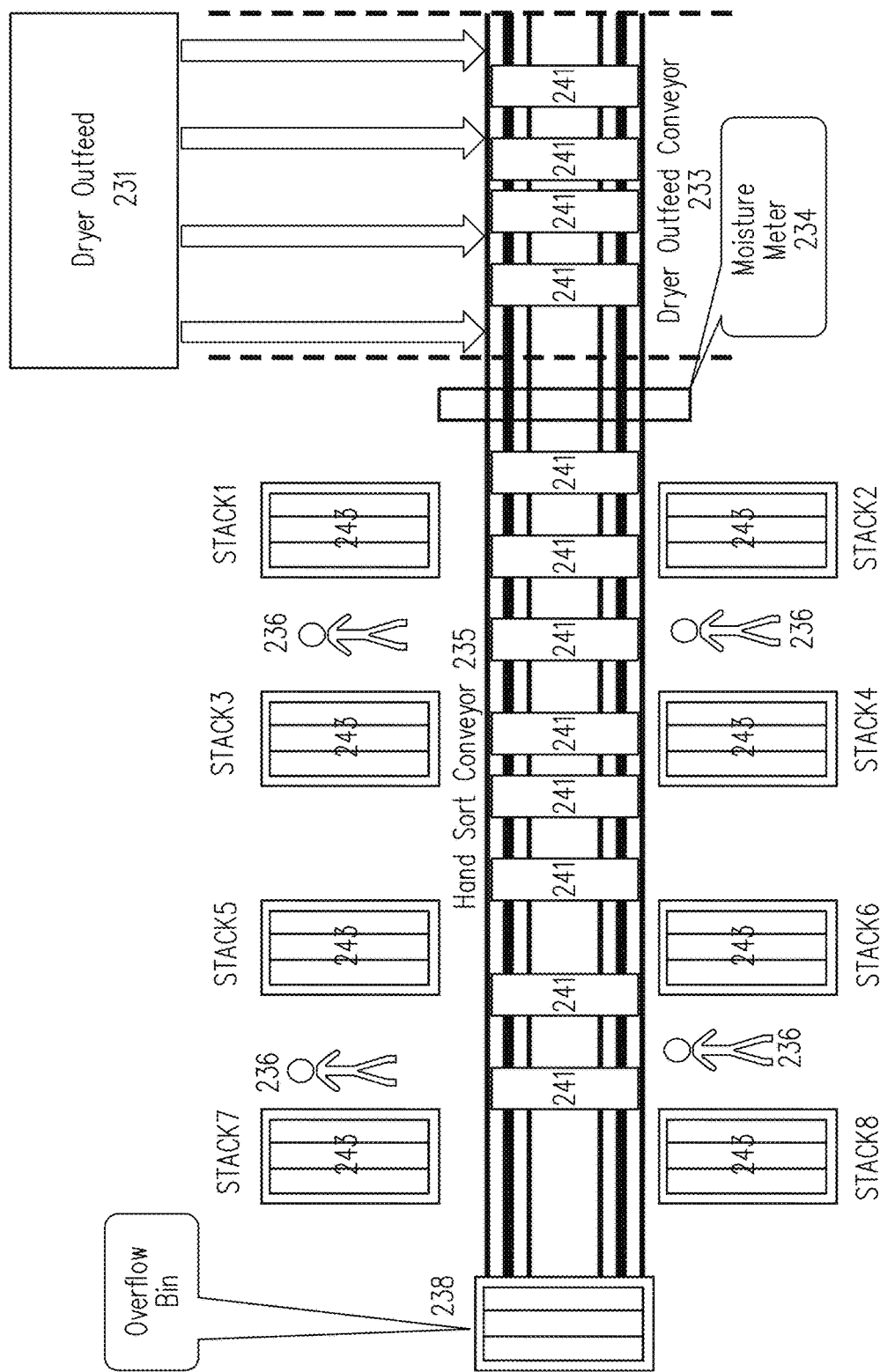
FIG. 2G is a block diagram of a prior art partial sheet of veneer stacking system.
Figure 2H:
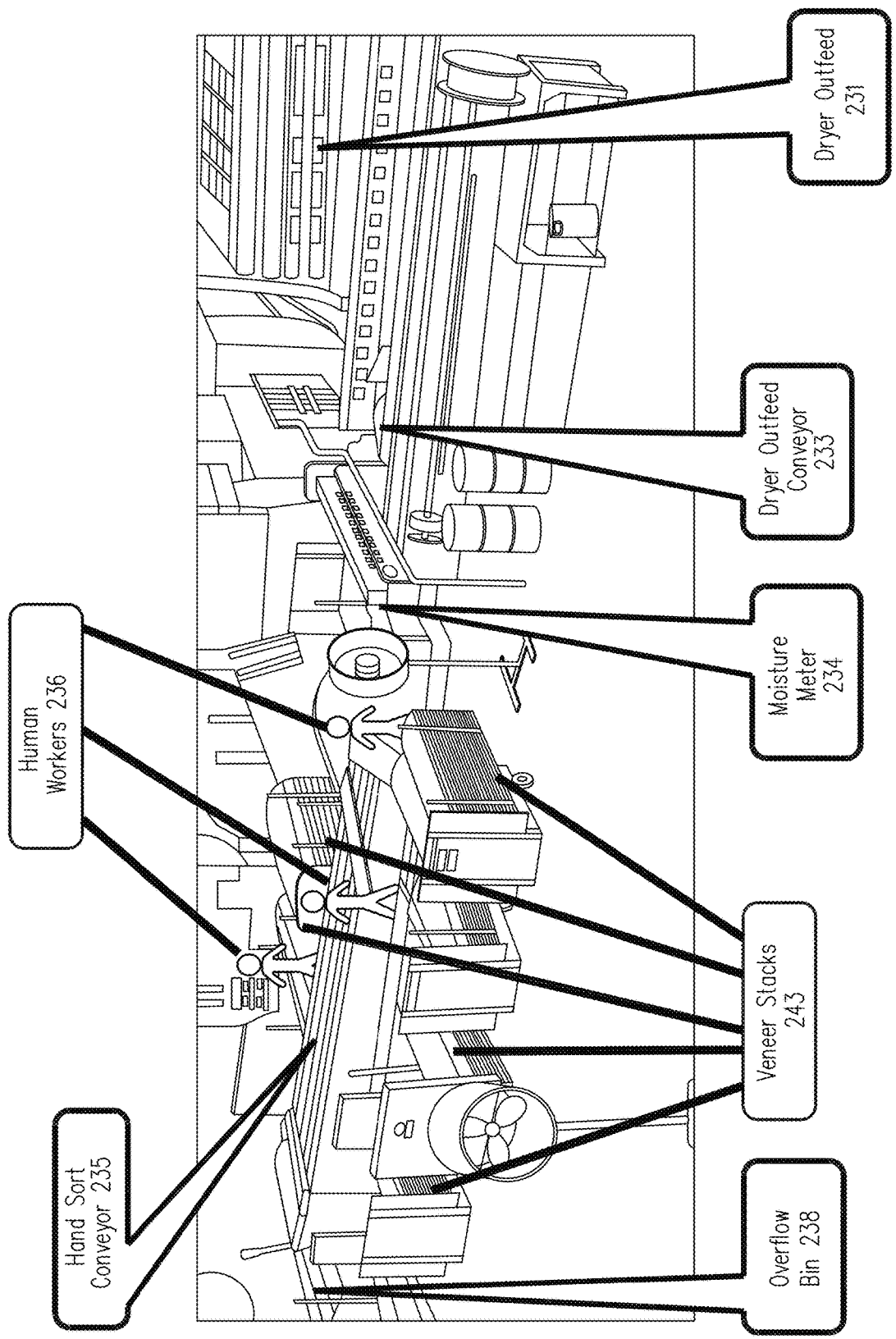
FIG. 2H is a photograph of a prior art partial sheet of veneer stacking system.

Returning to FIG. 4, partial sheet of veneer grading and stacking system 430 includes overflow bin 438. Like overflow bin 238 of FIG. 2G, in operation, any partial sheets of veneer 241 that are of unacceptable dimensions, grade, or moisture content, are passed from veneer analysis and selection conveyor 435 to overflow bin 438 for recycling and/or repurposing. However, unlike prior art partial sheet of veneer stacking system 240 of FIG. 2G, using partial sheet of veneer grading and stacking system 430 overflow bin 438 does not typically contain significant amounts of veneer that has been damaged, or simply not processed fast enough. This is because partial sheet of veneer grading and stacking system 430 uses veneer selection and stacking robots 440A and 440B rather than human workers so that there is minimal damage to partial veneer sheets 241 and processing time is not an issue.

As discussed in more detail below, one way the use of veneer selection and stacking robots 440A and 440B avoids damaging partial sheets of veneer 241 is by utilizing selectively activated vacuum arms to move the partial sheets of veneer 241 from veneer analysis and selection conveyor 435 and to place the layers of partial sheets of veneer 241 in a specific veneer stack 443.

In addition, as seen in FIG. 4, by employing veneer selection and stacking robots 440A and 440B rather than human workers, partial sheet of veneer grading and stacking system 430 requires the use of as few as two human workers 336; one to position partial sheets of veneer 241 onto dryer outfeed conveyor 433 and one to control the use of overflow bin 438.

As also seen in FIG. 4, once veneer stacks 443, e.g., veneer stack 1, veneer stack, 2, veneer stack 3, veneer stack 4, and veneer stack 5 in FIG. 4, are created, veneer stack 1, veneer stack, 2, veneer stack 3, veneer stack 4, and veneer stack 5 are relayed to output conveyor 445 via relay conveyors/rollers 451, 452, 453, 454, and 455, respectively. At the end of output conveyor 445, veneer stacks 443 are picked up by forklift 347 which moves veneer stacks 443 to the location in the processing plant where they are needed.

As shown above, in contrast to prior art partial sheet of veneer stacking methods and systems, partial sheet of veneer grading and stacking system 430 uses a vision system 300 to accurately identify the dimensions of the partial sheets of veneer 241 and accurately and consistently assign a grade to the partial sheets of veneer 241 before the partial sheets of veneer 241 are placed in any veneer stack 443 for further processing. Consequently, using partial sheet of veneer grading and stacking system 430, the quality of veneer fed into process is efficiently and effectively determined during the veneer stacking operation. In this way defects that can cause products created using the veneer to be rejected downstream are detected before significant time and energy has been devoted to the processing of the veneer. In addition, by consistently and accurately assigning a grade to the partial sheets of veneer 241 before the partial sheets of veneer 241 are placed in any veneer stack 443 for further processing, individual partial sheets of veneer 241 can be used in the most effective and valuable way.

In addition, as noted above and discussed in more detail below, even if prior art inspection and grading systems were employed, prior art inspection and grading systems can be error prone and lead to inaccurate images of veneer sheets being taken, which can result in the system improperly grading veneer sheets. In contrast, partial sheet of veneer grading and stacking system 430 uses a vision system that can capture images of entire surfaces of partial sheets of veneer 241 and therefore is far less error prone, is faster, and can require less processing power.

In addition, in contrast to prior art partial sheet of veneer stacking methods and systems, using partial sheet of veneer grading and stacking system 430, human workers are no longer assigned an unrealistic set of tasks to be performed in an unrealistic amount of time. This is because using partial sheet of veneer grading and stacking system 430 veneer selection and stacking robots 440A and 440B perform the grading of partial sheets of veneer automatically and move the partial sheets of veneer 241 from veneer analysis and selection conveyor 435 to the appropriate veneer stack 443 in layers. In one embodiment, veneer selection and stacking robots 440A and 440B use selectively activated vacuum arms that are faster than humans and are far less likely to damage the relatively fragile partial sheets of veneer 241.

In addition, in contrast to prior art partial sheet of veneer stacking methods and systems, partial sheet of veneer grading and stacking system 430 performs analysis of the dimensions data 401 of each partial sheet of veneer 241 and uses this analysis to ensure the partial sheets of veneer 241 are added to the appropriate veneer stack 443 in layers such that the dimensions of the veneer stacks 443 are consistent, that the edges of each veneer stack 443 are as even as possible, and that the veneer stacks 443 are relatively bulge free.

In addition, in contrast to prior art partial sheet of veneer stacking methods and systems, partial sheet of veneer grading and stacking system 430 does not require significant human interaction with complicated machines and significant human manual manipulation of veneer. Consequently, the numerous injuries associated with prior art full or partial sheet of veneer stacking methods and systems, including significant splinter injuries, machine injuries, fatigue, and worker burnout, are minimized and/or avoided completely using partial sheet of veneer grading and stacking system 430.

Consequently, partial sheet of veneer grading and stacking system 430 provides an effective and efficient technical solution to the long-standing technical problem of providing a method and system for partial sheet of veneer stacking that includes improved wood product scanning and grading methods, produces more consistent and safer veneer stacks, is less expensive to operate, and is far safer than currently available methods and systems for full and partial sheet of veneer stacking.

As seen in the discussion above, both full sheet of veneer grading and stacking system 330 and partial sheet of veneer grading and stacking system 430 use dimensions data and grading data generated by the vision systems 300 for each individual full or partial sheet of veneer. This dimensions data and grading data is then provided to one or more veneer selection and stacking robot control systems associated with one or more local robotic veneer stacking cells. In one embodiment, the one or more veneer selection and stacking robot control systems generate veneer selection and stacking robot control signals based on analysis of the dimensions data and grading data for each individual full or partial sheet of veneer. The generated veneer selection and stacking robot control signals are then used to control the operation of one or more veneer selection and stacking robots included in the one or more local robotic veneer stacking cells.

In response to the received veneer selection and stacking robot control signals, the one or more veneer selection and stacking robots are then used to locally and independently move each individual full or partial sheet of veneer from the veneer analysis and selection conveyor system to an appropriate veneer stack based on the grade assigned to the individual full or partial sheet by the one or more vision systems.

In one embodiment, the dimensions data is used to generate veneer selection and stacking robot control signals that direct the one or more veneer selection and stacking robots to place the individual full or partial sheet of veneer on the appropriate veneer stack such that the resulting veneer stacks have relatively uniform edges, top surfaces, and are virtually free of jagged edges and/or bulges of low and/or high areas.

In various embodiments, the dimensions data and grading data for each individual full or partial sheet of veneer is generated by one or more vision systems 300 that can include two or more cameras for capturing a black and white image of a full or partial sheet of veneer, with a first camera, capturing a color image of the full or partial sheet of veneer, with a second camera, determining from computer processing of the black and white image one or more of the dimensions of the full or partial sheet of veneer, the existence of voids within the full or partial sheet of veneer, and the presence of debris on the full or partial sheet of veneer, determining from computer processing of the color image whether colored defects are present in the full or partial sheet of veneer, and assigning a grade to the full or partial sheet of veneer based at least in part on the computer processing of the black and white image and the computer processing of the color image.

In some embodiments, the colored defects can comprise one or more of the presence of closed knots, the position of closed knots, the size and spacing of closed knots, the presence of pitch, the size and position of pitch, the presence of wane, the size and position of wane, and the presence of blue mold.

In some embodiments, the full or partial sheet of veneer can travel along a veneer analysis and selection conveyor of a production line and the first and second cameras can capture the black and white and color images of the full or partial sheet of veneer at a first location along the veneer analysis and selection conveyor.

In some embodiments, the first camera can capture a black and white image of an entire surface of the full or partial sheet of veneer facing the first camera and the second camera can capture a color image of the entire surface of the full or partial sheet of veneer facing the second camera.

In some embodiments, the first camera can capture a black and white image of a portion of the full or partial sheet of veneer without digitally stitching together multiple images and the second camera can capture a color image of the portion of the full or partial sheet of veneer without digitally stitching together multiple images.

In some embodiments, the full or partial sheet of veneer can be assigned an associated void or undersized grade based on the determination from the computer processing of the black and white image that one or more of the dimensions of the full or partial sheet of veneer are undersized in comparison to a reference or that voids exist in the full or partial sheet of veneer. The full or partial sheet of veneer can be sorted based on this grade.

In some embodiments where an associated void or undersized grade has not been assigned to the full or partial sheet of veneer, a grade can be assigned to the full or partial sheet of veneer based on one or more of the presence of closed knots, the position, size and spacing of closed knots, the presence of pitch, the size and position of pitch, the presence of wane, the size and position of wane, and the presence of blue mold as determined from the computer processing of the color image. The full or partial sheet of veneer can be sorted based upon this grade. In some embodiments, the full or partial sheet of veneer can be a sheet of wood veneer.

In some embodiments, the computer processing of the black and white image can comprise performing a comparison between the black and white image and a reference image. In some embodiments, the computer processing of the color image can comprise performing a comparison between the color image and a reference image. In some embodiments, the computer processing of the color image can comprise comparing data of the color image to reference data.

In some embodiments, the method and system can comprise determining a scaling factor between the full or partial sheet of veneer and the black and white image based at least in part on known dimensions of a reference image.

In some embodiments, the method and system can comprise auto-rotating the black and white image such that it is parallel with respect to a reference direction before performing the computer processing of the black and white image and auto-rotating the color image such that it is parallel with respect to the reference direction before performing the computer processing of the color image.

In some embodiments, the method and system can comprise translating the black and white image such that it has the same horizontal spacing as a reference image before performing the computer processing of the black and white image and translating the color image such that it has same horizontal spacing as the reference image before performing the computer processing of the color image.

In some embodiments, the method and system can further comprise determining from computer processing of the color image whether critical areas containing multiple defects are present in the full or partial sheet of veneer.

In another representative embodiment, a method and system can comprise storing a plurality of first images of full or partial sheets of veneer having a first grade in computer memory, storing a plurality of second images of full or partial sheets of veneer having a second grade in computer memory, capturing a black and white image of a full or partial sheet of veneer with a first camera, capturing a color image of a full or partial sheet of veneer with a second camera, performing a first series of comparisons between the plurality of first images and the black and white image with a computer, performing a second series of comparisons between the plurality of second images and the black and white image with the computer, performing a third series of comparisons between the plurality of first images and the color image with the computer, performing a fourth series of comparisons between the plurality of second images and the color image with the computer, and assigning one of the first grade or the second grade to the full or partial sheet of veneer based at least in part on one or more of the first series of comparisons, the second series of comparisons, the third series of comparisons, and the fourth series of comparisons.

In another representative embodiment, the method of system can comprise capturing a black and white image of a full or partial sheet of veneer with a first camera, capturing a color image of the full or partial sheet of veneer with a second camera, auto-rotating the black and white image such that it has the same orientation as a reference image, auto-rotating the color image such that it has the same orientation as the reference image, translating the black and white image such that it has the same horizontal spacing as the reference image, translating the color image such that it has the same horizontal spacing as the reference image, determining from computer processing of the black and white image one or more of the dimensions of the full or partial sheet of veneer, the existence of voids within the full or partial sheet of veneer, and the presence of debris on the full or partial sheet of veneer, determining from computer processing of the color image whether colored defects are present in the full or partial sheet of veneer, and assigning a grade to the full or partial sheet of veneer based at least in part on the computer processing of the black and white image and the computer processing of the color image.

In some embodiments, the method or system can comprise determining a scaling factor between the full or partial sheet of veneer and one of the black and white image or the color image based at least in part on known dimensions of the reference image.

In some embodiments, the first camera can capture a black and white image of an entire surface of the full or partial sheet of veneer facing the first camera and the second camera can capture a color images of the entire surface of the full or partial sheet of veneer facing the second camera.

In some embodiments, the first camera can capture a black and white image of a portion of the full or partial sheet of veneer without digitally stitching together multiple images and the second camera can capture a color image of the portion of the full or partial sheet of veneer without digitally stitching together multiple images.

In another representative embodiment, an apparatus can comprise a first camera to capture a black and white image of a full or partial sheet of veneer, a second camera to capture a color image of the full or partial sheet of veneer, and a vision system controller. The vision system controller can perform computer processing of the black and white image to determine one or more of the dimensions of the full or partial sheet of veneer, the existence of voids within the full or partial sheet of veneer, and the presence of debris on the full or partial sheet of veneer. The vision system controller can perform computer processing of the color image to determine whether colored defects are present in the full or partial sheet of veneer. The vision system controller can assign a grade to the full or partial sheet of veneer based at least in part on the computer processing of the black and white image and the computer processing of the color image.

In some embodiments, the first and second cameras can be mounted above a veneer analysis and selection conveyor of a production line in a position to capture respective black and white and color images of the full or partial sheet of veneer at a first location of the full or partial sheet of veneer along the veneer analysis and selection conveyor.

In some embodiments, the first camera can be configured to capture a black and white image of an entire surface of the full or partial sheet of veneer facing the first camera and the second camera can be configured to capture a color image of the entire surface of the full or partial sheet of veneer.

In some embodiments, the vision system controller can be configured to determine a scaling factor between the full or partial sheet of veneer and the black and white image based at least in part on known dimensions of a reference image.

In some embodiments, the first camera can be configured to capture a black and white image of an entire surface of the full or partial sheet of veneer facing the camera and the second camera can be configured to capture a color image of the entire surface of the full or partial sheet of veneer.

In some embodiments, the vision system controller can be configured to auto rotate the black and white image and the color image such that the black and white image and the color image have the same orientation as a reference image.

In some embodiments, the vision system controller can be configured to translate the black and white image and the color image such that the black and white image and the color image are each oriented to match the orientation of the reference image.

As noted, the one or more vision systems are used to generate images of the individual full or partial sheets of veneer and these images are processed to generate dimensions data for each individual full or partial sheet of veneer. In one embodiment, the dimensions data for each individual full or partial sheet of veneer includes data representing the relative location, orientation, and physical dimensions of each individual full or partial sheet of veneer quickly and automatically.

In addition, in one embodiment, the one or more vision systems are also used to quickly and automatically analyze the surface of each individual full or partial sheet of veneer and generate grading data for each individual full or partial sheet of veneer representing a grade assigned to each individual full or partial sheet of veneer.

Figure 5:
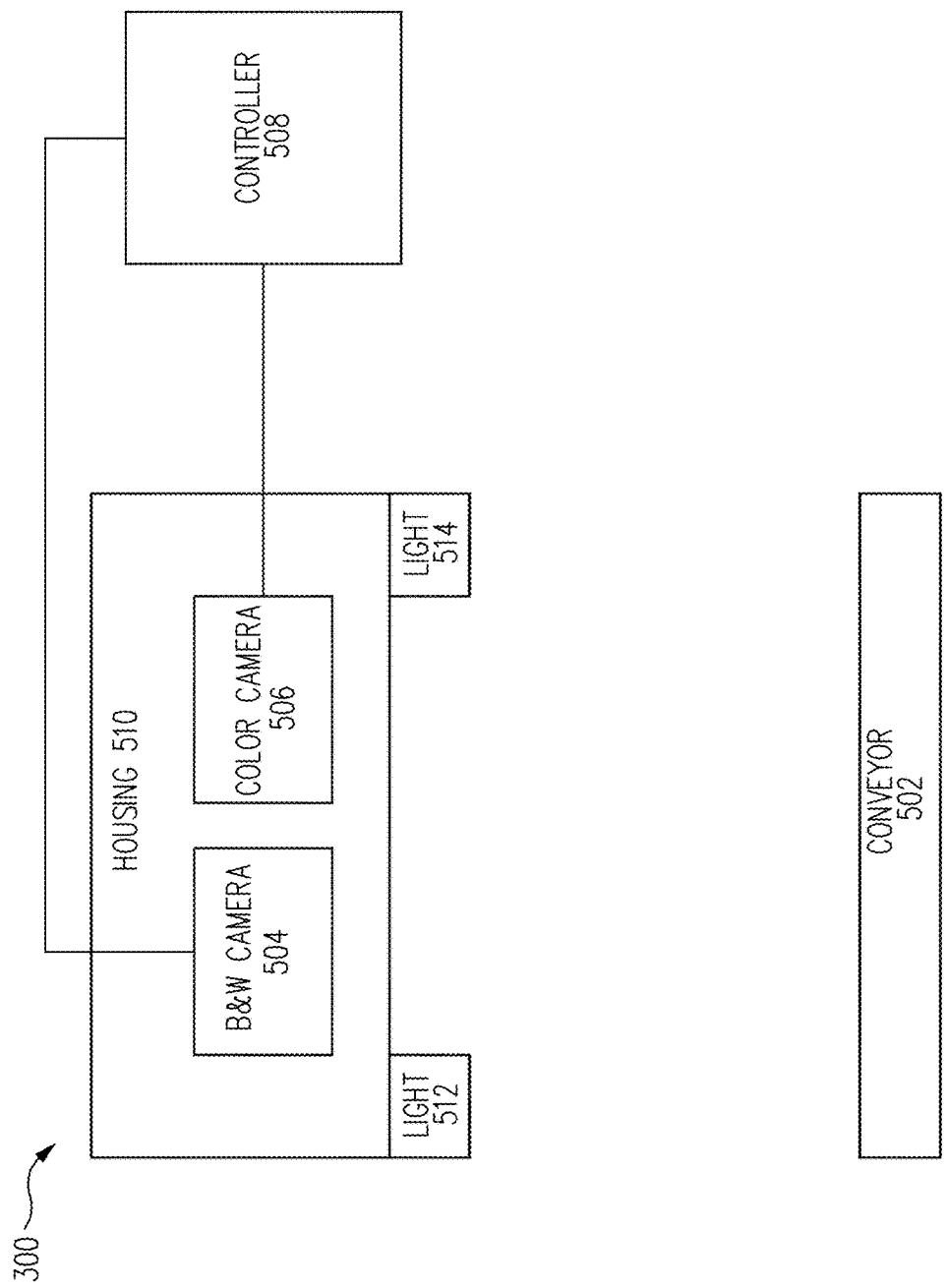
FIG. 5 shows a block diagram of an example of the vision system for veneer inspection and grading of FIGS. 3 and 4 in accordance with one embodiment.
Figure 6:
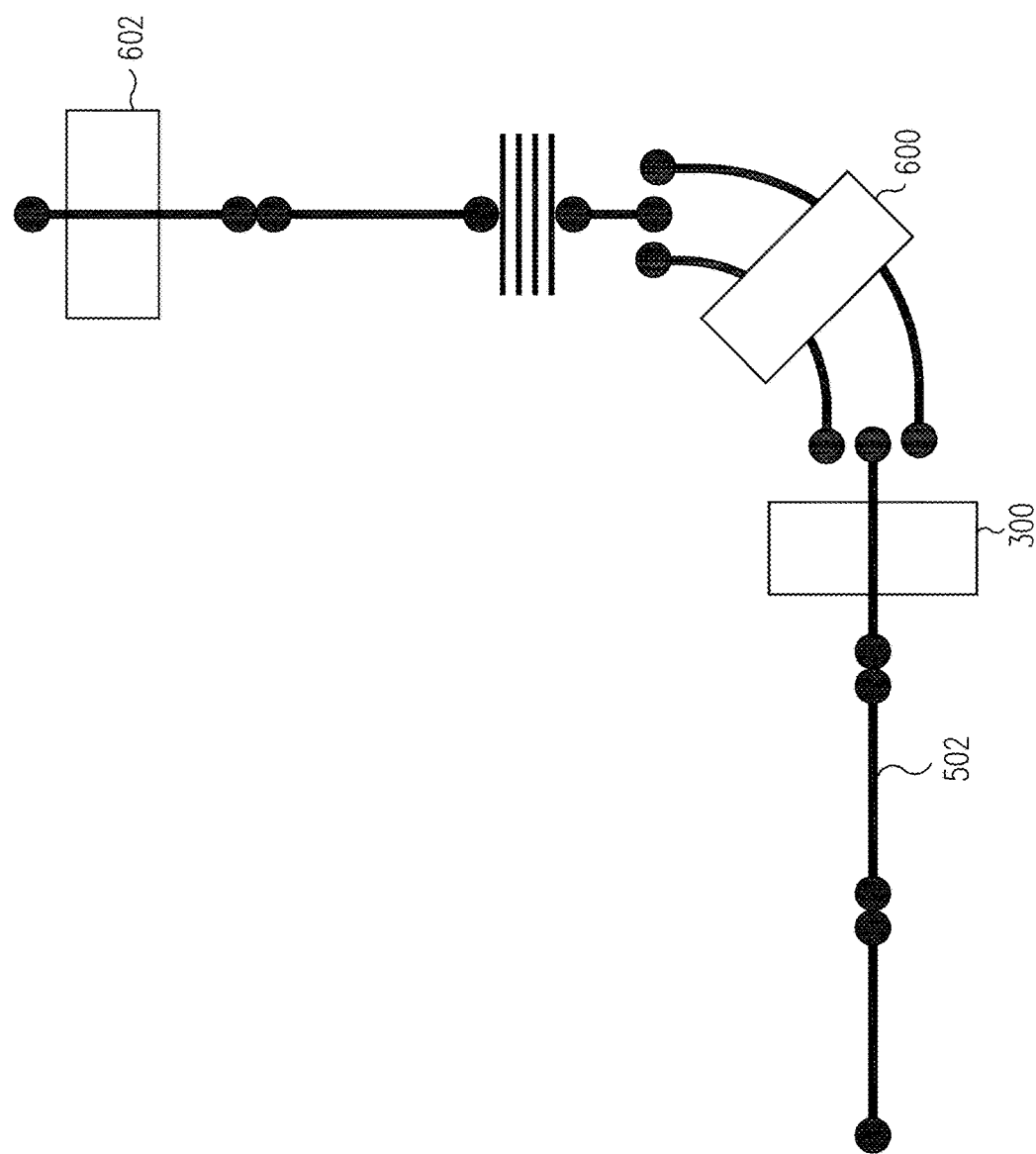
FIG. 6 shows a block diagram of an example conveyor for use with the vision system of FIG. 5.

FIG. 5 shows a block diagram of the vision system 300 of FIGS. 3 and 4 in accordance with one embodiment for generating dimensions data and grading data veneer according to one embodiment. In the example of FIG. 5, the vision system 300 can grade veneer sheets as they move along a conveyor 502, of a production line, such as veneer analysis and selection conveyor 335 and such as veneer analysis and selection conveyor 435 of FIGS. 3 and 4, as shown in FIG. 6. For convenience, the focus of the description below is on the use of the system with veneer, without excluding the use in connection with other wood comprising products. FIG. 6 shows an overhead view of an example conveyor 502 such as veneer analysis and selection conveyor 335 and such as veneer analysis and selection conveyor 435 of FIGS. 3 and 4. The conveyor 502 can have any shape and can move sheets of veneer such as veneer sheets 600, 602 along its length using belts, a vacuum system, or any other mode of transporting the veneer sheets. Of note, veneer sheets 600, 602 can be either full sheets of veneer, such as full sheets of veneer 232 of FIG. 3, or partial sheets of veneer, such as partial sheets of veneer 241 of FIG. 4. In contrast to the line-scan system discussed above, a greater variety of veneer transporting options can be used with the conveyor 502. As veneer sheets are moved along by the conveyor 502, they pass under the vision system 300 where they are graded as disclosed herein.

The vision system 300 comprises both a black and white camera 504 and a color camera 506. Each camera desirably captures an area scan image of the entire area of the wood product, such as a veneer sheet, to be analyzed; which can be an entire surface area of the wood product or a portion thereof. As a result, desirably there is no need to stitch images together to form the entire area of the wood product to be analyzed. As used herein, the phrases "entire surface of a sheet facing a camera" or "entire surface of a wood product facing a camera" means the entire surface of the sheet or wood product facing the camera and not including the sides thereof that are perpendicular to the surface facing the camera. Although stitching of images together can be performed using both color and black and white cameras in accordance with one embodiment, by capturing an area scan image, errors introduced from stitching together portions of an image to form a composite image are eliminated. In addition, capturing a single area scan of each veneer sheet or other wood product allows the vision system 300 to operate at a higher rate of speed than veneer grading systems that use line scan technology since it takes longer to capture a series of line scans rather than a single area scan.

In some examples, the cameras 504, 506 can each capture an image of a portion of the veneer sheet to be analyzed and/or graded. This portion of the veneer sheet can be less than the entire sheet. In these examples, the black and white camera 504 and the color camera 506 can each capture an area scan of this entire portion of the veneer sheet without the need to digitally stitch together multiple line scans. The cameras 504, 506 can be positioned above a particular location along the conveyor such that they can capture respective black and white and color images of the veneer sheet as the sheet is moved by the conveyor past that location. In some examples, the cameras 504, 506 can be positioned below the conveyor, to the sides of the conveyor, or at various angles with respect to the conveyor. The cameras can be positioned at locations with respect to the conveyor to best view a particular material being graded.

The use of a plurality of cameras also allows for more accurate grading of veneer than is possible using only a single camera. In particular, black and white images can be used for, and are typically preferable for measuring the dimensions of a veneer sheet and identifying void areas within the sheet to generate dimensions data; while color images can be used for and are typically preferable for detecting defects on the surface of the sheet to generate grading data. By using both types of cameras to grade veneer sheets, the vision system 300 can take advantage of the defect detection strengths of each camera type. That is, the vision system 300 can use the black and white camera to detect certain defects of veneer sheets and the color camera to detect others. This improves the quality of veneer grading performed by the vision system 300. More than one of each type of camera can be used.

In some embodiments, infrared cameras can be used in addition to black and white and color cameras 504, 506 to capture heat signatures from veneer. In these embodiments, veneer temperature can be considered when assigning a grade to the veneer. In embodiments where a green veneer sheet is to be graded, infrared cameras can be used to measure temperature deviations on the sheet, which can be an indication of moisture content that can be used in sorting the sheet. In embodiments involving intermediate processes, infrared cameras can be used to measure the distribution of heat or whether an appropriate temperature for bonding to occur has been reached. Infrared cameras can also be used to monitor catalytic processes where heat is generated to determine if a process is within certain parameters (e.g., a desired ratio of resin and wood chips in OSB). Deviations from ideal parameters can indicate improper mix ratios or application issues, which can affect the strength of a finished product.

In some embodiments, cameras that can detect non-visible portions of the infrared spectrum can be used in addition to black and white and color cameras 504, 506. In these embodiments, "invisible" inks that are only visible when illuminated with certain wavelengths of light can be detected on marked panels.

In some embodiments, a laser profiler can be used in addition to black and white and color cameras 504, 506. In these embodiments, the laser profiler can have a laser sensor to profile veneer to be analyzed. This can allow non-contact measurement of a thickness or other dimensions of veneer as long as the veneer is within the range of the laser profiler. A plurality of laser profilers used in combination can be used to create a three-dimensional image of veneer.

In some embodiments, a plurality of laser profilers and/or cameras can be used as part of a quality verification process to produce an image that can be compared to a reference image to determine if certain characteristics are within control parameters for a particular wood product. Such a quality verification process can also be used to measure deviations of control parameters from expected mean values as an indication of process trending. In some embodiments, multiple cameras can be used to simultaneously capture images of a wood product from multiple angles and/or directions.

Referring to FIG. 5, the cameras 504, 506 each have a certain field of view and these fields of view substantially overlap with each other and preferably entirely overlap one another in the region of the veneer sheet to capture the entire veneer sheet. As long as a veneer sheet is within the field of view of the respective cameras when the entire veneer sheet images are captured, an accurate grading of the veneer sheet can be accomplished. Additionally, because an image of the entire veneer sheet is captured, the orientation of the veneer sheet is not critical. In the example of FIG. 6, the cameras could be placed over the conveyor 502 at the location of veneer sheet 600, veneer sheet 602, or any other location along the conveyor, with one such placement of vision system 300 being shown in FIG. 6. The cameras 504, 506 can be placed any distance above the conveyor 502 such that a veneer sheet moving along the conveyor easily fits within the field of view of each camera as the sheet passes under the cameras, regardless of the orientation of the veneer sheet.

Referring back to FIG. 5, the vision system 300 further comprises a vision system controller 508 to control the operation of the cameras 504, 506 and to perform analysis of the images captured by the cameras to grade the veneer sheets that pass along the conveyor 502. In the illustrated example, the cameras 504, 506 can be Cognex GigE Vision cameras and the vision system controller 508 can be a Cognex VC5 Vision Controller. In other examples, other cameras and vision system controllers can be used that are capable of capturing images of veneer sheets and performing image analysis. In some examples, the vision system controller 508 is a dedicated hardware device capable of performing the operations disclosed herein. The image analysis performed by the example vision system 300 is discussed in further detail below.

The vision system 300 further comprises a housing 510 to house the cameras 504, 506. The housing 510 can be attached to or suspended from a ceiling, or mounted to any type of structural support, such that the vision system 300 is positioned above the conveyor 502 and such that veneer sheets moving along the conveyor pass through the field of views of the cameras 504, 506. Lights 512 and 514 can be affixed to the lower end of the housing 510 to illuminate veneer sheets passing along the conveyor 502 such that images of the veneer can be captured by the cameras 504, 506. In the illustrated example, the lights 512 and 514 can be LED lights. In other examples, the lights 512, 514 can be any type of lighting capable of illuminating veneer sheets that pass along the conveyor 502 and can be mounted on supports other than the housing 510.

In operation, with reference to FIG. 6, sheets of veneer are moved along the conveyor 502 while the conveyor and the veneer sheets are illuminated by lights 512, 514. When a sheet of veneer is within the field of view of the respective cameras 504, 506, the camera 504 captures a black and white image of the veneer sheet and the camera 506 captures a color image of the veneer sheet. These images can be captured simultaneously if the veneer sheet is simultaneously in the field of view of both cameras. Alternatively, the images can be captured sequentially by one camera and then the other camera. After these images are captured, the vision system controller 508 analyzes the images to determine a grade for the veneer sheet, as discussed below. This process is then repeated for any number of veneer sheets. This process can operate at a high rate of speed so long as the cameras 504, 506 each capture an image of each sheet of veneer that moves along the conveyor 502. In some examples, the conveyor 502 directs each veneer sheet to a different location based on its grade. In other examples, the result of the grading of each veneer sheet is stored for later use. In some embodiments, the vision system controller 508 can also receive inputs from other devices such as a stress wave grader or a moisture scanner. In these embodiments, the vision system controller 508 can use each of these additional inputs in combination with the visual information received from cameras 504, 506 to determine a grade for a veneer sheet.

To analyze a sheet of veneer after a black and white image and a color image are captured by cameras 504, 506, respectively, first the captured images can be and are desirably auto-rotated so that the images are properly oriented. Because the cameras 504, 506 capture an area scan of the veneer sheet, the sheet need not be oriented perfectly parallel with respect to the cameras when the images are captured, which is one of the advantages of using area scans rather than line scans. Auto rotating the images such that the image of the veneer sheet is oriented parallel with respect to a reference direction facilitates further analysis and comparison to reference images. In some examples, the black and white and color images are auto-rotated such that they have the same orientation as a reference image. In another example, a reference image can be auto rotated to match the orientation of the images captured by the cameras 504, 506, without rotating the captured images.

After this autorotation is performed, the images can be translated such that they are properly centered, with respect to one another. That is, the images are digitally overlapped on top of one another such that the same portion of the sheet captured by each camera is registered (overlaid) in a composite view and the images have the same horizontal spacing. This is desirable in one embodiment where the cameras 504 and 506 are offset from each other at the time the images are captured, such as horizontally offset on the housing 510. As such, the veneer sheet will be off to one side of the image captured by camera 504 and off to the other side of the image captured by camera 506. Translating each of these images in a complementary direction assures that both images can be compared to a centered reference image.

Once these initial steps are performed, if needed, the images can be analyzed to grade the veneer. As discussed above, the black and white image can be used to analyze certain defects of the veneer sheet while the color image can be used to analyze other defects of the veneer. In particular, black and white images can desirably be used to measure dimensional issues, such as the size of a veneer sheet and void areas on the sheet. For detecting this type of defect, the vision system need only determine whether or not material is present, and the use of a black and white image is preferable for this. Alternatively, differentiating between colors is key to detecting surface defects such as pitch and mold. Accordingly, color images can desirably be used to detect this type of colored defect. The specific defects that are measured with each camera are discussed below.

In some examples, the vision system controller 508 utilizes a learning algorithm software to "learn" to grade veneer sheets over time. In these examples, several images of veneer sheets having a first grade and several images of veneer sheets having a second grade, e.g. as determined by manual grading, can be stored in computer memory and analyzed by the learning algorithm software executed by a computer. The software can then determine what features of the images differentiate the different grades of sheets. Then, when an image or images of a new veneer sheet is analyzed by the software, the features of this new sheet can be compared to the learned features to determine a grade of the new veneer sheet.

In some examples, a reference image is stored in computer memory showing an ideal veneer sheet and as images are captured of veneer sheets to be graded, the images are compared to the reference image. In these examples, veneer sheets can be graded based on differences between the captured images and the reference image. In some examples, multiple reference images are stored corresponding to different grades of veneer and veneer sheets are assigned a grade based on which reference image a veneer sheet most closely resembles.

In some examples, the vision system controller 508 can perform computer processing of a captured black and white and/or color image of a veneer sheet to assign a grade to the veneer sheet. Computer processing of an image can comprise one or more of the following actions: comparing the image to a reference image, comparing data from the image to reference data, comparing data of the image to certain parameters, using image processing tools to detect features in the image. Alternative computer processing approaches can also be used.

In one example, a captured image of a veneer sheet to be graded (e.g., a black and white image) can be compared to a reference image to establish a scaling factor. That is, if the dimensions of the reference image are known, then the vision system controller 508 can compare the reference image to the captured image to determine the actual distance that each pixel of the reference image and the captured images corresponds to. Once this scaling factor is determined, the dimensions of the veneer sheet can be determined by overlaying the captured black and white image on the reference image and determining the differences (e.g., missing material on the captured image compared to the reference image). Based on this comparison, the vision system controller 508 can determine the length and width of the veneer sheet, as well as determine how sharp the corners are (for example, if a corner of the sheet is missing). In some examples, the dimensional analysis can be done without directly comparing the captured image to the reference image but instead by using the scaling factor and analyzing the captured image directly to determine the length and width of the veneer sheet and the sharpness of the corners. In some examples, the vision system controller 508 determines the scaling factor once for a particular type of product and uses this scaling factor every subsequent time that this product is graded. If the cameras are not moved, or the camera lenses are unchanged, the scaling factor would remain the same every time the same type of product is graded but could change for different products having different thicknesses. In some examples, the scaling factor can be determined manually (e.g., by analyzing the geometry and placement of the lenses of the cameras 504, 506 with respect to the veneer sheet when the images are captured).

Simultaneously, before, or after, and more desirably after, the dimensions of the veneer sheet are determined by processing the black and white image, a color image of the veneer sheet can be analyzed by the vision system controller 508 to determine additional defects in the veneer sheet as discussed below. In some examples, the color image is first converted to greyscale before it is analyzed to determine defects in the veneer sheet.

The vision system controller 508 can use a variety of image processing tools to determine these defects. For example, the vision system controller 508 can detect geometric circles which correspond to closed knots and a blob tool can be used to look for irregular shapes on the veneer sheet indicative of the presence of pitch. Any number of such tools can be run simultaneously or concurrently to determine any number of defects. Depending on the analysis to be performed for the particular veneer sheet, different tools can be used to analyze the veneer sheet. For example, a veneer sheet to be used for one particular purpose might be analyzed using different tools than the tools used to analyze a veneer sheet to be used for a different purpose.

The vision system controller 508 can be programmed with certain parameters to be used by the various image processing tools to detect various defects. In some examples, a machine learning algorithm can be used to help determine these parameters. In these examples, a first set of images that have a certain grade (e.g., G1 as determined by manual grading) can be input to the vision system controller 508. Then, a second set of images having a different grade (e.g., G2 as determined by manual grading) can be input to the vision system controller 508. This can be continued for any number of images having any number of different grades. The vision system controller 508 can then use these images and their assigned grades as training data for a machine learning algorithm to determine the optimal parameters to be used with certain image processing tools to determine a grade for veneer sheets. Once these parameters are determined, the vision system controller 508 can use the determined parameters with the image processing tool analyze captured images of veneer sheets and determine grades for the veneer sheets.

Discussed below are different types of defects that can be found in veneer sheets and that can be detected and/or measured by the vision system 300 using images captured by either the black and white camera 504 or the color camera 506. Also discussed below are parameters that can be measured for these defects (e.g., measurable deviations from an ideal veneer sheet). In some examples, the vision system 300 determines whether or not each detected defect is within an acceptable range. In other examples, the vision system 300 determines a magnitude of deviation of one or more parameters from an ideal veneer sheet in order to grade the veneer. In these examples, the vision system 300 can use a combination of detected defects to determine a grade for veneer and/or whether or not a sheet of veneer is acceptable for a particular purpose. In some examples, a magnitude of deviation can be determined as a percentage difference from a desired value. In other examples, a magnitude of deviation can be determined as an absolute value of a difference from a desired value. In some examples, the vision system 300 can monitor the trend of a certain value over time. For example, if dimensional offsets are increasing, this provides an indication of upstream problems in equipment used with the veneer.

In the examples discussed below, acceptable ranges for certain defects are given. These ranges correspond to exemplary ranges that make veneer sheets acceptable for one particular application. For other applications, other ranges could be used to define what is acceptable. Furthermore, in the illustrated example of FIG. 5, the vision system controller 508 can be programmable such that acceptable ranges for various defects can be programmed into the vision system controller for any given application.

Figure 7B:
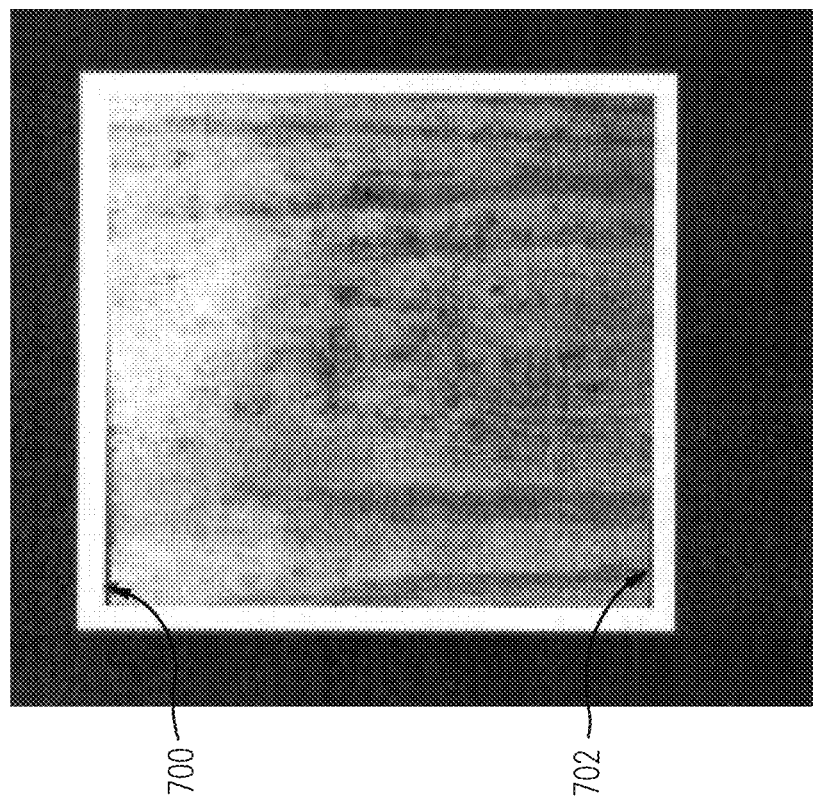
FIG. 7B shows an example image of a veneer sheet with dimensional discrepancies.
Figure 7A:
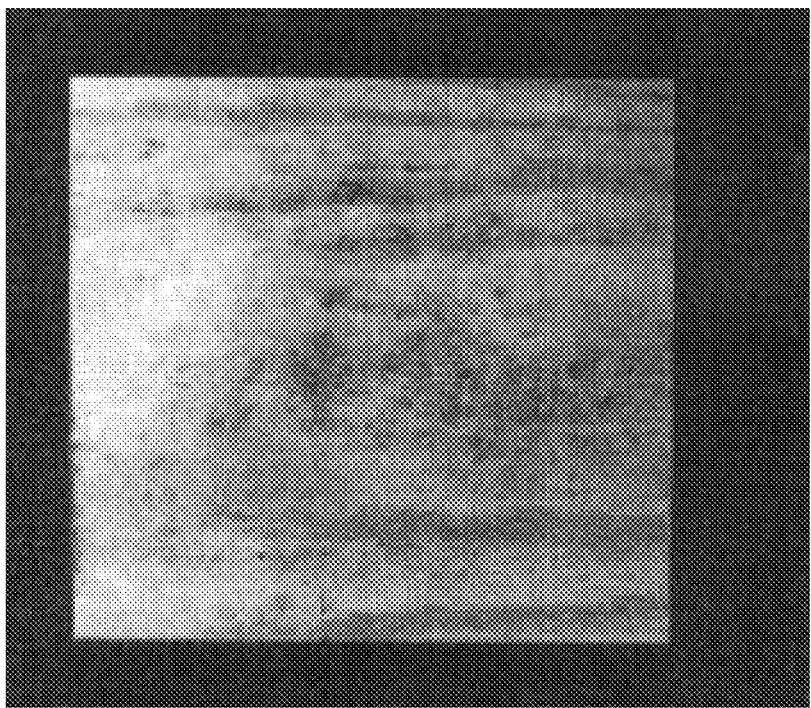
FIG. 7A shows a reference veneer sheet without any dimensional discrepancies.

FIGS. 7A-7B illustrate a dimensional analysis that can be performed by the example vision system 300 to generate dimensions data. FIG. 7A shows an image of an ideal veneer sheet and FIG. 7B shows an image of a veneer sheet that has dimensional discrepancies in corners 700 and 702, wherein the veneer sheet is undersized. This is a type of defect that can be best detected from a black and white image. In the illustrated example, the acceptable width of a veneer sheet can be, for example, between 49.75 inches and 51.5 inches with an ideal mean width of 50.5 inches for use in four-foot-wide plywood sheets. In some examples, the vision system controller 508 calculates a deviation in magnitude between the mean width and the actual width of a veneer sheet in order to determine a grade for the sheet. Additionally, detecting deviations from the mean width that are increasing over time but still within the acceptable range can allow personnel to become aware of a veneer manufacturing problem and correct it before deviations from the acceptable range are exceeded. In some examples, dimensional analysis can be performed by counting a number of pixels in a certain area within a certain range of values.

Similar measurements can be performed with respect to the length of a veneer sheet. In the illustrated example, the minimum acceptable length can be 101.75 inches (for example, a veneer sheet to be used as a face sheet in four foot by eight-foot plywood) and there is no maximum required length as any excess material can be removed as waste.

Another defect that can be detected by the example vision system 300 from black and white images is the shape of a veneer sheet and how close it is to a rectangle. In the illustrated example, acceptable deviations from a rectangular shape are no more than ¾ of an inch measured diagonally across a sheet. In some examples, the vision system controller 508 calculates the magnitude of deviation from a perfectly rectangular shape. Deviations above the allowable limit can contribute to edge defects in finished products.

Figure 8:
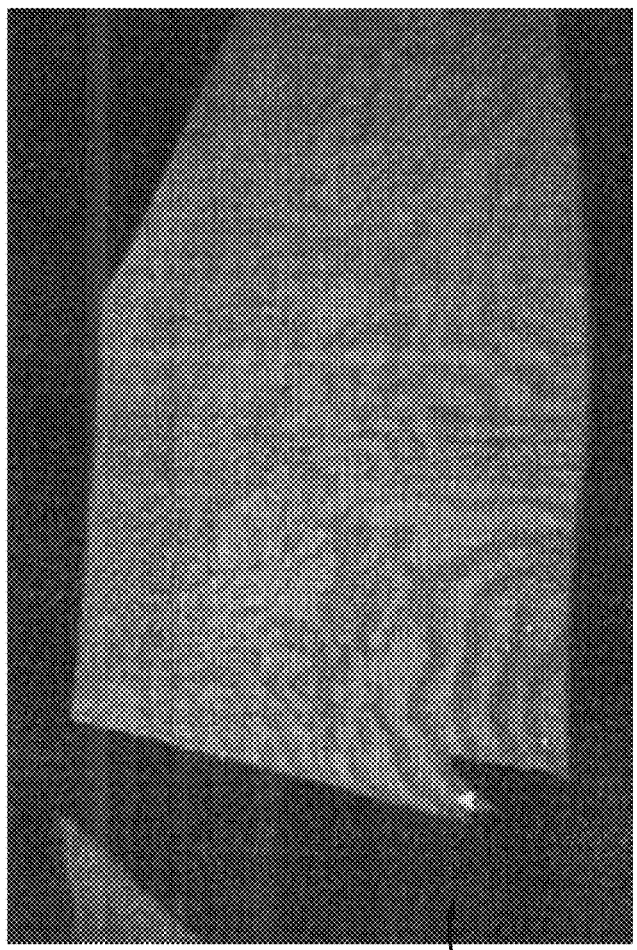
FIG. 8 shows an image of a veneer sheet with a broken corner.

Another defect that can be detected by the example vision system 300 from black and white images is misshapen corners. In an illustrated example, each of the corners of a veneer sheet must be a right triangle, such as being a right triangle with a minimum of 6-inch base dimensions. FIG. 8 shows a veneer sheet with a broken corner 800 that would not meet this criteria. Another defect that can be detected by the vision system 300 is the presence of more or less than four corners, which indicates a misshapen or damaged sheet.

Figure 9:
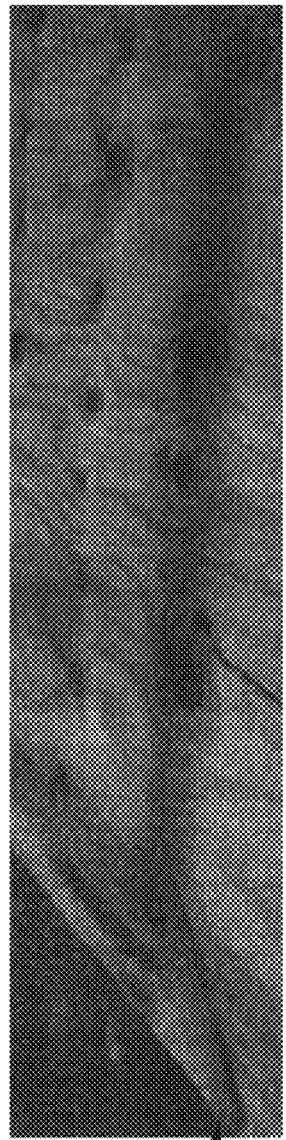
FIG. 9 shows an image of a veneer sheet with foreign material (an extraneous piece of veneer on top of the veneer sheet).

Another defect that can be detected by the example vision system 300 from a black and white image is the presence of foreign materials or debris such as grease, paint, dirt, wood chips, etc. In one desirable example, no such foreign materials are allowable. FIG. 9 shows a veneer sheet with a wood chip 900 present on its surface.

Figure 10B:
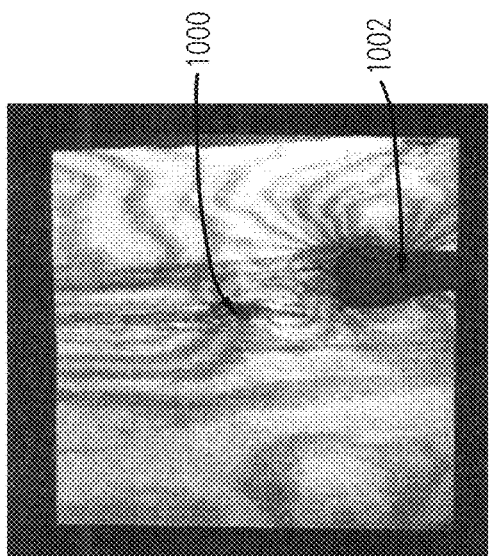
FIGS. 10B-10C show images of a veneer sheet with void spaces.
Figure 10C:
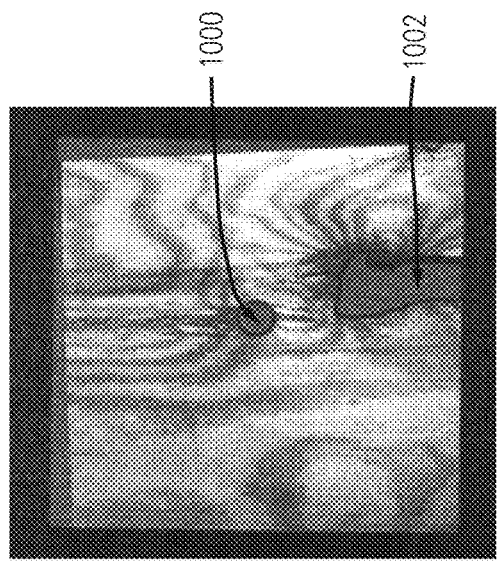
Figure 10A:
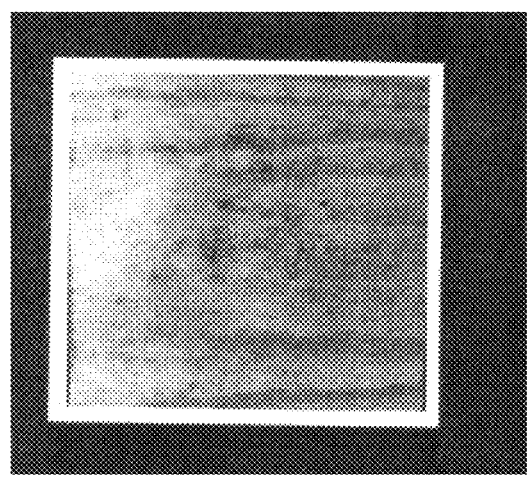
FIG. 10A shows a reference image of a veneer sheet without any void spaces.

Another defect that can be detected by the example vision system 300 from a black and white image is void areas. Void areas can comprise open knots, broken, missing or irregular corners or boundary portions, splits, or any material missing from a sheet. FIG. 10A shows an image of a reference veneer sheet without any void areas while FIGS. 10B and 10C respectively show images of a veneer sheet having open knot 1000 and broken out area 1002.

Figure 11A:
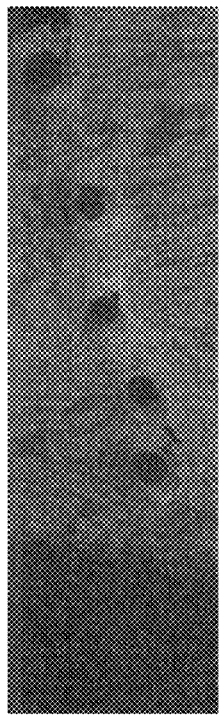
FIGS. 11A-11B show images of a veneer sheet with tight knots.
Figure 11B:
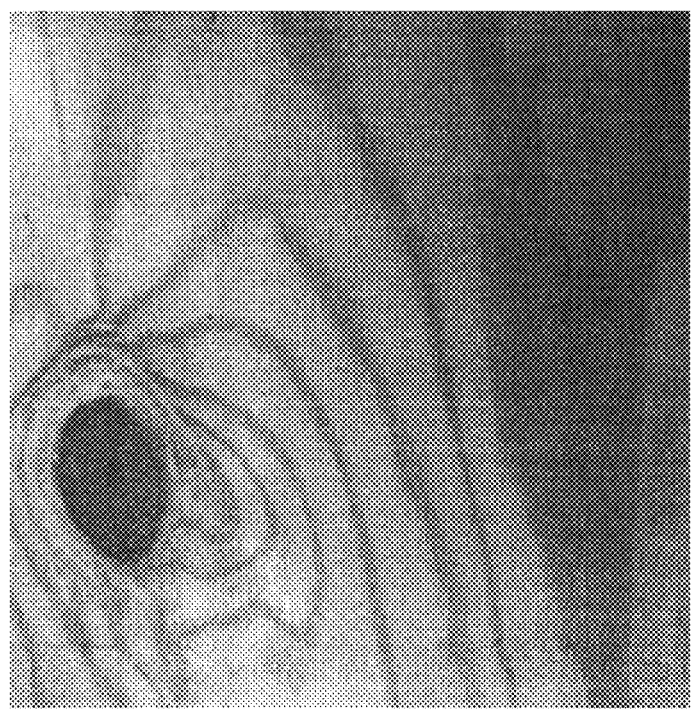

The remaining defects discussed below are defects in veneer sheets that the example vision system 300 can desirably detect from color images. Closed knots are one such defect that can be detected by the vision system. FIGS. 11A-11B show example veneer sheets with tight or closed knots. Tight knots are knots where there is no material missing within the knot perimeter. In one grading example, veneer sheets meeting this grade can have tight or closed knots that have a maximum allowable diameter of 3.5 inches. For loose knots, where a portion of the material within the perimeter of the knot is missing, in one grading example, the knot can have a maximum diameter of 3 inches. For any knots having a diameter greater than 2 inches, in one grading example, there must be a minimum spacing of 6 inches between knots across the sheet and there must be clear, straight grain with no additional defects in the space between the knots. The grading standards can vary for different grades of sheets.

Figure 12:
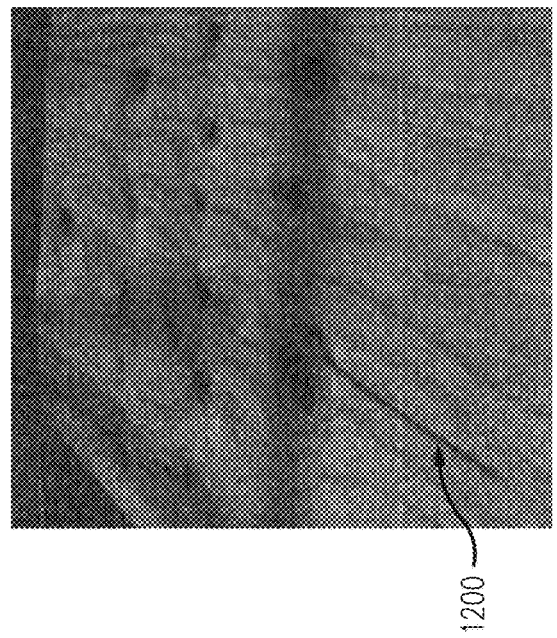
FIG. 12 shows an image of a veneer sheet with at least one split and tight knots.

Another defect that can be detected by the vision system 300 is splits. FIG. 12 shows an example veneer sheet that has a split 1200. In one specific grading example, splits can have a maximum length of 24 inches, the maximum number of allowable splits is 6, and the total cumulative length of all splits in a veneer sheet cannot exceed 48 inches. Splits can be detected from both black and white and color images. In some examples, backlighting of a veneer sheet can be used to improve the contrast of captured images, such as to better detect splits or other defects.

Figure 13:
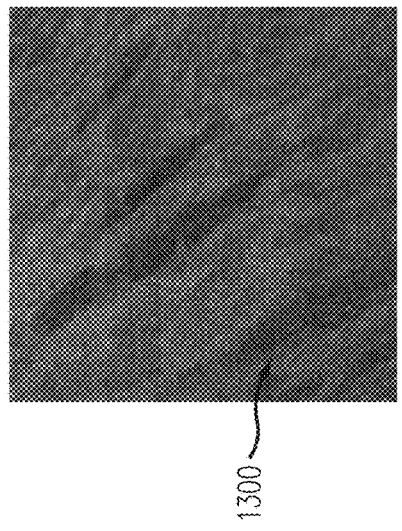
FIG. 13 shows an image of a veneer sheet containing pitch.

Another defect that can be detected by the vision system 300 is pitch. FIG. 13 shows a veneer sheet that contains pitch 1300 on its surface. In one grading example, individual pitch pockets can have a maximum surface of 6 square inches and there can be at most 3 pockets per veneer sheet. In addition, pitch pockets must be separated by at least 24 inches and there must be clear, straight grain with no defects in the area between pitch pockets.

Figure 14:
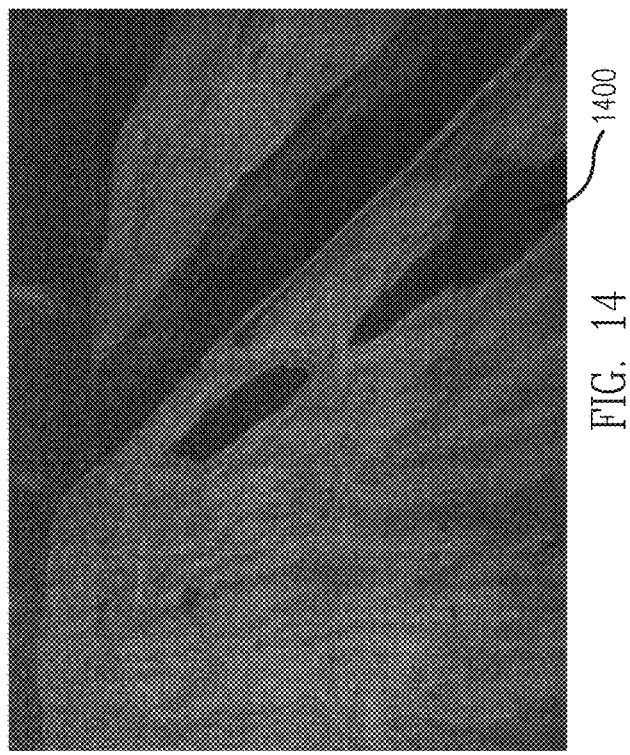
FIG. 14 shows an image of a veneer sheet with wane.

Another defect that can be detected by the vision system 300 is wane. FIG. 14 shows a veneer sheet with wane 1400. In one grading example, there can be at most 6 square inches of cumulative wane per sheet of veneer to meet the grade.

Figure 15:
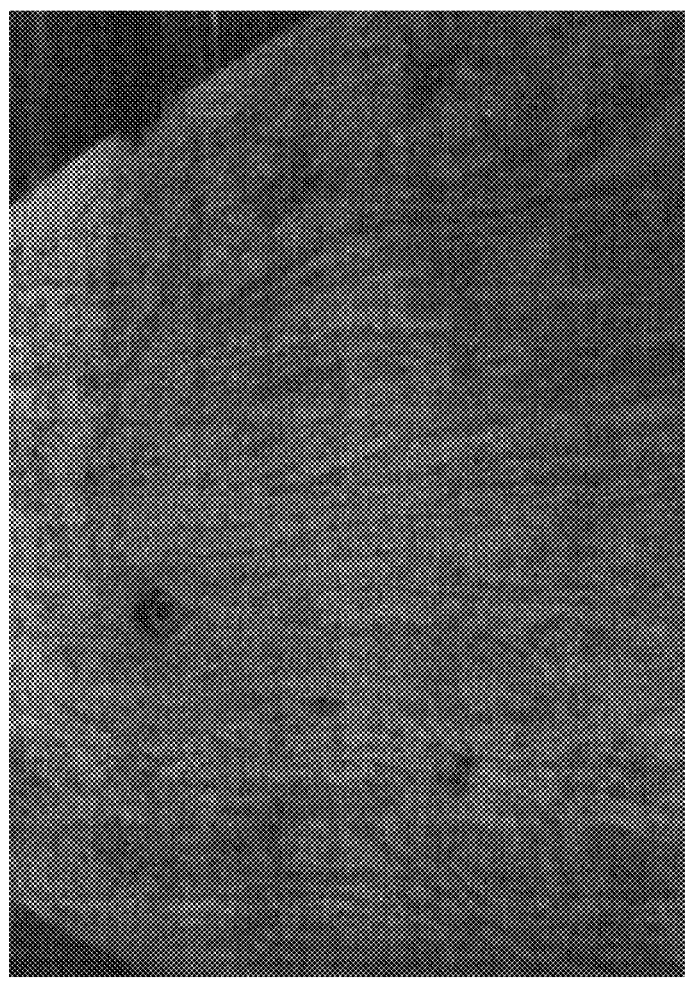
FIG. 15 shows an image of a veneer sheet with light mold.
Figure 16:
FIG. 16 shows an image of a veneer sheet with heavy mold.
Figure 17:
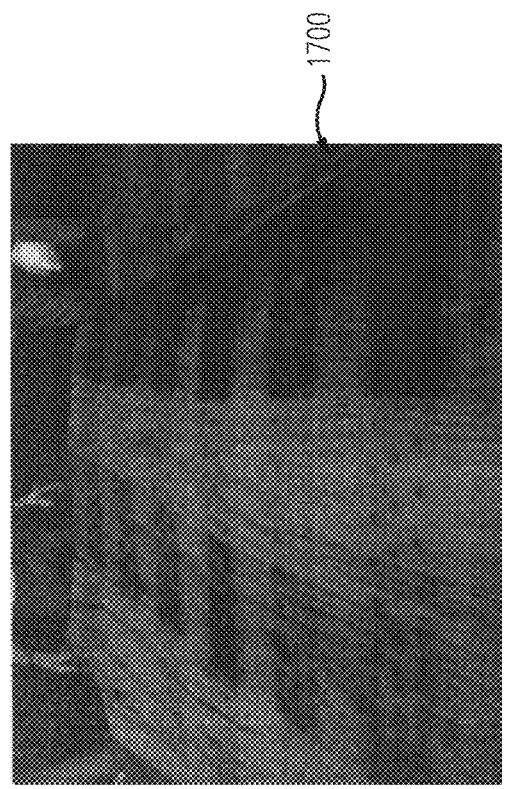
FIG. 17 shows an image of a veneer sheet with charring due to excessive heat.

Another defect that can be detected by the vision system 300 is mold. FIG. 15 shows a veneer sheet that contains light mold. In one grading example, light mold with a transparency of greater than 85% is acceptable. Heavy mold, blue stain or significant discolorations where transparency is less than 85% is not acceptable in this example. FIGS. 16 and 17 show examples of veneer sheets with heavy mold 1600 and charring 1700 due to excessive heat, respectively.

Figure 18:
FIG. 18 shows an image of a veneer sheet with multiple defects of different types.

Another defect that the vision system 300 can detect are critical areas where a cumulative collection of individual defects on a veneer sheet combine to compromise the quality of the veneer sheet. For example, FIG. 18 shows a veneer sheet with a crack across the sheets near closed knots and without 6 inches of clear straight grain space between the knots. This area can be considered a critical area with multiple defects.

Figure 19B:
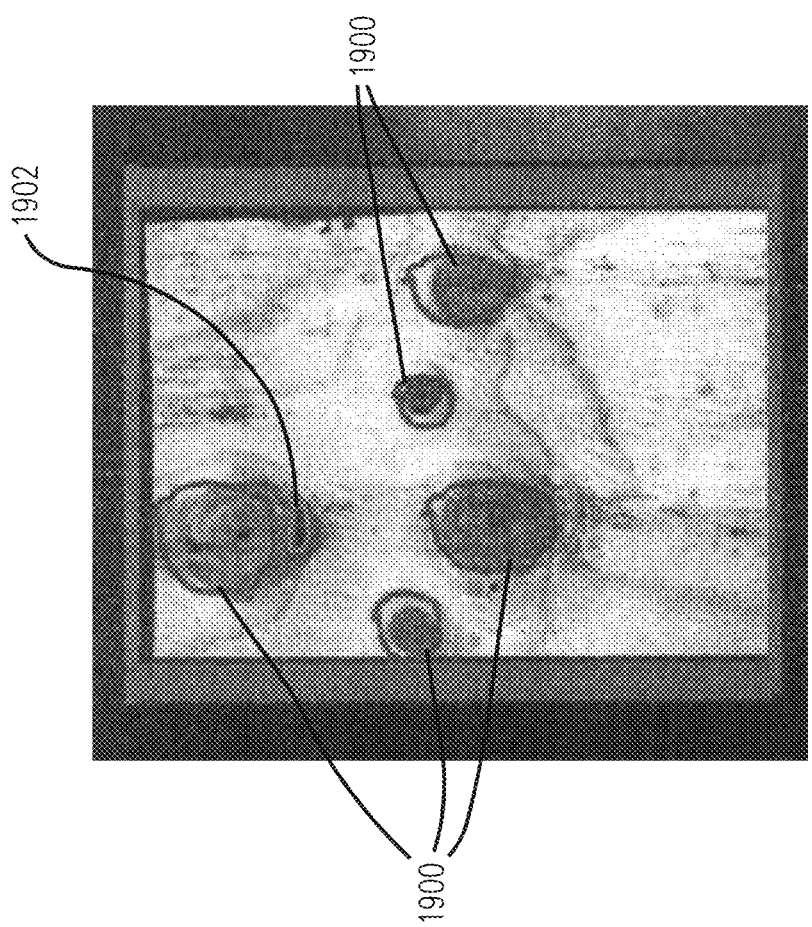
FIG. 19B shows a veneer sheet with knots and pitch.
Figure 19A:
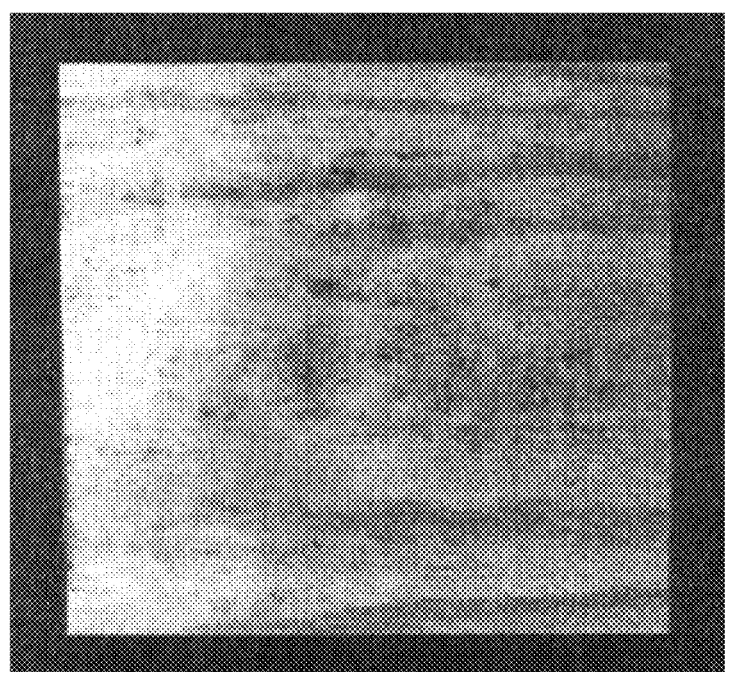
FIG. 19A shows a reference a veneer sheet without any knots or pitch.
Figure 21:
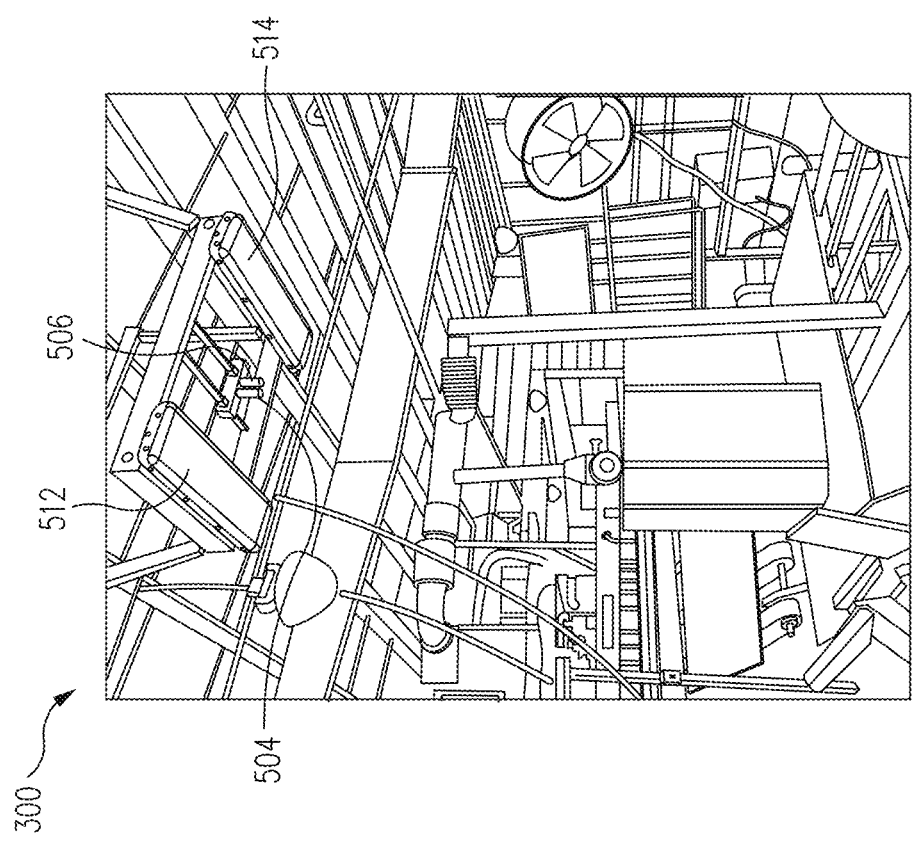

FIGS. 19A-19B illustrate an example of how the vision system can utilize color images to differentiate different types of defects. FIG. 19A shows a reference image, while FIG. 19B shows an image of a veneer sheet having both closed knots 1900 and pitch 1902. The deviations in color between the closed knots 1900 and the pitch 1902 allow the vision system 300 to identify and differentiate these two types of defects. Furthermore, the darker the color of a knot in comparison to the reference image can be considered a reduction in material strength and can be considered when assigning a veneer grade based on a magnitude of deviation from the reference.

Figure 21:
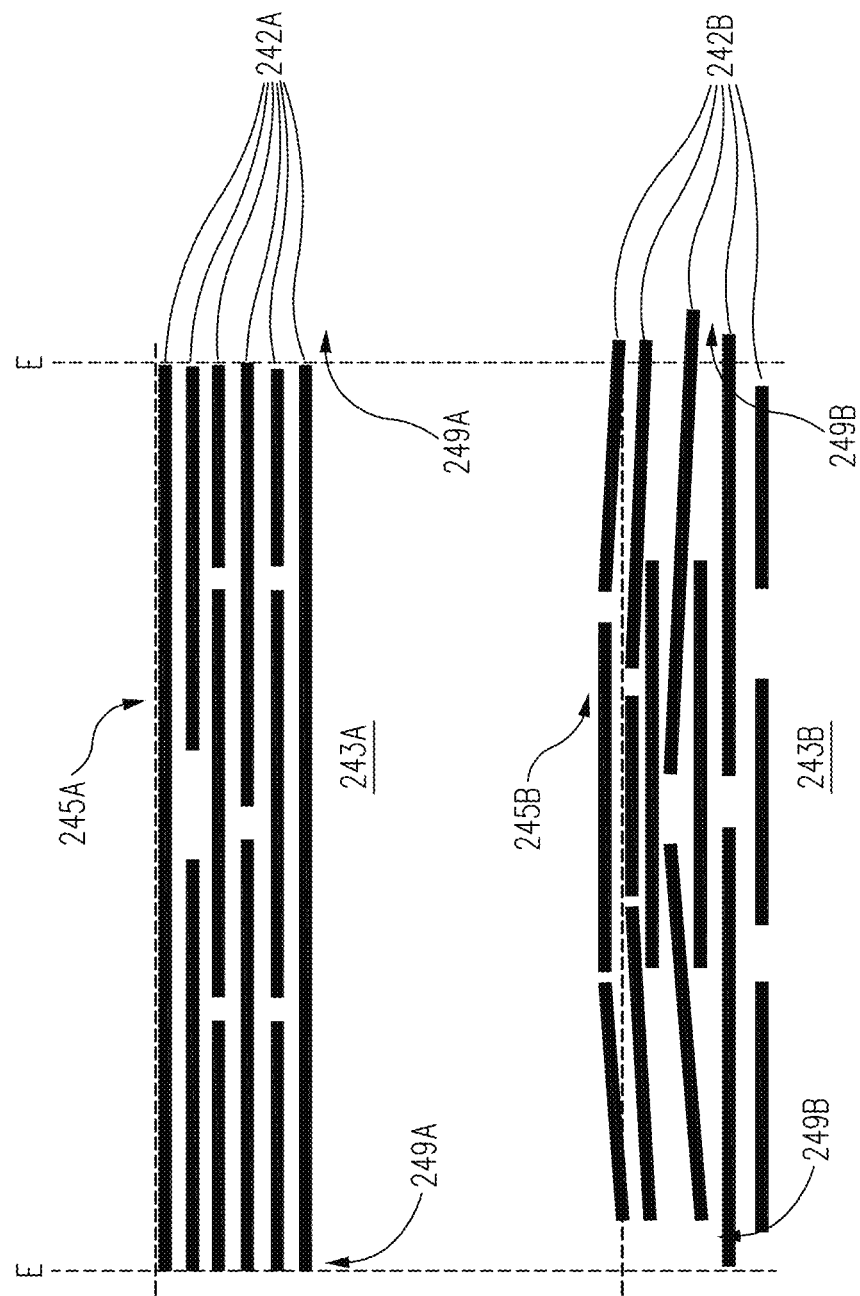
FIGS. 20-21 show images of an installation of the example vision system of FIG. 5.
Figure 20:
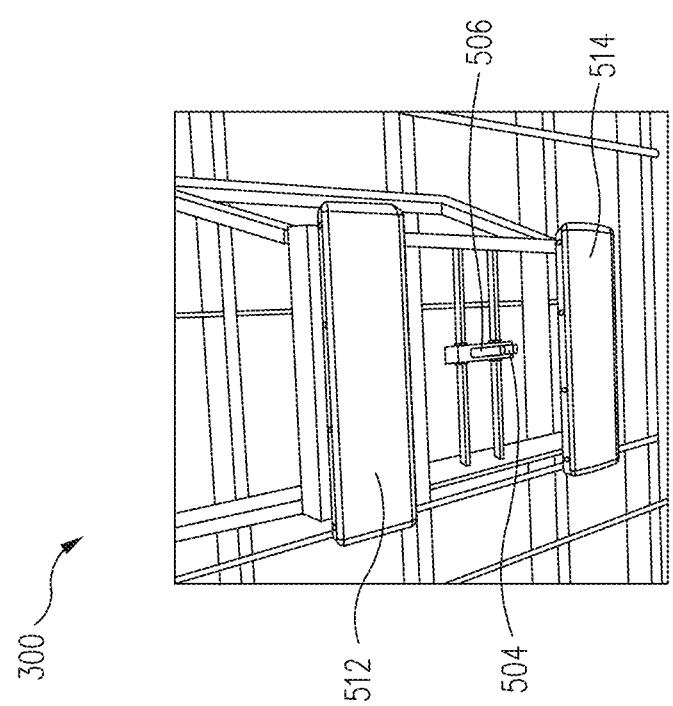

FIGS. 20-21 show various views of portions of an installation of a veneer vision system 300 including lights 512, 514 and cameras, 504, 506.

In some examples, the vision system 300 can determine a plurality of magnitudes of deviation from a reference image for each detected defect on a veneer sheet. In these examples, the various magnitudes of deviation can be combined to determine a grade for the sheet of veneer. For example, the vision system may determine how many open knots are present, what the total size of the open knots is, and how far apart the open knots are separated and combine all these measures in determining a grade for the veneer sheet.

In some examples, the vision system 300 first determines whether a veneer sheet has dimensions within the allowed parameters. If the dimensions are not within the allowable parameters, the sheet can be sent for further processing (e.g., composer or core feeder) or treated as scrap wood. If the dimensions are within the allowable parameters, then the other defects can be detected and/or measured and a grade for the veneer can be determined based on these detected defects. The veneer sheet can then be sorted based on the grade such that the sheet is used in the most cost-effective manner in a manufacturing process.

In some examples, the images of a veneer sheet captured by the cameras 504, 506 are stored along with the grade that the vision system 300 assigns to the veneer sheet and/or the defects in the sheet detected by the vision system 300. Then, the stored images can be later compared to the grade assigned or the defects found in the veneer sheet to determine if the vision system 300 is accurately detecting defects and assigning grades. If, for example, it is discovered that the vision system 300 is detecting defects in veneer sheets that are not actually present or if the system is not detecting certain defects, the settings of the system can be adjusted to improve future performance.

Figure 22A:
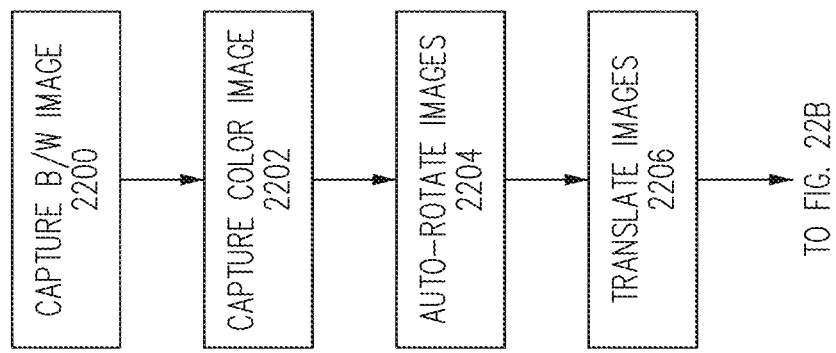
FIGS. 22A and 22B together form a flowchart showing exemplary operations of the exemplary vision system of FIG. 5.
Figure 22B:
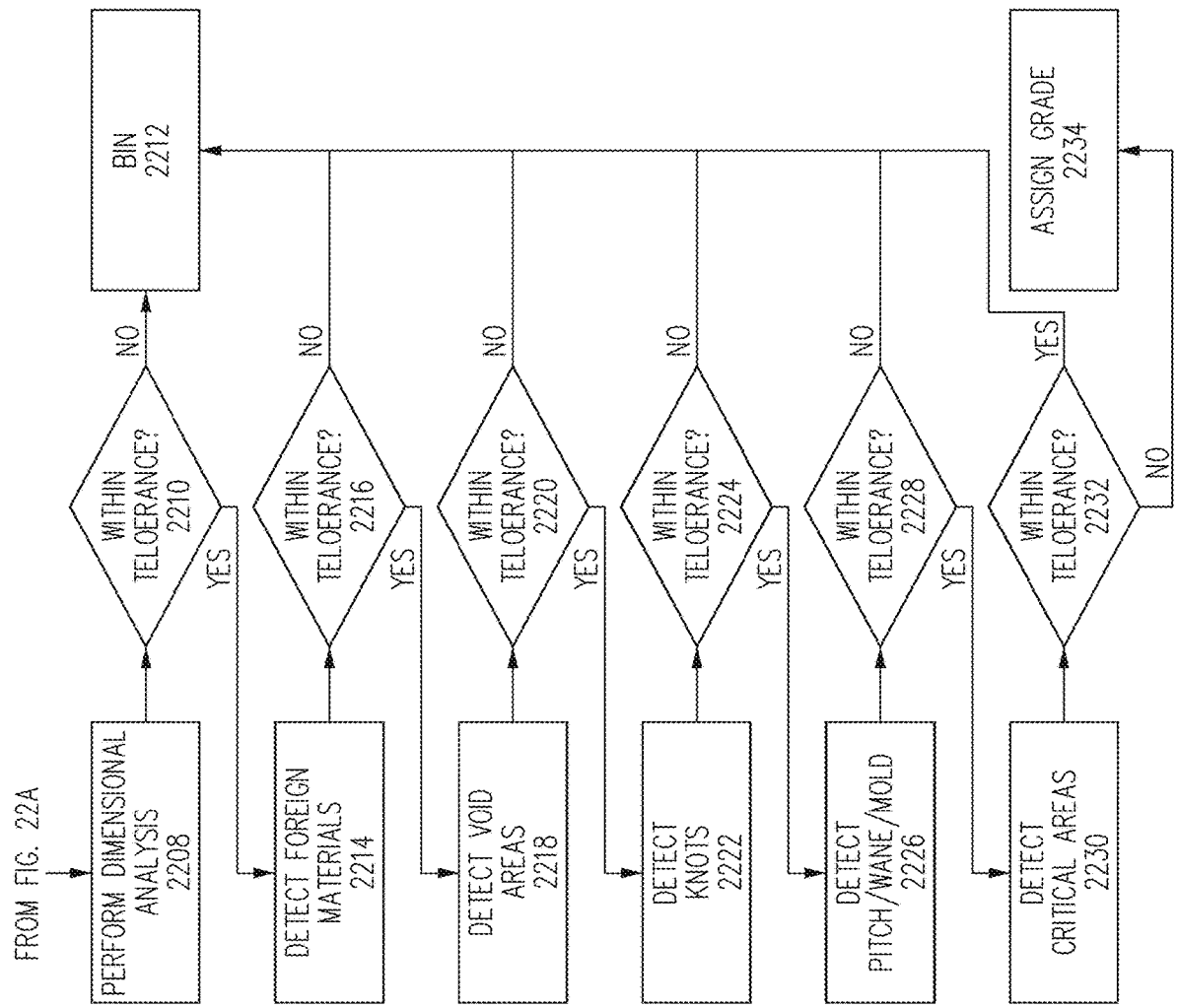

FIGS. 22A and 22B together show a flowchart representative of exemplary operations of the veneer vision system 300. FIG. 22A begins when the black and white camera 504 captures an image of a veneer sheet to be graded (block 2200). The color camera 506 then captures an image of the same veneer sheet (block 2202). In some examples, the black and white camera and the color camera capture images of the veneer sheet simultaneously or in a different sequence.

After the black and white and color images of the veneer sheet are captured, these images are desirably auto rotated and/or centered to match the orientation of a reference image as described above (block 2204). The black and white and color images are then desirably translated such that they are properly aligned with respect to each other as described above (block 2206). Dimensional analysis is then performed by comparing the black and white image to a reference image as described above (block 2208) to generate dimensions data 301/401. If the dimensions of the veneer sheet are found to be outside of an allowable range (block 2210), then the veneer sheet is sent to a particular bin (e.g., a location to be further processed, discarded, used as scrap) or assigned some for some other purpose (block 2212). If the dimensions of the veneer sheet are found to be within the allowable range, then control advances to block 2214.

In block 2214, the vision system determines whether any foreign materials are present on the veneer sheet as described above. If the amount of foreign materials are found to be outside of an allowable range (block 2216), then the veneer sheet is binned (e.g., sent to a particular bin). In some examples, this can be the same bin that the materials that failed the dimensional analysis in block 2210 were sent to. In other examples, this can be a different bin. In the example of FIG. 22, any number of bins can be present. If the amount of foreign materials around found to be within the allowable range (block 2216), then control advances to block 2218.

In block 2218, the vision system detects void areas on the veneer sheet as described above. If the amount of void areas is found to be outside of an allowable range (block 2220), then the veneer sheet is binned. If the amount of void areas is within the allowable range, then control advances to block 2222.

In block 2222, the vision system detects knots on the veneer sheet as described above. If the number and size of knots is found to be outside of an allowable range (block 2224), then the veneer sheet is binned. If the number and size of knots is found to be within the allowable range, then control advances to block 2226.

In block 2226, the vision system detects pitch, wane, and mold on the veneer sheet as described above. If the amount of pitch, wane, and mold is found to be outside of an allowable range (block 2228), then the veneer sheet is binned. If the amount of pitch, wane, and mold is found to be within the allowable range, then control advances to block 2230.

In block 2230, the vision system detects critical areas on the veneer sheet where a combination of defects degrade the quality of the veneer sheet as described above. If the number and severity of critical areas on the veneer sheet is found to be outside of an allowable range (block 2232), then the veneer sheet is binned. If the critical areas are found to be within the allowable range, then a grade is assigned to the veneer sheet based on all of the defects detected (block 2234). The example of FIGS. 22A-22B then ends.

In the example of FIGS. 22A-22B, each bin or veneer stack, such as veneer stacks 1 through 5 in FIGS. 3 and 4, can be assigned to a different purpose. For example, one bin or veneer stack, such as overflow bins 338 and 438 of FIGS. 3 and 4, can be for scrap, one bin or veneer stack, such as veneer stacks 1 through 5 in FIG. 4, can be for use of veneer in plywood core, one bin or veneer stack, such as veneer stacks 1 through 5 in FIGS. 3 and 4, can be for use as I-beam webs, with as many bins or veneer stacks, such as veneer stacks 1 through 5 in FIGS. 3 and 4, being provided as desired. The example of FIGS. 22A-22B shows one series of tests that can be performed. In other examples, any number any variety of tests can be performed in any order. After each test is performed, wood products that fail that particular test can be assigned to a particular bin. In some examples, the tests are performed in an order to detect veneer sheets from the lowest to highest quality. That is, if a veneer sheet fails a first test or set of tests (e.g., the detected parameters are outside of allowable levels), then the veneer sheet can be sent to a bin for the lowest quality veneer (e.g., scrap). If the first set of tests is passed but a subsequent test or set of tests is failed, then the veneer sheet can be sent to a bin for a slightly higher quality of veneer. This can continue any number of times. If a veneer sheet passes every test, then it can be assigned the highest quality grade.

Referring to FIGS. 3, 4, 22A and 22B, in one embodiment, each bin is a veneer stack of full or partial veneer sheets such as veneer stacks 337 and 443 shown in FIGS. 3 and 4. In one embodiment, stack 1 is a first grade, or grade 1, veneer stack that includes full or partial veneer sheets that are deemed to be of acceptable appearance and quality to be used for outer veneer layers of a layered wood panel. In one embodiment, stack 2 is a second grade, or grade 2, veneer stack that includes full or partial veneer sheets that are deemed to be of acceptable structural quality to be used for inner veneer layers of a layered wood panel but perhaps lack the appearance to be used as outer layers of a layered wood panel. In one embodiment, stack 3 is a third grade, or grade 3, veneer stack that includes full or partial veneer sheets that are deemed to have structural anomalies, such as knot holes, and therefore must be sparingly used for inner veneer layers of a layered wood panel and perhaps must be sandwiched between higher grade veneer sheets to provide adequate structural quality for the layered wood panel. Similarly stack 4 is a fourth grade, or grade 4, veneer stack that includes full or partial veneer sheets of the same grade and stack 4 is a fourth grade, or grade 4, veneer stack that includes full or partial veneer sheets of the same grade. Finally, in one embodiment, trash/recycle veneer stack, or overflow bin 438 contains veneer sheets of unacceptable quality.

By grading veneer sheets and stacking the veneer sheets according to grade, the quality of veneer fed into process during feeding operation is determined before resources are expended processing the veneer, e.g., defects can be detected in the veneer sheets, and the veneer sheets can be graded, and allocated for their best use, before significant time and energy is devoted to their use in processed panels.

It should be noted that translating the images from the color and black and white cameras is not required if the images are already aligned and overlap when taken. In addition, steps that are used in grading certain defects (e.g., dimensional defects) desirably determined from the black and white image can be performed prior to any translation step with the translation step eliminated if the analysis performed from the black and white image is sufficient to reject the sheet of veneer. However, the most efficient approach is to translate the image from the two cameras such that they overlap one another and then proceed with grading the veneer sheet.

Figure 23:
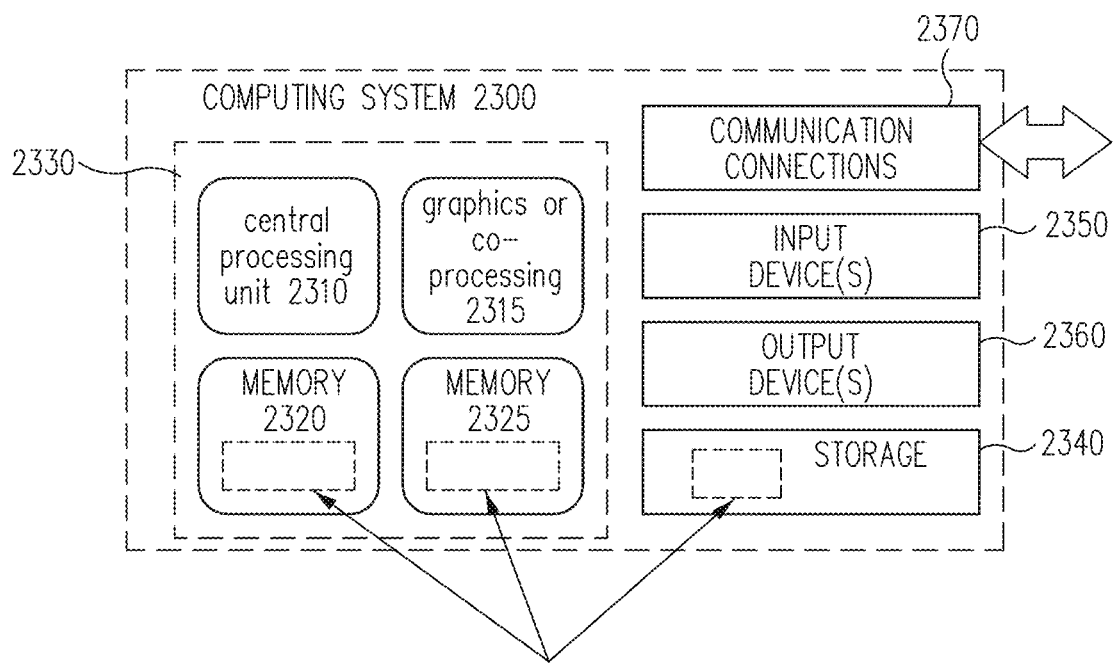
FIG. 23 is a diagram of an example computing system in which some described embodiments of a vision system can be implemented.

FIG. 23 depicts a generalized example of a suitable computing system 2300 in which the described innovations may be implemented. The computing system 2300 is not intended to suggest any limitation as to scope of use or functionality, as the innovations may be implemented in diverse general-purpose or special-purpose computing systems.

With reference to FIG. 23, the computing system 2300 includes one or more processing units 2310, 2315 and memory 2320, 2325. In FIG. 23 this basic configuration 2330 is included within a dashed line. The processing units 2310, 2315 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 23 shows a central processing unit 2310 as well as a graphics processing unit or co-processing unit 2315. The tangible memory 2320, 2325 may be volatile memory (e.g., registers, cache, RAM), non-volatile memory (e.g., ROM, EEPROM, flash memory, etc.), or some combination of the two, accessible by the processing unit(s). The memory 2320, 2325 stores software 2380 implementing one or more innovations described herein, in the form of computer-executable instructions suitable for execution by the processing unit(s).

A computing system may have additional features. For example, the computing system 2300 includes storage 2340, one or more input devices 2350, one or more output devices 2360, and one or more communication connections 2370. An interconnection mechanism (not shown) such as a bus, controller, or network interconnects the components of the computing system 2300. Typically, operating system software (not shown) provides an operating environment for other software executing in the computing system 2300, and coordinates activities of the components of the computing system 2300.

The tangible storage 2340 may be removable or non-removable, and includes magnetic disks, magnetic tapes or cassettes, CD-ROMs, DVDs, or any other medium which can be used to store information in a non-transitory way, and which can be accessed within the computing system 2300. The storage 2340 stores instructions for the software 2380 implementing one or more innovations described herein.

The input device(s) 2350 may be a touch input device such as a keyboard, mouse, pen, or trackball, a voice input device, a scanning device, or another device that provides input to the computing system 2300. For video encoding, the input device(s) 2350 may be a camera, video card, TV tuner card, or similar device that accepts video input in analog or digital form, or a CD-ROM or CD-RW that reads video samples into the computing system 2300. The output device (s) 2360 may be a display, printer, speaker, CD-writer, or another device that provides output from the computing system 2300.

The communication connection(s) 2370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Figure 24:
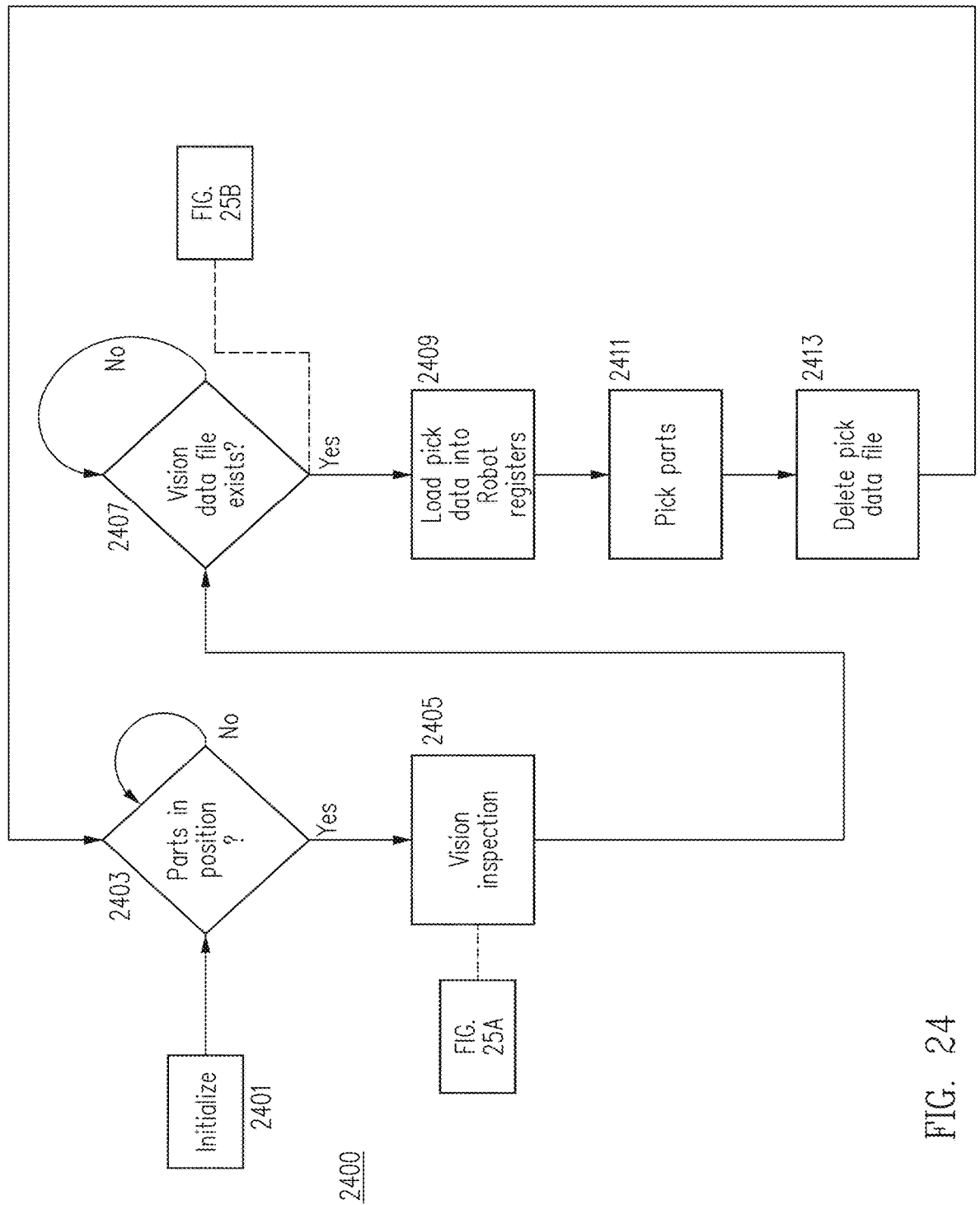
FIGS. 24, 25A and 25B together are a process flow chart for a full or partial sheet of veneer grading and stacking system in accordance with one embodiment.
Figure 25A:
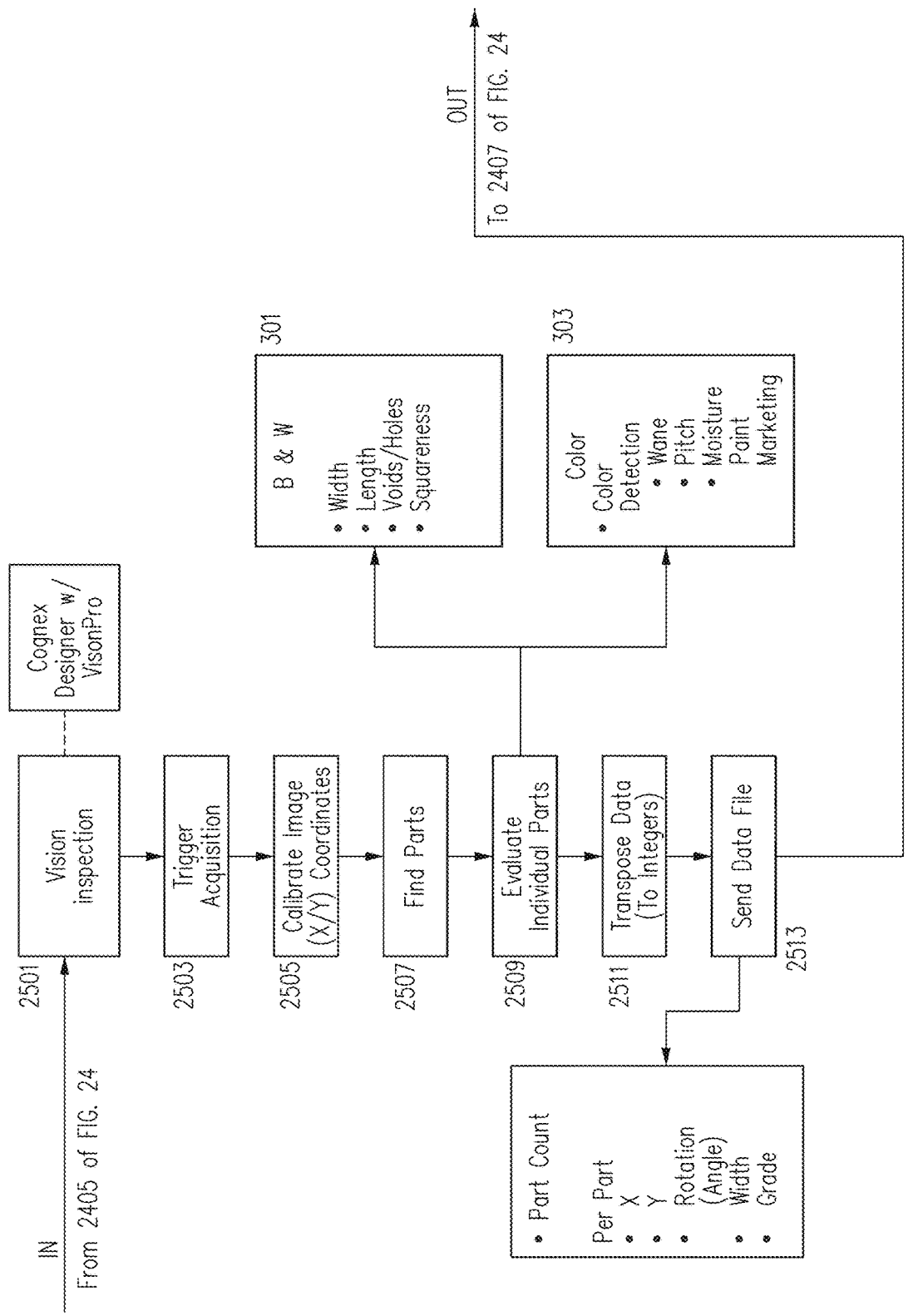
Figure 25B:
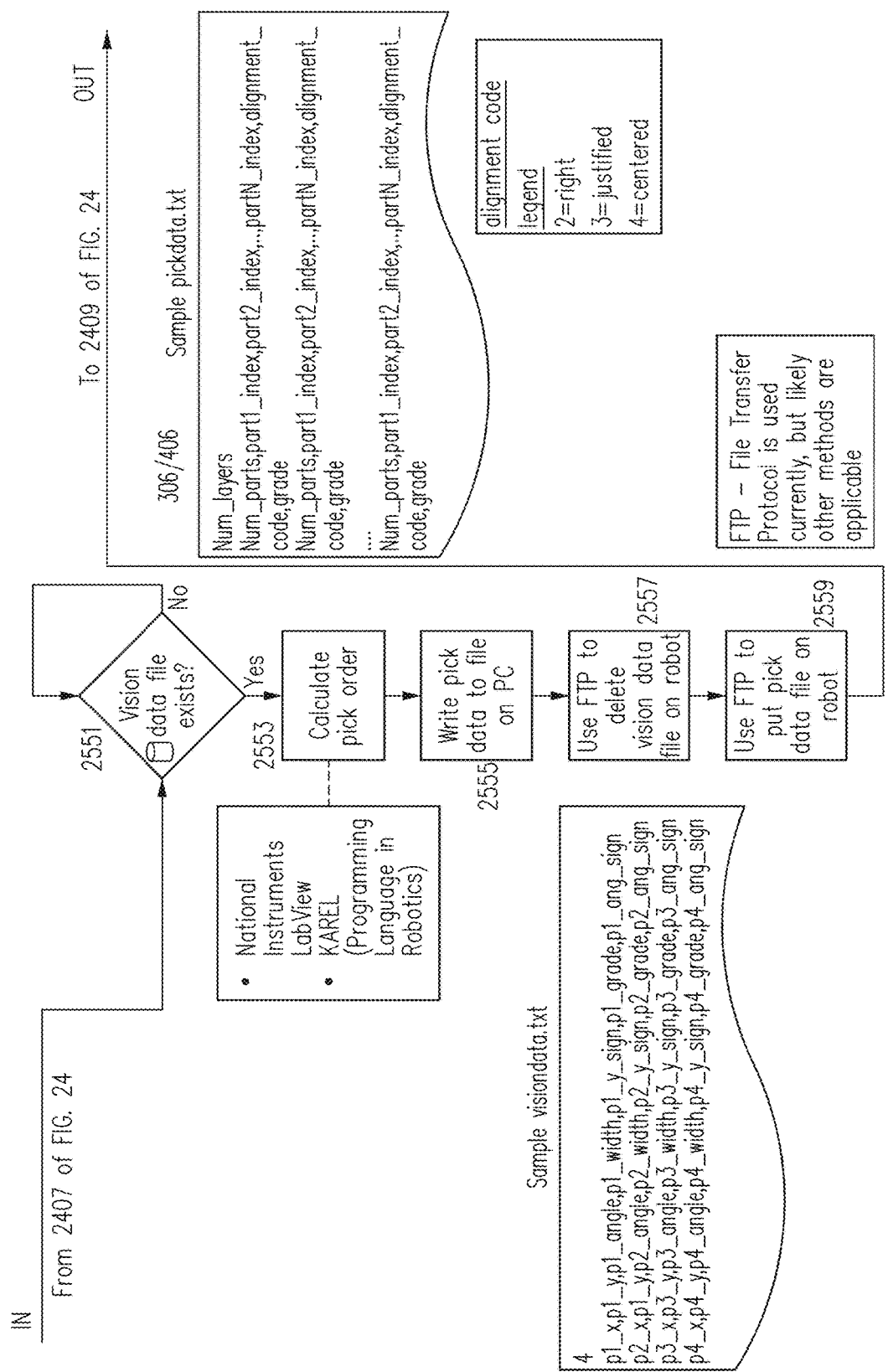

FIGS. 24, 25A, and 25B together are a flow chart of a process 2400 for full or partial sheet of veneer grading and stacking in accordance with one embodiment. Referring to FIGS. 3, 4, 24, 25A and 24B, process 2400 begins at initialize 2401 and proceeds to 2403. At 2403, a determination is made as to whether the parts, e.g., the full or partial sheets of veneer 232 or 241, are in the correct position on the veneer analysis and selection conveyor 345 or 445. If the full or partial sheets of veneer 232 or 241 are not in the correct position process flow proceeds back to 2403 until the full or partial sheets of veneer 232 or 241 are determined to be in the correct position. Process flow then proceeds to 2405.

At 2405, process flow proceeds to FIG. 25A and vision inspection is performed by the vision system 300. Referring to FIG. 25A, at 2501 the vision inspection of the full or partial sheets of veneer 232 or 241 is performed operations 2503 to 2513. At 2503 a trigger is provided to capture black and white and color images of the sheets of veneer 232 or 241. Then at 2505 calibration of the images is performed using defined X and Y coordinates at the vision system location of the veneer analysis and selection conveyor 345 or 445.

At 2507 individual parts, e.g., full or partial sheets of veneer 232 or 241, are identified and at 2509 the individual parts, e.g., full or partial sheets of veneer 232 or 241, are evaluated as described above, using black and white images to determine dimensions data 301 or 401 and color images to generate grading data 303 or 403. At 2511, the dimensions data 301 or 401 and grading data 303 or 403 is transposed into integers.

At 2513, the integer based dimensions data 301 or 401 and grading data 303 or 403 is sent to a dimensions data 301 or 401 and grading data 303 or 403 file for each full or partial sheets of veneer 232 or 241 and the dimensions data 301 or 401 and grading data 303 or 403 file for each full or partial sheets of veneer 232 or 241 is sent to 2407 of FIG. 24.

At 2407 of FIG. 24, a determination is made as to whether the dimensions data 301 or 401 and grading data 303 or 403 file for the full or partial sheet of veneer 232 or 241 exists. If not, the process returns to 2405 and FIG. 25A to generate or find the dimensions data 301 or 401 and grading data 303 or 403 file for the full or partial sheet of veneer 232 or 241. If it is determined at 2407 that the dimensions data 301 or 401 and grading data 303 or 403 file for the full or partial sheet of veneer 232 or 241 exists, process flow proceeds to FIG. 25B and 2551.

At 2551, a determination is again made as to whether the dimensions data 301 or 401 and grading data 303 or 403 file for the full or partial sheet of veneer 232 or 241 exists. If the dimensions data 301 or 401 and grading data 303 or 403 file for the full or partial sheet of veneer 232 or 241 exists, process flow proceeds to 2553. At 2553, the order in which the full or partial sheets of veneer 232 or 241 are selected is determined based on the dimensions data 301 or 401 and grading data 303 or 403 for the full or partial sheet of veneer 232 or 241.

In he case of full sheets of veneer 232, the order in which the full sheets of veneer 232 are selected is determined primarily based on the grading data 303 for the full sheets of veneer 232 and which veneer stack 337 is to receive the full sheets of veneer 232.

However, in the case of partial sheets of veneer 241, not only is the grading data 403 for the partial sheets of veneer 241 used, but also the dimensions data 401. This is because, as discussed above, the dimensions data 401 for each individual partial sheet of veneer 241 is used to generate veneer selection and stacking robot control signals represented by veneer selection and stacking robot control signal data 406 that direct veneer selection and stacking robots 440A and 440B to add each individual partial sheet of veneer 241 in layers of partial sheets of veneer 241 to its appropriate specific veneer stack 443, e.g., veneer stack 1 through veneer stack 5, so that the edges of the individual layers of partial sheets of veneer 241 are aligned. Consequently, the resulting veneer stacks 443 are made up of layers of partial sheets of veneer 241 that are aligned and have even edges/sides and do not have jagged edges. The result is that veneer stacks 443 are not only made up of sheets of veneer 232 accurately determined to be of the correct grade, but that the layers of sheets of veneer 232 are stacked such that veneer stacks 443 resemble ideal veneer stack 243A of FIG. 2I rather than typical prior art veneer stack 243B of FIG. 2I.

To achieve this goal, partial sheets of veneer 241 must be selected in sets or layers so that the sometimes-multiple partial sheets of veneer 241 selected in layers are aligned and have even edges/sides and do not have jagged edges. In addition, the partial sheets of veneer 241 must be selected so that any gaps between the partial sheets of veneer 241, and therefore in the layers of partial sheets of veneer 241, are staggered to avoid creating bulges in the resulting veneer stacks 443. Consequently, when partial sheets of veneer 241 are being processed, the order in which the partial sheets of veneer 232 or 241 are selected at 2553, is determined based on the dimensions data 401 and grading data 403 for the partial sheet of veneer 232 or 241.

From 2553, process proceeds to 2555 where the pick data indicating the order in which the full or partial sheets of veneer 232 or 241 are to be selected is transferred to a file and sent to the robot control system 305 or 405. At 2557 robot control system 305 or 405 converted into veneer selection and stacking robot control signal data 306 or 406 and deletes any previous veneer selection and stacking robot control signal data 306/406 from the veneer selection and stacking robots 340A and 340B or 440A and 440B. At 2559, and the veneer selection and stacking robot control signal data 306 or 406 is then transferred to the veneer selection and stacking robots 340A and 340B or 440A and 440B. Process then returns to FIGS. 24 and 2409.

At 2409, the veneer selection and stacking robot control signal data 306 or 406 is loaded into memory registers on veneer selection and stacking robots 340A and 340B or 440A and 440B. At 2411, in response to the veneer selection and stacking robot control signal data 306 or 406, veneer selection and stacking robots 340A and 340B or 440A and 440B select the correct parts and move them onto the appropriate veneer stacks 237 or 241.

At 2413, the veneer selection and stacking robot control signal data 306 or 406 is then deleted and the process reverts to 2403 to await new data for the next pick.

Figure 26:
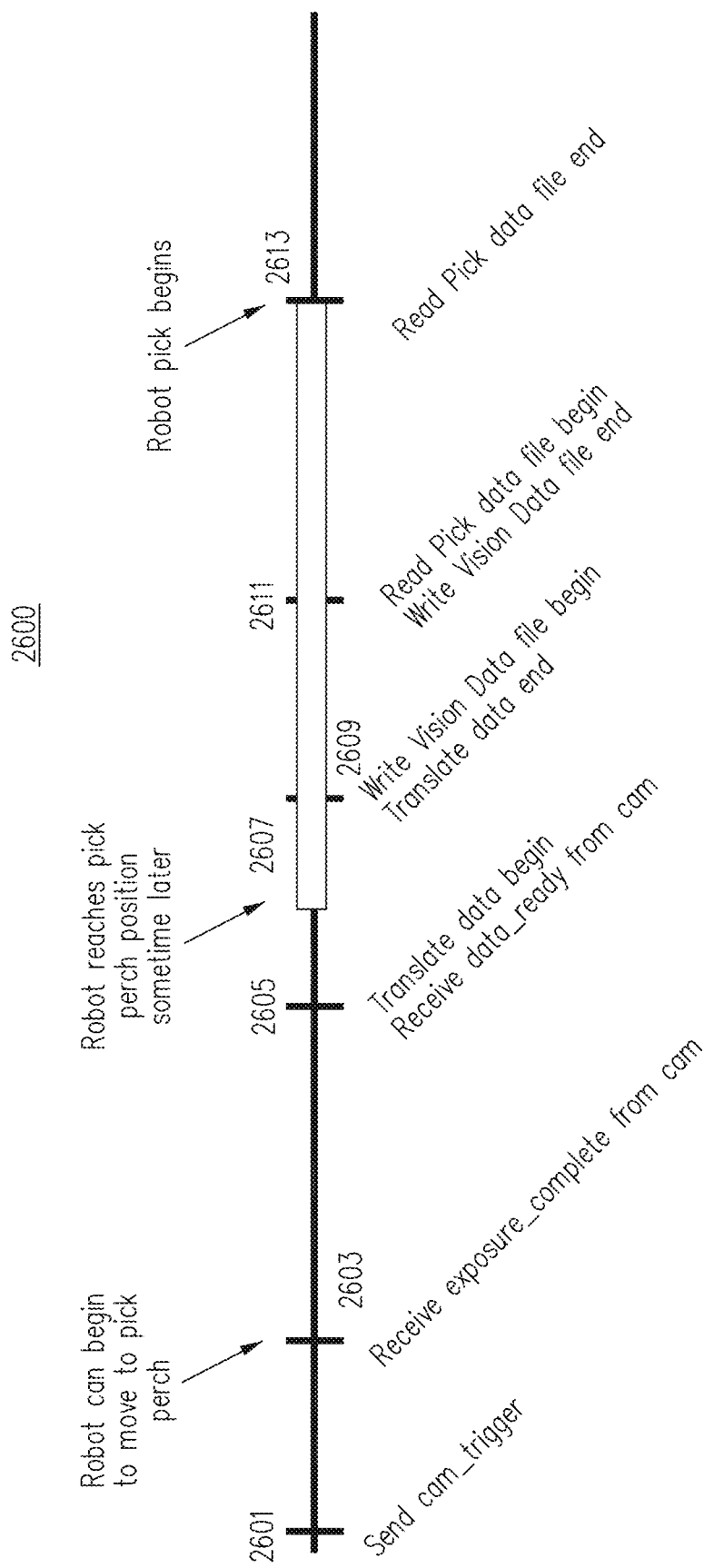
FIG. 26 is a timing diagram of a process for a full or partial sheet of veneer grading and stacking system in accordance with one embodiment.

FIG. 26 is a timing diagram 2600 of a process for a full or partial sheet of veneer grading and stacking system in accordance with one embodiment. Referring to FIGS. 3, 4, and 26, at 2601 the cameras of the vision system are triggered and at 2603 the image data from the cameras is received and the veneer selection and stacking robots 340A and 340B or 440A and 440B can begin move into their pre-position stance.

At 2605, the transmission of the image data is begun and at 2607 the veneer selection and stacking robots 340A and 340B or 440A and 440B reach their pre-positions.

At 2609, the image data is processed, the dimensions data 301/401 and grading data 303/403 is generated, and at 2611 veneer selection and stacking robot control signal data 306/406 is generated.

At 2613, the veneer selection and stacking robot control signal data 306/406 is received by the veneer selection and stacking robots 340A and 340B or 440A and 440B and the veneer selection and stacking robots 340A and 340B or 440A and 440B move to select the correct parts and move them onto the appropriate veneer stacks 237 or 241.

Figure 27:
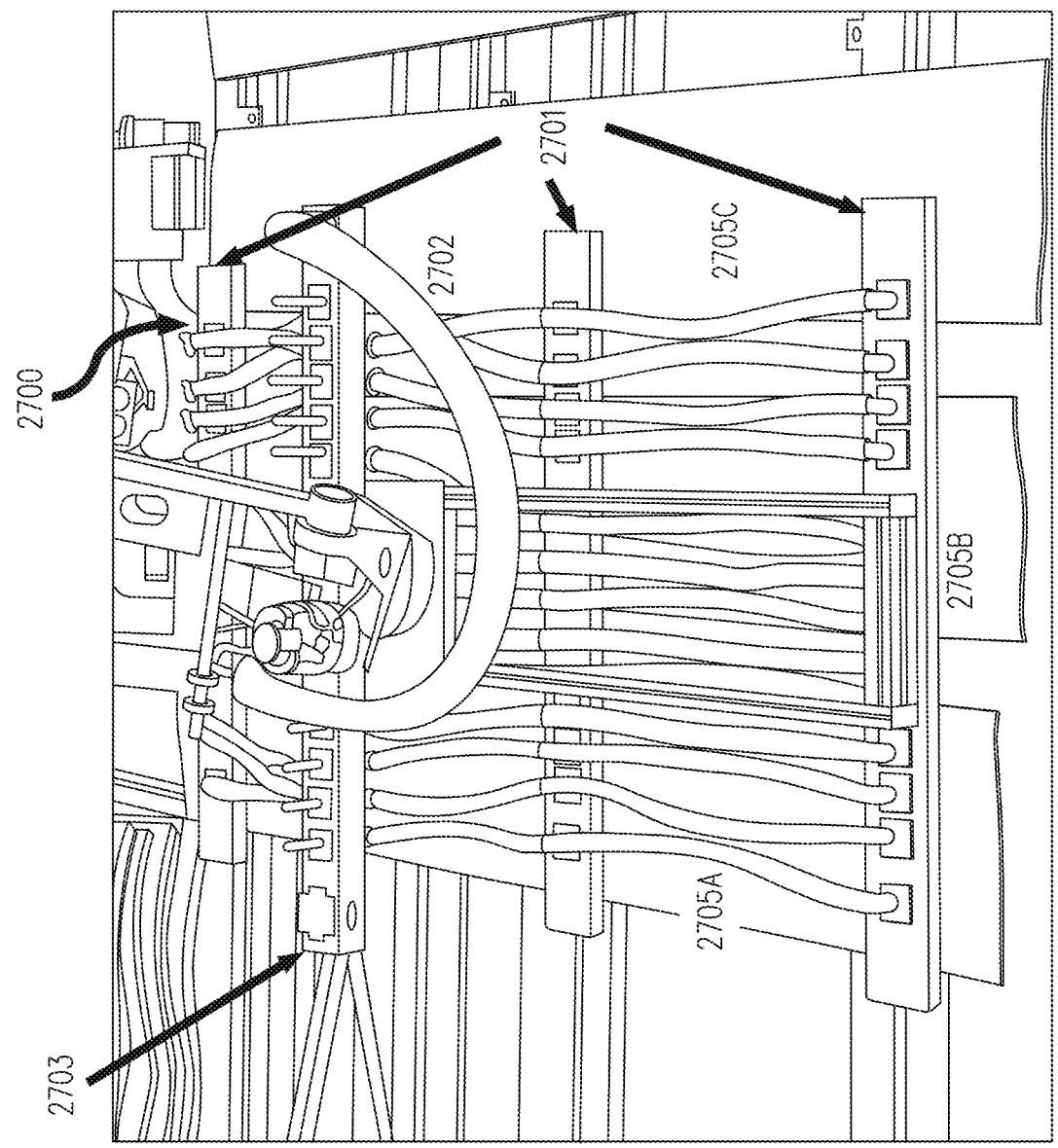
FIG. 27 is an illustration of a selectively activated vacuum arm in accordance with one embodiment.

As noted above, in some embodiments, the veneer selection and stacking robots use selectively activated vacuum arms that are faster than humans and are far less likely to damage the relatively fragile full or partial sheets of veneer. FIG. 27 is an illustration of a selectively activated vacuum arm in accordance with one embodiment.

As seen in FIG. 27, selectively activated vacuum arm 2700 includes main vacuum hose 2702, vacuum hose sets 2705A, 2505B, and 2505C, vacuum port bars 2701, and vacuum actuator bar 2703.

Referring to FIGS. 3, 4, and 27, in operation, main vacuum hose 2702 provides suction to vacuum actuator bar 2703. Then, in response to the veneer selection and stacking robot control signal data 306 or 406, vacuum actuator bar 2703 selectively provides suction to vacuum ports (not shown) on the underside of vacuum port bars 2701 via vacuum hose sets 2705A, 2505B, and 2505C. In this way, selectively activated vacuum arm 2700 can pick up selected full or partial sheets of veneer 232 or 241 using vacuum suction and move selected full or partial sheets of veneer 232 or 241 to the appropriate veneer stack 337 or 443. Since only vacuum suction is used to select and move full or partial sheets of veneer 232 or 241, there is minimal chance of damage to full or partial sheets of veneer 232 or 241.

Figure 28:
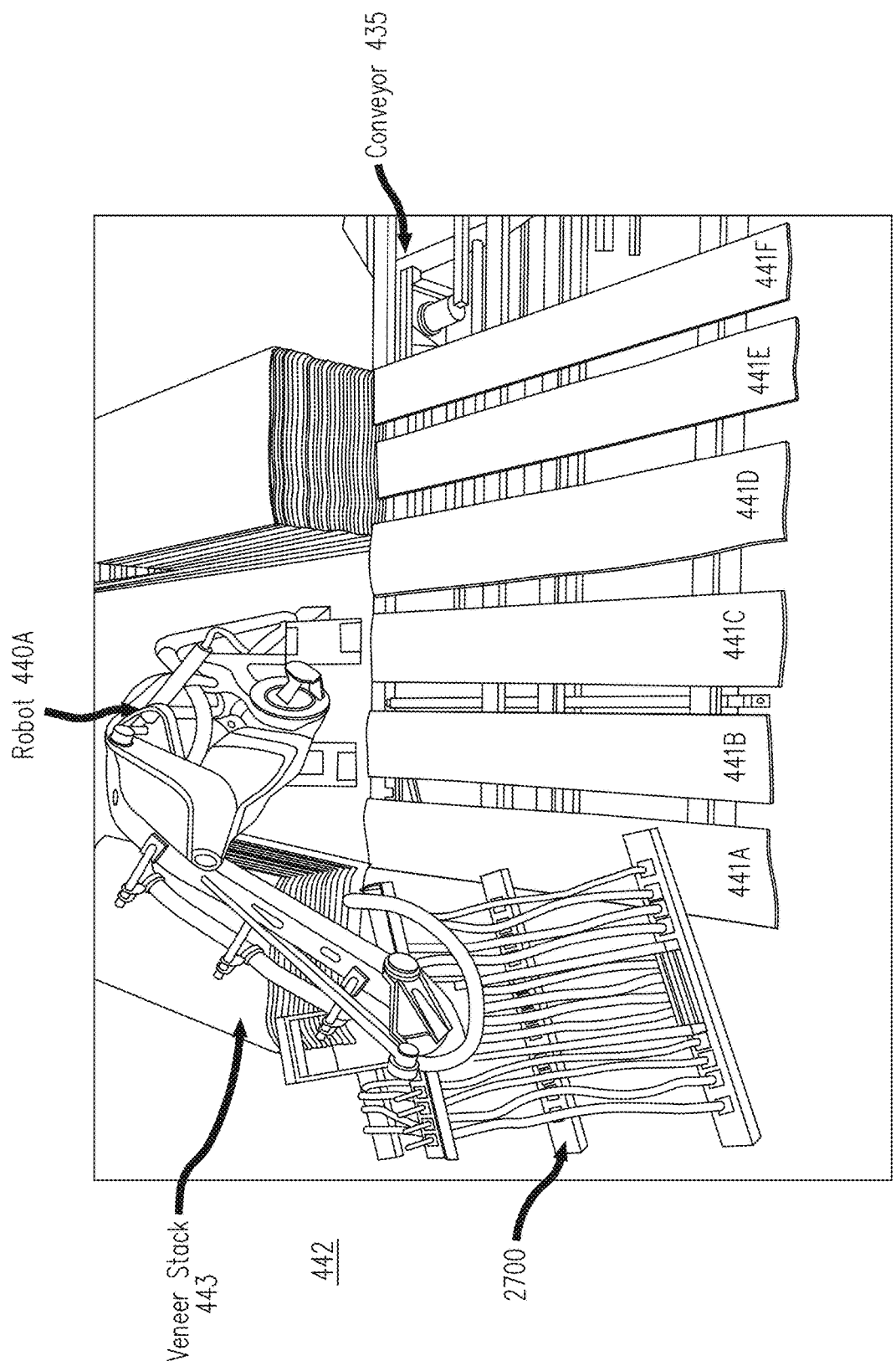
FIG. 28 is local robotic partial sheet of veneer stacking cell in accordance with one embodiment.

FIG. 28 is local robotic partial sheet of veneer stacking cell 442 in accordance with one embodiment. Referring to FIGS. 3, 4, and 28, as seen in FIG. 28, in this specific embodiment, local robotic partial sheet of veneer stacking cell 442 includes: veneer selection and stacking robot 440A, including selectively activated vacuum arm 2700; veneer analysis and selection conveyor 435; veneer stack 443, and partial sheets of veneer 441A, 441B, 441C, 441D, 441E, and 441F.

Figure 29A:
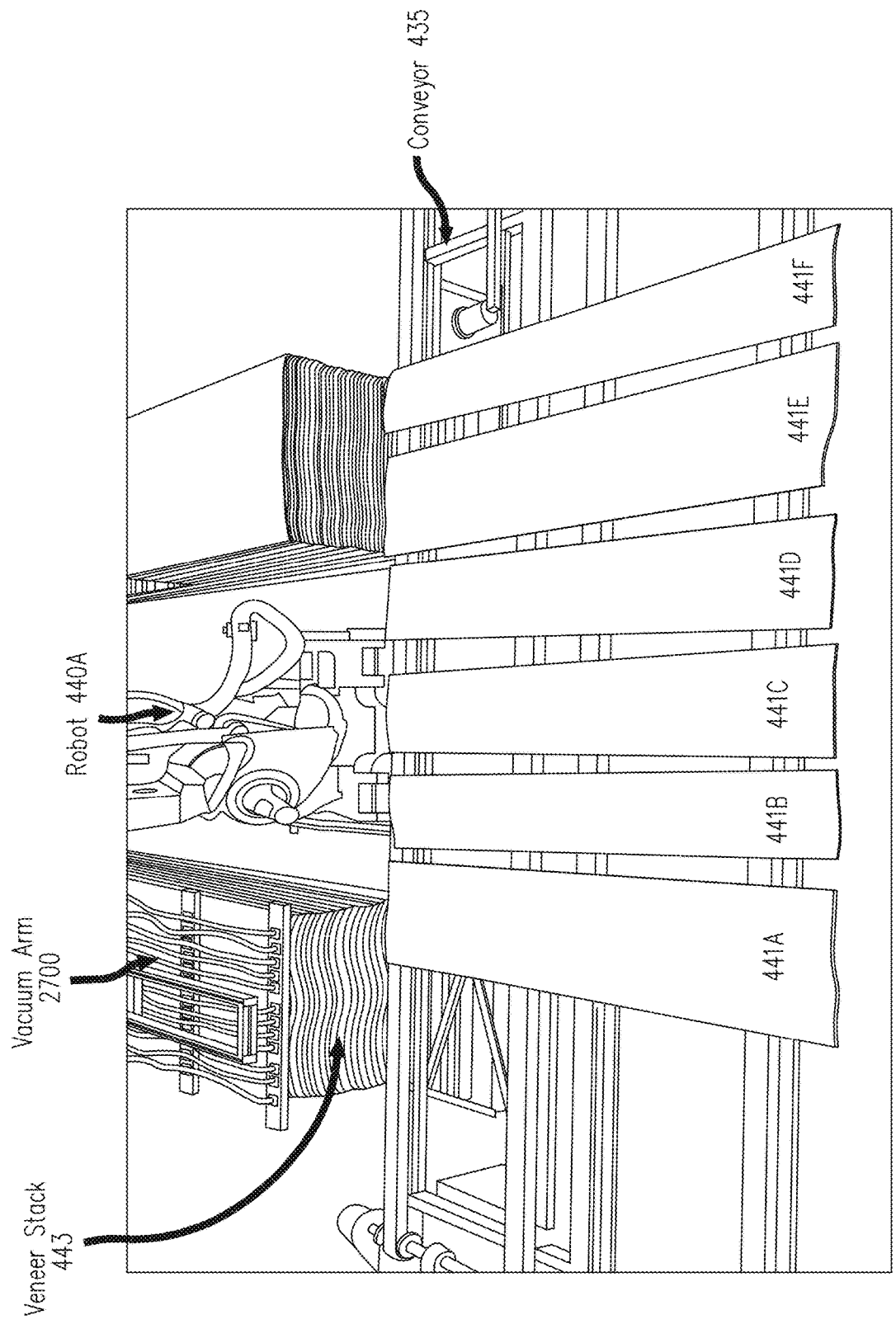
FIGS. 29A through 29N show the use of the local robotic partial sheet of veneer stacking cell of FIG. 28 to create a layer of partial veneer sheets in a partial veneer stack in accordance with one embodiment.
Figure 29B:
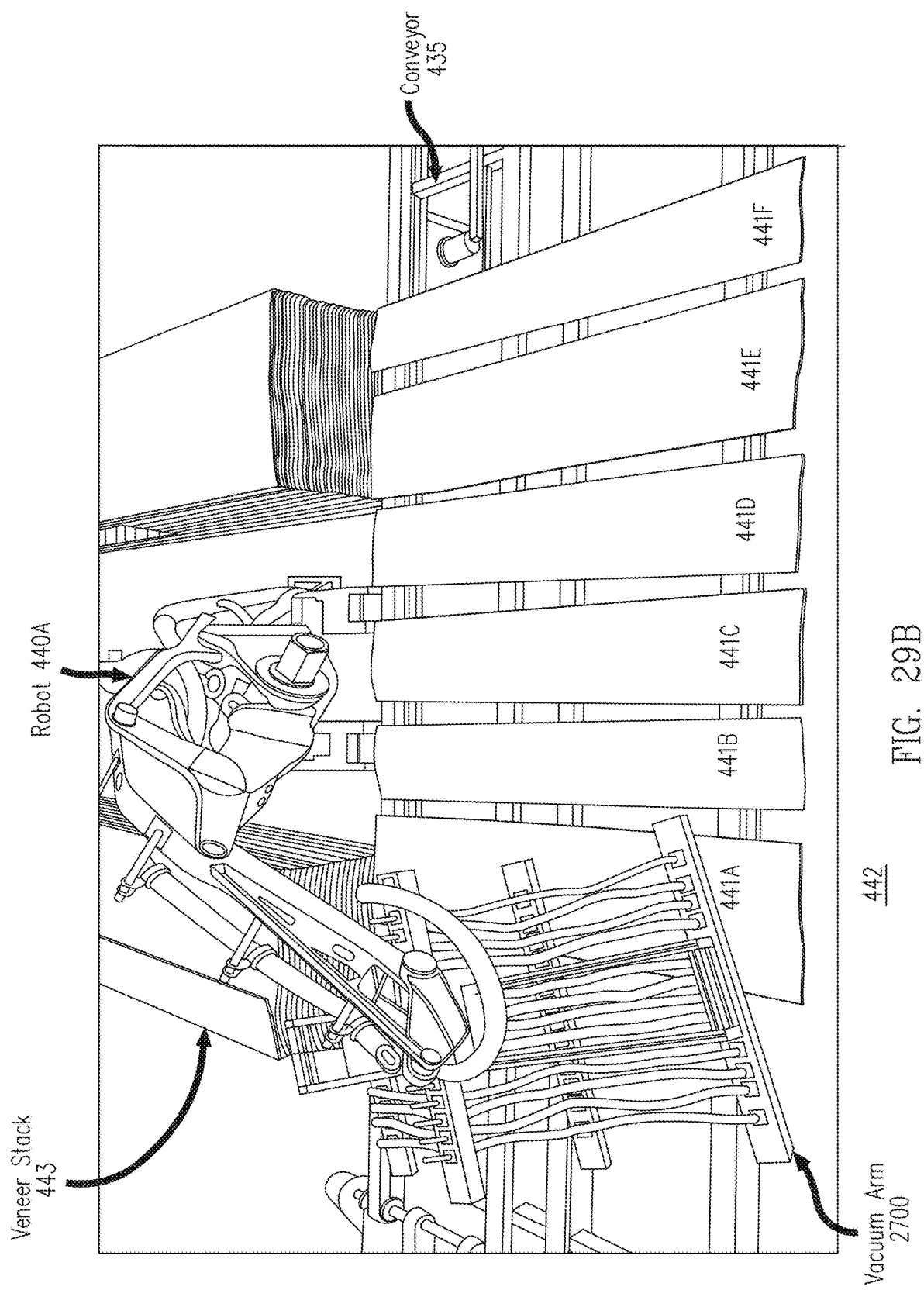
Figure 29C:
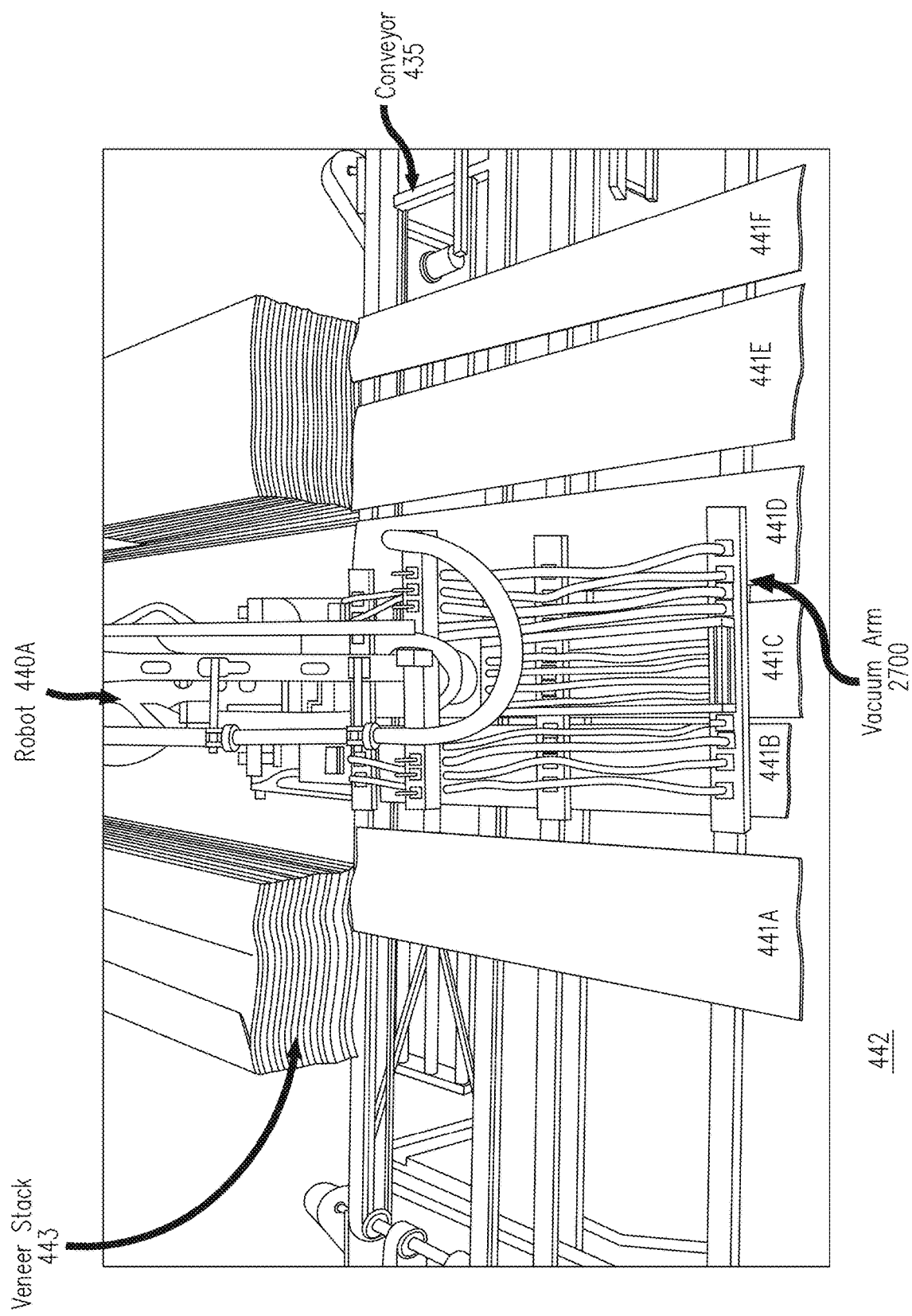
Figure 29D:
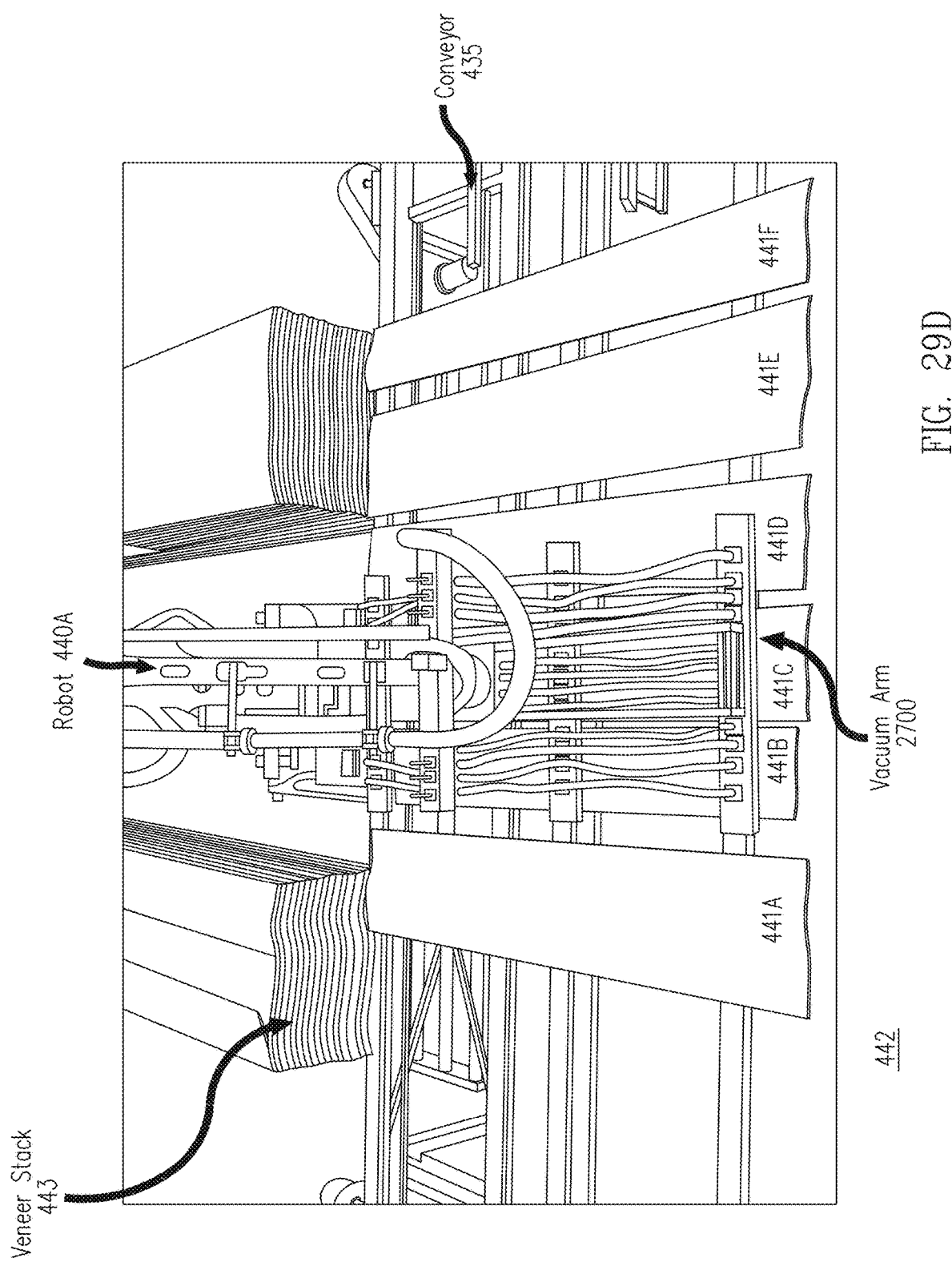
Figure 29E:
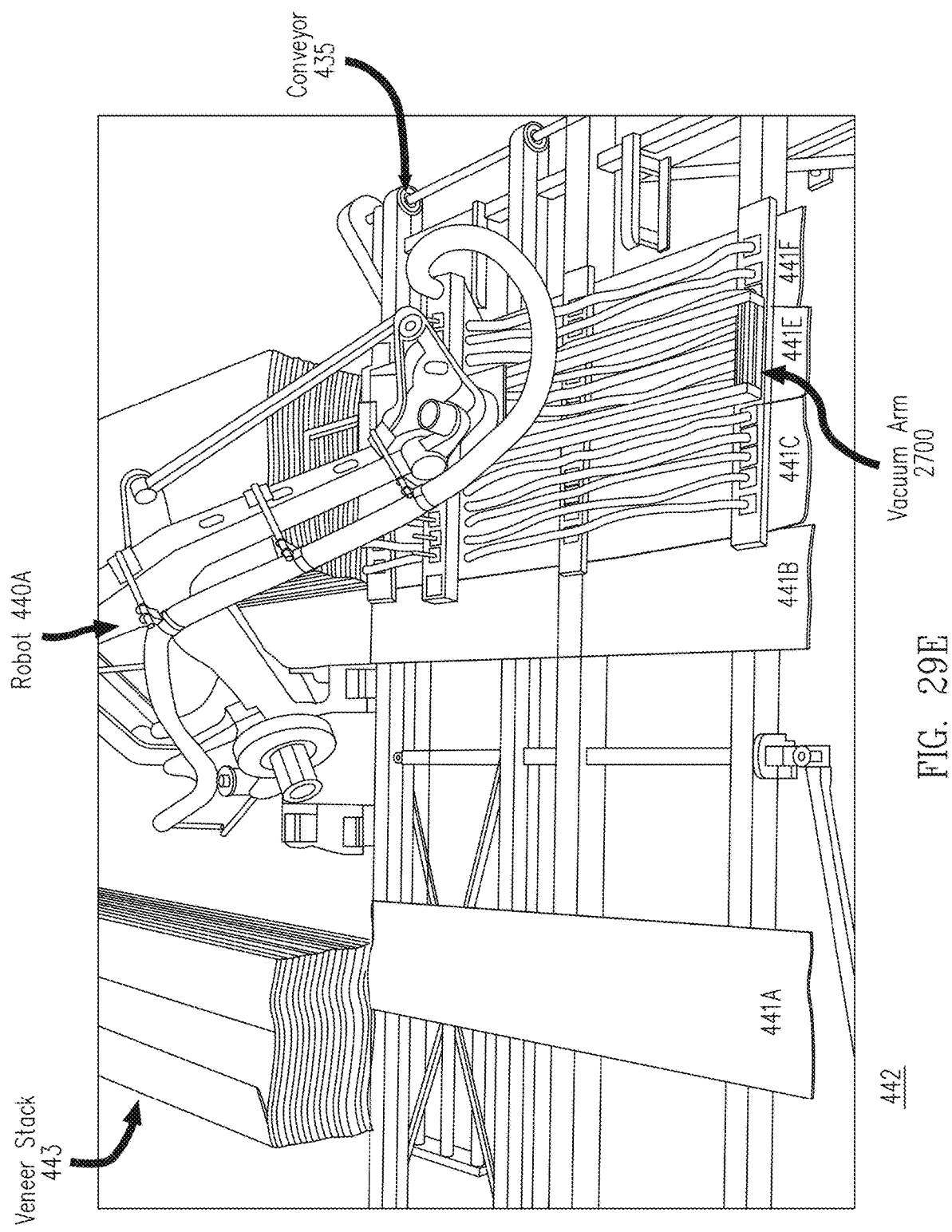
Figure 29F:
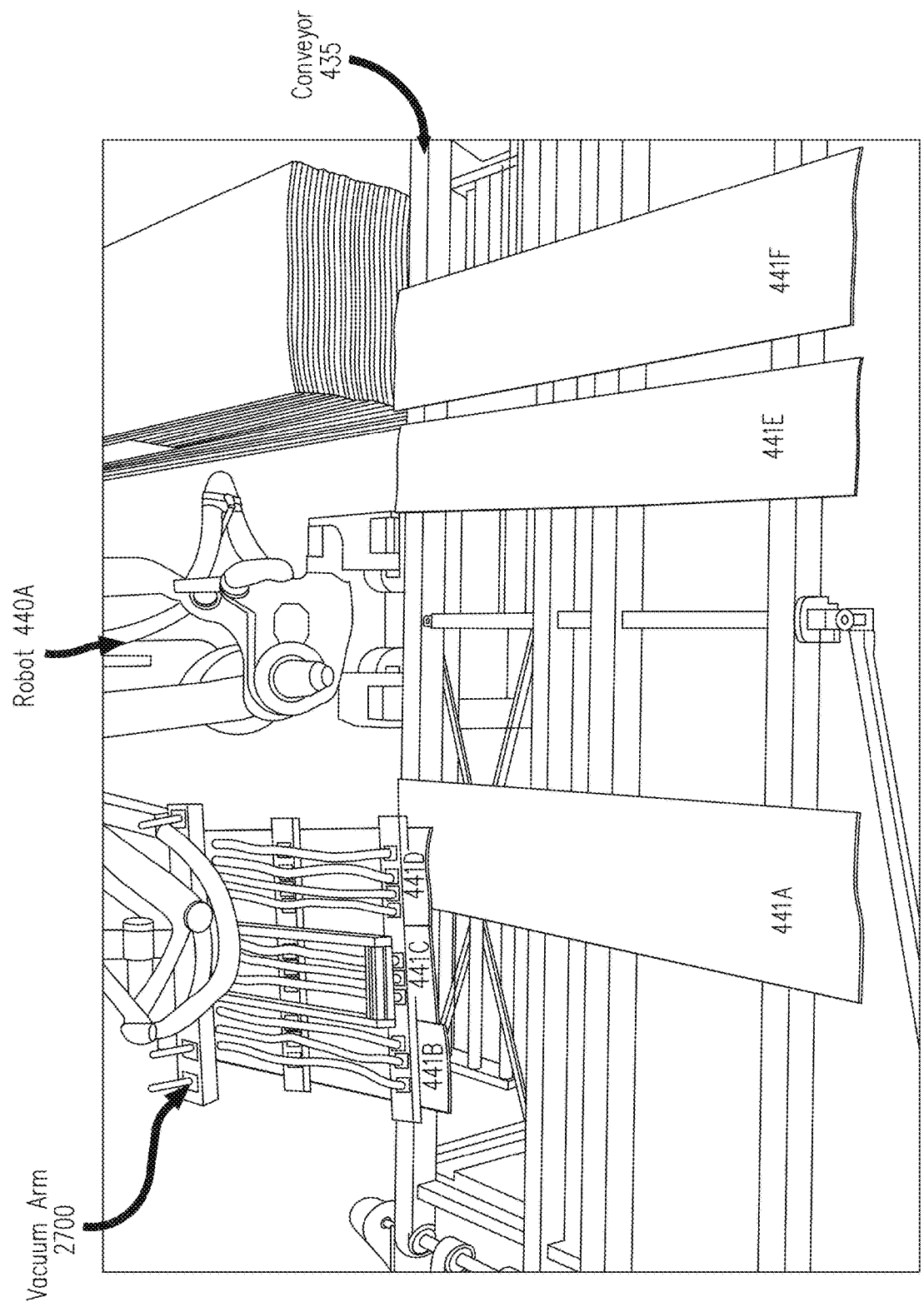
Figure 29G:
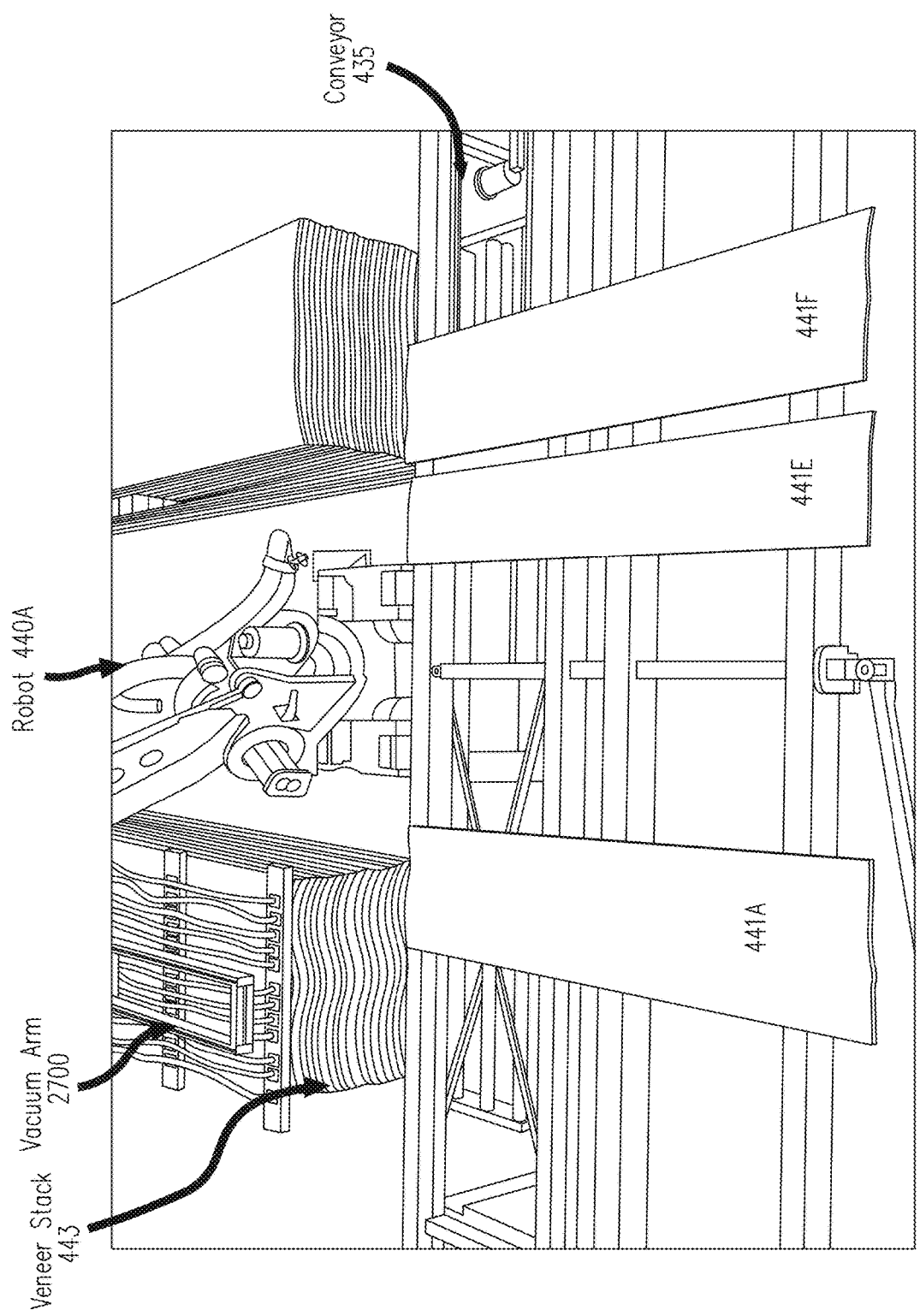
Figure 29H:
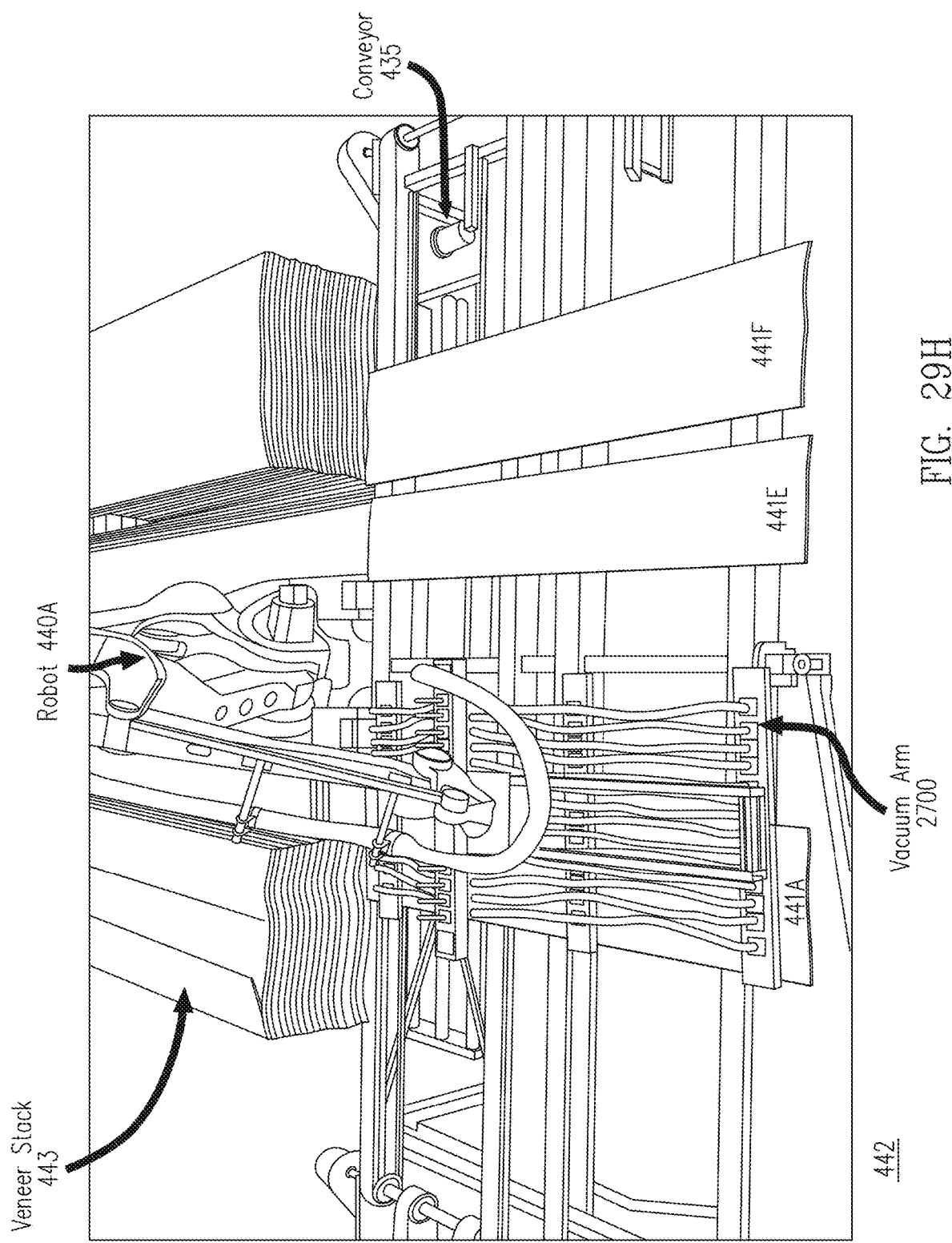
Figure 29I:
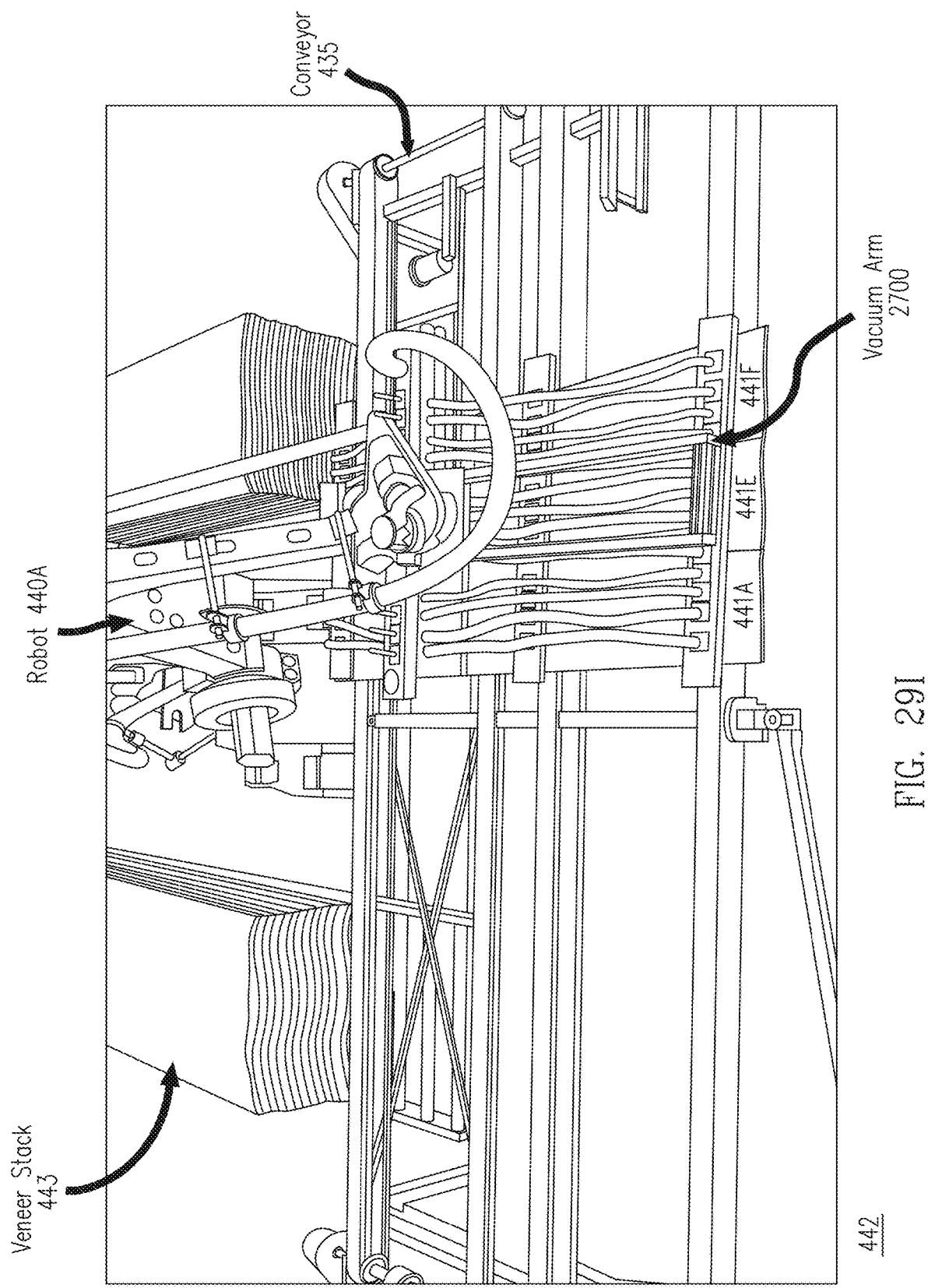
Figure 29J:
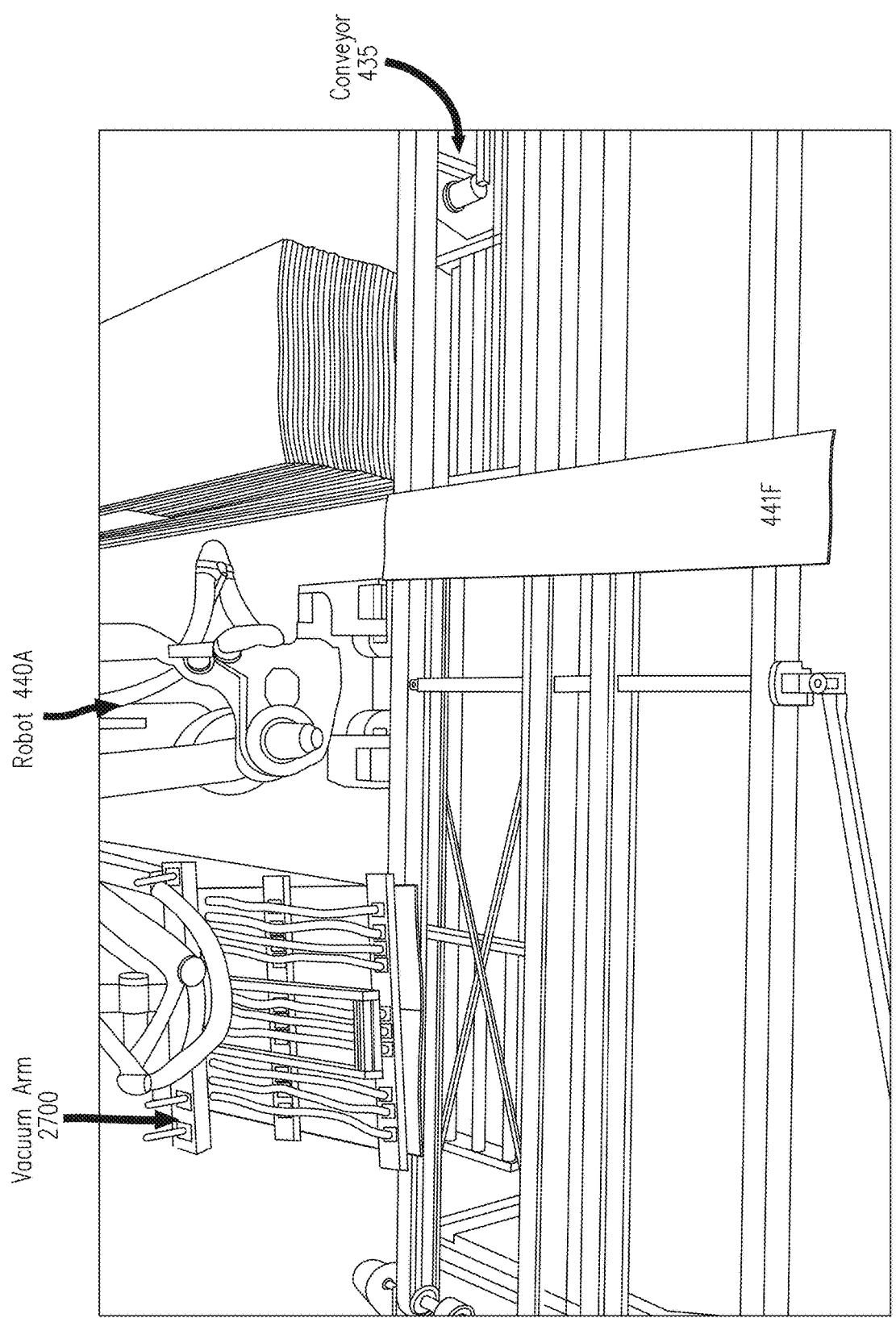
Figure 29K:
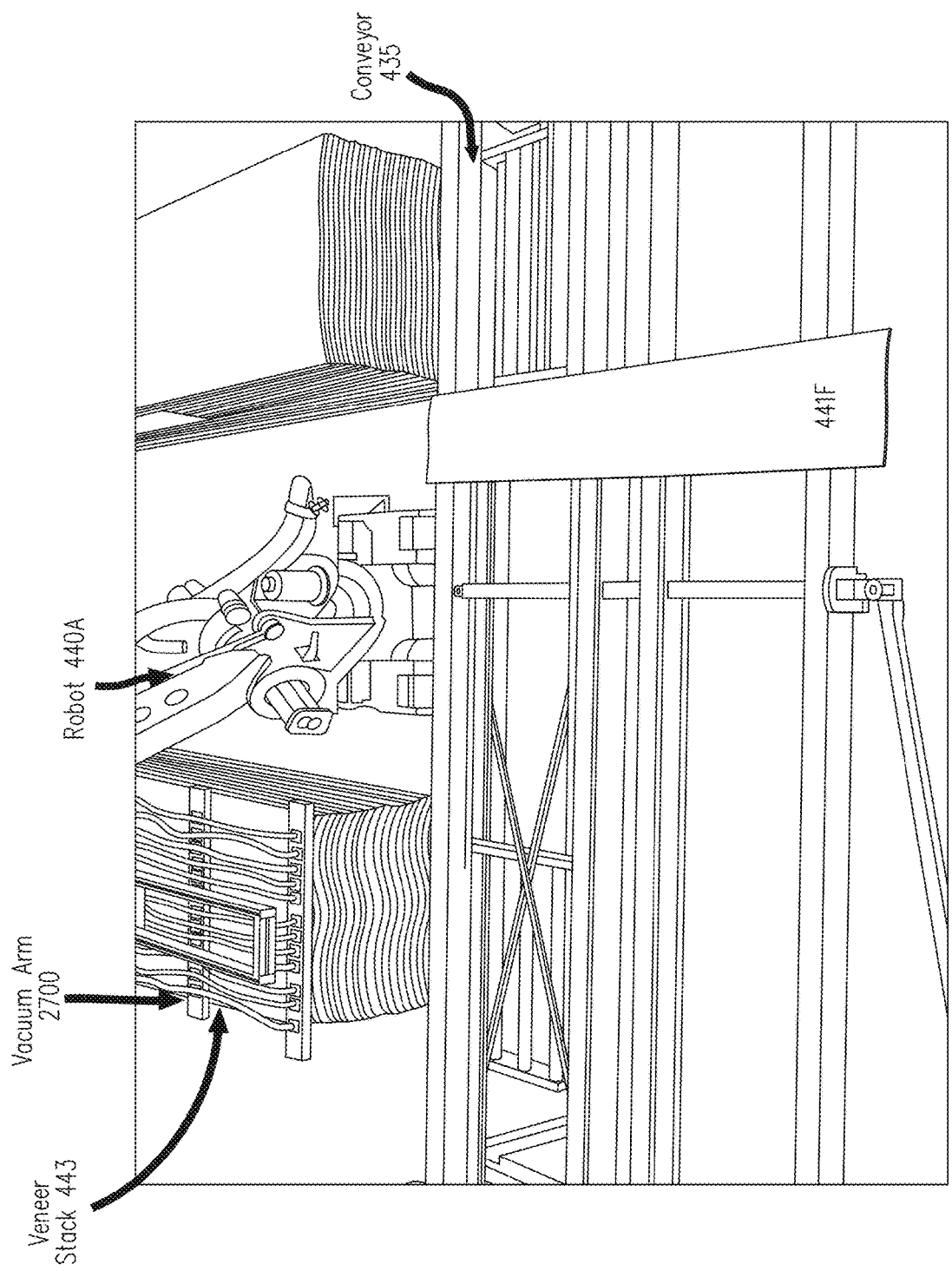
Figure 29L:
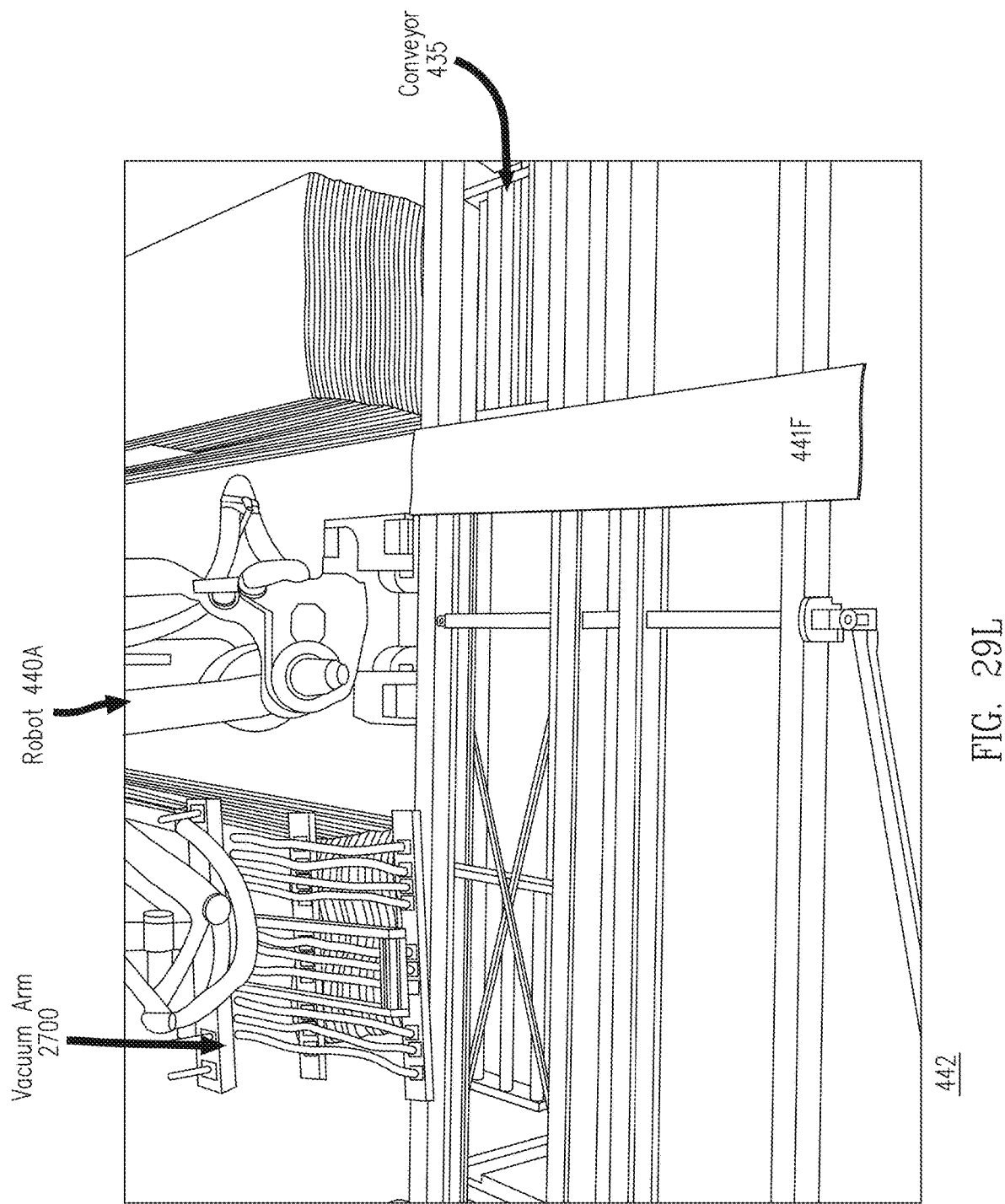
Figure 29M:
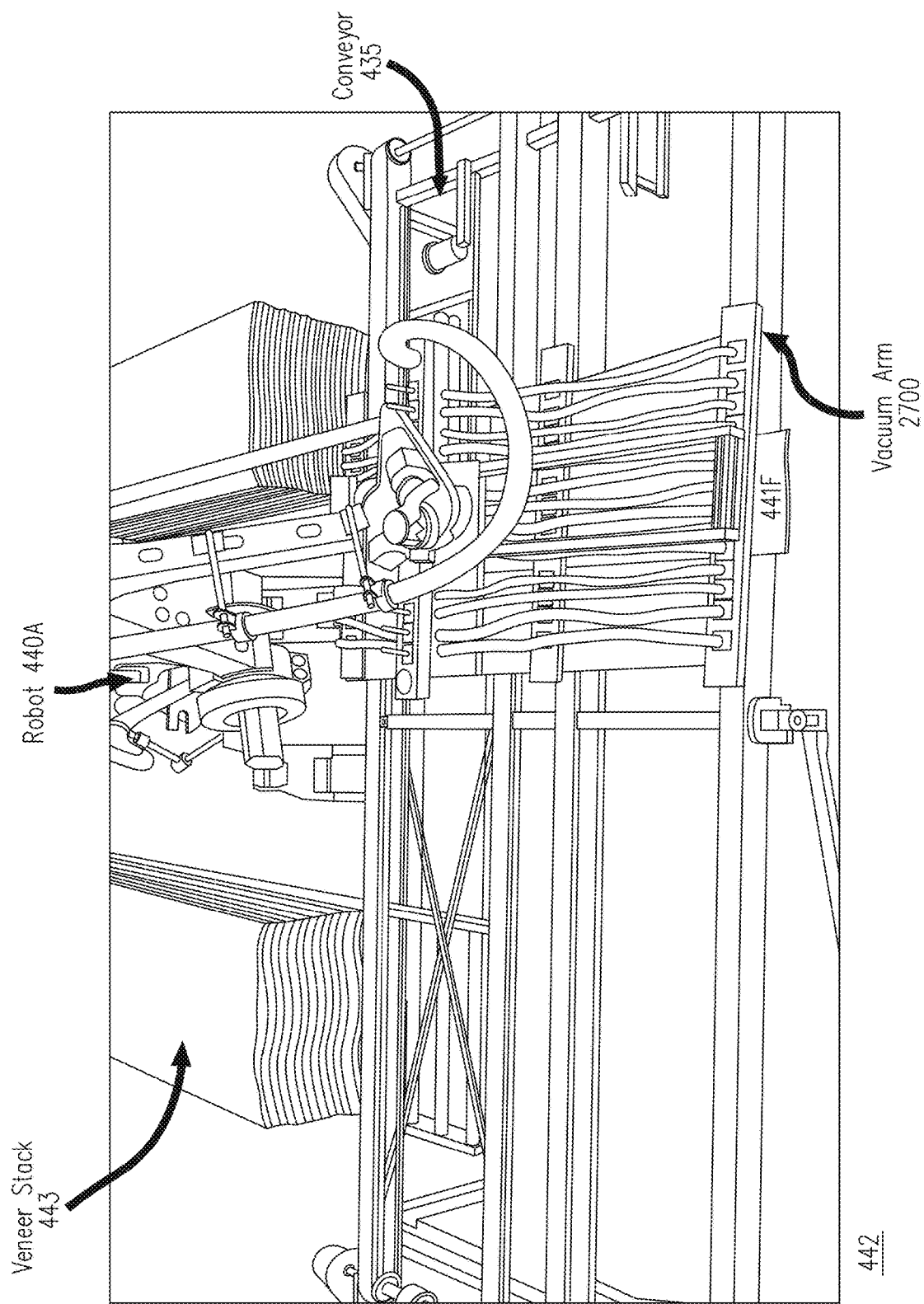
Figure 29N:
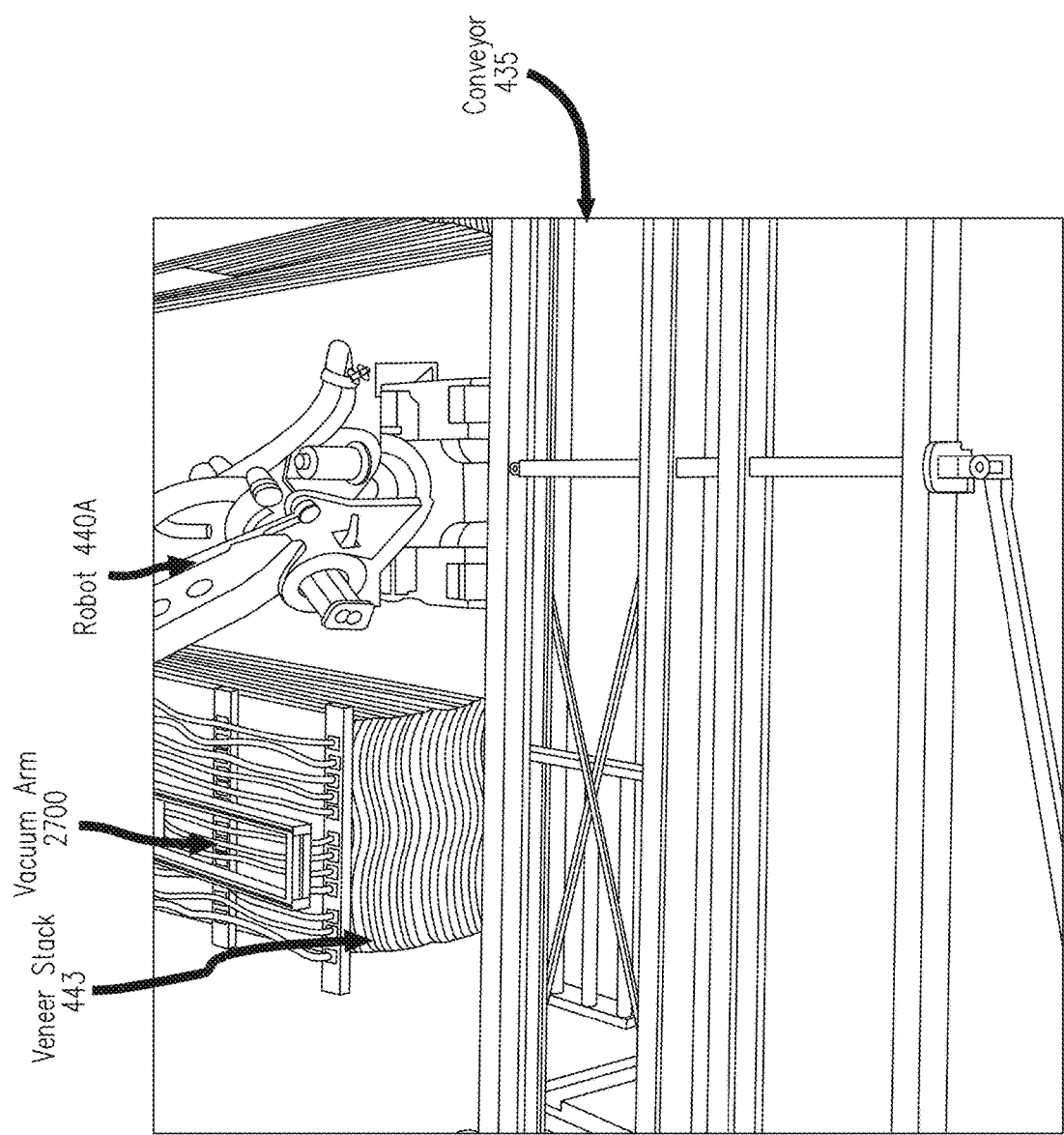

FIGS. 29A through 29N show the use of the local robotic partial sheet of veneer stacking cell 442 of FIG. 28 to create a layer of partial veneer sheets in a partial veneer stack in accordance with one embodiment Referring to FIGS. 4, 27, 28, and 29A through 29N, as discussed above, in the case of partial sheets of veneer 241, not only is the grading data 403 for the partial sheets of veneer 241 used, but also the dimensions data 401. This is because, as discussed above, the dimensions data 401 for each individual partial sheet of veneer 241 is used to generate veneer selection and stacking robot control signals represented by veneer selection and stacking robot control signal data 406 that direct veneer selection and stacking robots 440A and 440B to add each individual partial sheet of veneer 241 in layers of partial sheets of veneer 241 to its appropriate specific veneer stack 443, e.g., veneer stack 1 through veneer stack 5, so that the edges of the individual layers of partial sheets of veneer 241 are aligned. Consequently, the resulting veneer stacks 443 are made up of layers of partial sheets of veneer 241 that are aligned and have even edges/sides and do not have jagged edges. The result is that veneer stacks 443 are not only made up of sheets of veneer 232 accurately determined to be of the correct grade, but that the layers of sheets of veneer 232 are stacked such that veneer stacks 443 resemble ideal veneer stack 243A of FIG. 2I rather than typical prior art veneer stack 243B of FIG. 2I.

To achieve this goal, partial sheets of veneer 241 must be selected in sets or layers so that the sometimes-multiple partial sheets of veneer 241 selected in layers are aligned and have even edges/sides and do not have jagged edges. In addition, the partial sheets of veneer 241 must be selected so that any gaps between the partial sheets of veneer 241, and therefore in the layers of partial sheets of veneer 241, are staggered to avoid creating bulges in the resulting veneer stacks 443. Consequently, when partial sheets of veneer 241 are being processed, the order in which the partial sheets of veneer 232 or 241 are selected is determined based on the dimensions data 401 and grading data 403 for the partial sheet of veneer 232 or 241.

Referring to FIGS. 3, 4, 27, 28, and 29A through 29N, as seen in FIG. 29A, partial sheets of veneer 441A, 441B, 441C, 441D, 441E, and 441F are brought into position beside veneer selection and stacking robot 440A by veneer analysis and selection conveyor 435. As seen in FIG. 29B, in response to veneer selection and stacking robot control signal data 406, veneer selection and stacking robot 440A then begins to position selectively activated vacuum arm 2700 over partial sheets of veneer 441A, 441B, 441C, 441D, 441E, and 441F.

As seen in FIG. 29C, in response to veneer selection and stacking robot control signal data 406, veneer selection and stacking robot 440A positions selectively activated vacuum arm 2700 over partial sheets of veneer 441B, 441C, and 441D and as seen in FIGS. 29D and 29E, in response to veneer selection and stacking robot control signal data 406, selectively activated vacuum arm 2700 of veneer selection and stacking robot 440A selects partial sheets of veneer 441B, 441C and 441D as a layer of partial sheets of veneer.

As seen in FIGS. 29F and 29G, in response to veneer selection and stacking robot control signal data 406, veneer selection and stacking robot 440A adds partial sheets of veneer 441B, 441C and 441D as a layer of partial sheets of veneer to veneer stack 443.

As seen in FIG. 29H, in response to veneer selection and stacking robot control signal data 406, veneer selection and stacking robot 440A then returns selectively activated vacuum arm 2700 to a position over partial sheet of veneer 441A and selects partial sheet of veneer 441A. Then, as seen in FIG. 29I, in response to veneer selection and stacking robot control signal data 406, veneer selection and stacking robot 440A also selects partial sheet of veneer 441E. Then, as seen in FIGS. 29J and 29K, in response to veneer selection and stacking robot control signal data 406, veneer selection and stacking robot 440A adds partial sheets of veneer 441A and 441E as a layer of partial sheets of veneer to veneer stack 443.

As seen in FIGS. 29K and 29L, after creating two layers of partial sheets of veneer to veneer stack 443, only partial sheet of veneer 441F remains on veneer analysis and selection conveyor 435. As seen in FIG. 29L in response to veneer selection and stacking robot control signal data 406, veneer selection and stacking robot 440A then returns selectively activated vacuum arm 2700 to a position over partial sheet of veneer 441F. As seen in FIG. 29M, in response to veneer selection and stacking robot control signal data 406, veneer selection and stacking robot 440A selects partial sheet of veneer 441F and, as seen in FIG. 29N, in response to veneer selection and stacking robot control signal data 406, veneer selection and stacking robot 440A adds partial sheet of veneer 441F to veneer stack 443 as a third layer of partial sheets of veneer.

Of note is the fact that, in one embodiment, in response to veneer selection and stacking robot control signal data 406, veneer selection and stacking robot 440A adds layers of partial sheets of veneer to veneer stack 443, such as partial sheets of veneer 441A and 441E of FIGS. 29J and 29K, such that any gaps between individual partial sheets of veneer 441 in the layers of individual partial sheets of veneer 441 are staggered so that no bulges of low and high points are created. Likewise, in response to veneer selection and stacking robot control signal data 406, veneer selection and stacking robot 440A adds layers of single partial sheets of veneer, such as partial sheet of veneer 441F of FIGS. 29M and 29N, to veneer stack 443 such that single partial sheets of veneer layers rotate from a left of center position of veneer stack 443 to the center position of veneer stack 443 to a right of center position of veneer stack 443 and then back to a left of center position of veneer stack 443 and so on cycling through the three positions of veneer stack 443. In this way the formation of bulges in veneer stack 443 are also avoided.

The innovations disclosed herein are described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer and should not be confused with acts performed by a human being. The actual computer operations corresponding to these terms vary depending on implementation.

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present, or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms may be high-level descriptions of the actual operations that are performed. The actual operations that correspond to these terms may vary depending on the particular implementation.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically, or chemically) coupled or linked and does not exclude the presence of intermediate elements between the coupled or associated items absent specific contrary language.

As used herein, operations that occur "simultaneously" or "concurrently" occur generally at the same time as one another, although delays in the occurrence of one operation relative to the other due to, for example, spacing, play or backlash between components in a mechanical linkage such as threads, gears, etc., are expressly within the scope of the above terms, absent specific contrary language.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 23, computer-readable storage media include memory 2320 and 2325, and storage 2340. The term computer-readable storage media does not include communication connections (e.g., 2370) such as signals and carrier waves.

Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

In view of the many possible embodiments to which the principles of the disclosed technology may be applied, it should be recognized that the illustrated embodiments are only preferred examples of the disclosed technology and should not be taken as limiting the scope of the disclosed technology. Rather, the scope of the disclosure is at least as broad as the following claims. We therefore claim all that comes within the scope of these claims.

Therefore, numerous variations, whether explicitly provided for by the specification or implied by the specification or not, may be implemented by one of skill in the art in view of this disclosure.

What is claimed is:

1. A veneer grading and stacking system, the veneer grading and stacking system comprising:
   a veneer analysis and selection conveyor for conveying full sheets of veneer;
   a vision system for veneer inspection and grading, the vision system being located at a vision system location along the veneer analysis and selection conveyor, the vision system capturing one or more images of the individual full sheets of veneer and generating dimensions data and grading data for each individual full sheet of veneer, the vision system for veneer inspection and grading including:
   a first camera to capture a black and white image of an entire surface of a full sheet of veneer, wherein the first camera has a first field of view, and further wherein the first camera captures a black and white image of the full sheet of veneer at a first location along a veneer analysis and selection conveyor of a production line, the first location being within the first field of view;

a second camera to capture a color image of the entire surface of the full sheet of veneer, wherein the second camera has a second field of view, the second field of view substantially overlapping with the first field of view and further wherein the second camera captures a color image of the full sheet of veneer at the first location, the first location being within the second field of view; and a vision system controller to:
translate the black and white image from the first camera and the color image from the second camera such that the same portion of the full sheet of veneer captured by each camera is overlaid in a composite view and the images have the same horizontal spacing;

perform computer processing of the black and white image to accurately determine one or more of the dimensions of the full sheet of veneer, the existence of voids within the full sheet of veneer, and the presence of debris on the full sheet of veneer;

perform computer processing of the color image to determine whether colored defects are present in the full sheet of veneer; and assign a grade to the full sheet of veneer based at least in part on the computer processing of the black and white image and the computer processing of the color imaged;

one or more veneer selection and stacking robot control systems to control the operation of one or more veneer selection and stacking robots, the one or more veneer selection and stacking robot control systems generating veneer selection and stacking robot control signals based on analysis of the dimensions data and grading data for each individual full sheet of veneer; and one or more veneer selection and stacking robots, the one or more veneer selection and stacking robots moving individual full sheets of veneer from the veneer analysis and selection conveyor system to an appropriate veneer stack of two or more veneer stacks in response to the veneer selection and stacking robot control signals received from the one or more veneer selection and stacking robot control systems.

2. The veneer grading and stacking system of claim 1, wherein the first and second cameras of the vision system for veneer inspection and grading are mounted above the veneer analysis and selection conveyor at a vision system location to capture respective black and white and color images of the full sheet of veneer at the first location of the full sheet of veneer along the veneer analysis and selection conveyor.

3. The veneer grading and stacking system of claim 1, wherein the vision system controller is configured to determine a scaling factor between the full sheet of veneer and the black and white image based at least in part on known dimensions of a reference image.

4. The veneer grading and stacking system of claim 1, wherein the vision system controller of the vision system for veneer inspection and grading is configured to auto-rotate the black and white image and the color image such that the black and white image and the color image have the same orientation as a reference image.

5. The veneer grading and stacking system of claim 1, wherein the vision system controller of the vision system for veneer inspection and grading is configured to translate the black and white image and the color image such that the black and white image and the color image are each oriented to match the orientation of the reference image.

6. The veneer grading and stacking system of claim 1 wherein at least one of the one or more veneer selection and stacking robots includes a selectively activated vacuum arm for moving each individual full sheet of veneer from the veneer analysis and selection conveyor system to an appropriate veneer stack of two or more veneer stacks in response to the veneer selection and stacking robot control signals received from the one or more veneer selection and stacking robot control systems.

7. A veneer grading and stacking system, the veneer grading and stacking system comprising:
a veneer analysis and selection conveyor for conveying partial sheets of veneer;

a vision system for veneer inspection and grading, the vision system being located at a vision system location along the veneer analysis and selection conveyor, the vision system capturing one or more images of the individual partial sheets of veneer and generating dimensions data and grading data for each individual partial sheet of veneer, the vision system for veneer inspection and grading including:

a first camera to capture a black and white image of an entire surface of a partial sheet of veneer, wherein the first camera has a first field of view, and further wherein the first camera captures a black and white image of the partial sheet of veneer at a first location along a veneer analysis and selection conveyor of a production line, the first location being within the first field of view;

a second camera to capture a color image of the entire surface of the partial sheet of veneer, wherein the second camera has a second field of view, the second field of view substantially overlapping with the first field of view and further wherein the second camera captures a color image of the partial sheet of veneer at the first location, the first location being within the second field of view; and a vision system controller to:
translate the black and white image from the first camera and the color image from the second camera such that the same portion of the partial sheet of veneer captured by each camera is overlaid in a composite view and the images have the same horizontal spacing;

perform computer processing of the black and white image to determine one or more of the dimensions of the partial sheet of veneer, the existence of voids within the partial sheet of veneer, and the presence of debris on the partial sheet of veneer;

perform computer processing of the color image to determine whether colored defects are present in the partial sheet of veneer; and assign a grade to the partial sheet of veneer based at least in part on the computer processing of the black and white image and the computer processing of the color image;

one or more veneer selection and stacking robot control systems to control the operation of one or more veneer selection and stacking robots, the one or more veneer selection and stacking robot control systems generating veneer selection and stacking robot control signals based on analysis of the dimensions data and grading data for each individual partial sheet of veneer; and one or more veneer selection and stacking robots the one or more veneer selection and stacking robots moving individual partial sheets of veneer from the veneer analysis and selection conveyor system to an appropriate veneer stack of two or more veneer stacks in response to the veneer selection and stacking robot control signals received from the one or more veneer selection and stacking robot control systems.

8. The veneer grading and stacking system of claim 7, wherein the first and second cameras of the vision system for veneer inspection and grading are mounted above the veneer analysis and selection conveyor at a vision system location to capture respective black and white and color images of the partial sheet of veneer at the first location of the partial sheet of veneer along the veneer analysis and selection conveyor.

9. The veneer grading and stacking system of claim 7, wherein the vision system controller is configured to determine a scaling factor between the partial sheet of veneer and the black and white image based at least in part on known dimensions of a reference image.

10. The veneer grading and stacking system of claim 7, wherein the vision system controller of the vision system for veneer inspection and grading is configured to auto-rotate the black and white image and the color image such that the black and white image and the color image have the same orientation as a reference image.

11. The veneer grading and stacking system of claim 7, wherein the vision system controller of the vision system for veneer inspection and grading is configured to translate the black and white image and the color image such that the black and white image and the color image are each oriented to match the orientation of the reference image.

12. The veneer grading and stacking system of claim 7 wherein at least one of the one or more veneer selection and stacking robots includes a selectively activated vacuum arm for moving each individual partial sheet of veneer from the veneer analysis and selection conveyor system to an appropriate veneer stack of two or more veneer stacks in response to the veneer selection and stacking robot control signals received from the one or more veneer selection and stacking robot control systems.

13. A method for veneer grading and stacking, the method comprising:
    passing one or more full or partial sheets of veneer from a dryer outfeed conveyor to a veneer analysis and selection conveyor;
    providing the individual full or partial sheets of veneer to one or more vision systems at one or more vision system locations along the veneer analysis and selection conveyor, the one or more vision systems generating images of the individual full or partial sheets of veneer and processing the images of the individual full or partial sheets of veneer to generate dimensions data for each individual full or partial sheet of veneer, the one or more vision systems also analyzing the surface of each individual full or partial sheet of veneer and generating grading data for each individual full or partial sheet of veneer representing a grade assigned to each individual full or partial sheet of veneer, the vision system for veneer inspection and grading including:
    a first camera to capture a black and white image of an entire surface of a full or partial sheet of veneer, wherein the first camera has a first field of view, and further wherein the first camera captures a black and white image of the full or partial sheet of veneer at a first location along a veneer analysis and selection conveyor of a production line, the first location being within the first field of view;
    a second camera to capture a color image of the entire surface of the full or partial sheet of veneer, wherein the second camera has a second field of view, the second field of view substantially overlapping with the first field of view and further wherein the second camera captures a color image of the full or partial sheet of veneer at the first location, the first location being within the second field of view; and
    a vision system controller to:
        translate the black and white image from the first camera and the color image from the second camera such that the same portion of the full or partial sheet of veneer captured by each camera is overlaid in a composite view and the images have the same horizontal spacing;
        perform computer processing of the black and white image to determine one or more of the dimensions of the full or partial sheet of veneer, the existence of voids within the full or partial sheet of veneer, and the presence of debris on the full or partial sheet of veneer;
        perform computer processing of the color image to determine whether colored defects are present in the full or partial sheet of veneer; and
        assign a grade to the full or partial sheet of veneer based at least in part on the computer processing of the black and white image and the computer processing of the color image;
    providing the dimensions data and grading data for each individual full or partial sheet of veneer to one or more veneer selection and stacking robot control systems associated with one or more local robotic veneer stacking cells, the one or more veneer selection and stacking robot control systems generating veneer selection and stacking robot control signals based on analysis of the dimensions data and grading data for each individual full or partial sheet of veneer;
    providing the generated veneer selection and stacking robot control signals to one or more veneer selection and stacking robots included in the one or more local robotic veneer stacking cells;
    using the received veneer selection and stacking robot control signals to direct the one or more veneer selection and stacking robots to move each individual full or partial sheet of veneer from the veneer analysis and selection conveyor system to an appropriate veneer stack based on the grade data assigned to the individual full or partial sheet by the one or more vision systems; and
    using the dimensions data generated for each individual full or partial sheet of veneer to generate veneer selection and stacking robot control signals that direct the one or more veneer selection and stacking robots to place the individual full or partial sheet of veneer on the appropriate veneer stack such that the resulting veneer stacks have relatively uniform edges.

14. The method of claim 13 wherein the first and second cameras of the vision system for veneer inspection and grading are mounted above the veneer analysis and selection conveyor of a production line at a vision system location to capture respective black and white and color images of the full or partial sheet of veneer at the first location of the full or partial sheet of veneer along the veneer analysis and selection conveyor.

15. The method of claim 13 wherein the vision system controller is configured to determine a scaling factor between the full or partial sheet of veneer and the black and white image based at least in part on known dimensions of a reference image.

16. The method of claim 13 wherein the vision system controller of the vision system for veneer inspection and grading is configured to auto-rotate the black and white image and the color image such that the black and white image and the color image have the same orientation as a reference image.

17. The method of claim 13 wherein the vision system controller of the vision system for veneer inspection and grading is configured to translate the black and white image and the color image such that the black and white image and the color image are each oriented to match the orientation of the reference image.

18. The method of claim 13 wherein at least one of the one or more veneer selection and stacking robots includes a selectively activated vacuum arm for moving each individual full or partial sheet of veneer from the veneer analysis and selection conveyor system to an appropriate veneer stack of two or more veneer stacks in response to the veneer selection and stacking robot control signals received from the one or more veneer selection and stacking robot control systems.

\* \* \* \* \*